US012455438B2

(12) United States Patent
Niitani

(10) Patent No.: US 12,455,438 B2
(45) Date of Patent: Oct. 28, 2025

(54) MICROSCOPE APPARATUS, SAMPLE REFRACTIVE INDEX MEASUREMENT METHOD FOR MICROSCOPE APPARATUS, AND SAMPLE REFRACTIVE INDEX MEASUREMENT PROGRAM FOR MICROSCOPE APPARATUS

(71) Applicant: NIKON CORPORATION, Tokyo (JP)

(72) Inventor: Yamato Niitani, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 406 days.

(21) Appl. No.: 18/190,729

(22) Filed: Mar. 27, 2023

(65) Prior Publication Data

US 2023/0236403 A1 Jul. 27, 2023

Related U.S. Application Data

(63) Continuation of application No. PCT/JP2021/031109, filed on Aug. 25, 2021.

(30) Foreign Application Priority Data

Sep. 30, 2020 (JP) .................................. 2020-165984

(51) Int. Cl.
*G02B 21/06* (2006.01)
*G02B 21/00* (2006.01)

(52) U.S. Cl.
CPC ........... *G02B 21/06* (2013.01); *G02B 21/008* (2013.01)

(58) Field of Classification Search
CPC ...... G02B 21/06; G02B 21/008; G02B 21/00; G02B 21/0004; G02B 21/002;

(Continued)

(56) References Cited

U.S. PATENT DOCUMENTS

2015/0015871 A1 1/2015 Tamano
2016/0241758 A1* 8/2016 Dohi ...................... H04N 23/56
(Continued)

FOREIGN PATENT DOCUMENTS

JP 2015018045 A 1/2015
JP 2017026665 A 2/2017
WO WO2019097587 A1 5/2019

OTHER PUBLICATIONS

Nikon Corporation, PCT/JP2021/031109, International Search Report and Written Opinion, Nov. 9, 2021, 10 pgs.
(Continued)

*Primary Examiner* — Arnel C Lavarias
(74) *Attorney, Agent, or Firm* — Morgan, Lewis & Bockius LLP

(57) ABSTRACT

A microscope apparatus comprises: an illumination optical system that guides light from a light source to a sample; a detection unit that detects light from the sample; a detection optical system that has an objective lens and guides light from the sample to the detection unit; a mask that allows a portion of light from the sample and light from the light source to pass therethrough, and blocks the other portion; a mask-switching unit that changes mask patterns of the mask; a microscope control unit; and an information-processing device. The microscope control unit controls the mask-switching unit to change mask patterns. The information-processing device obtains information about the amount of movement of the focus position of the optical system including the objective lens when mask patterns are changed, and calculates the refractive index of the sample based on the obtained information about the amount of movement of the focus position.

11 Claims, 37 Drawing Sheets

(58) Field of Classification Search
CPC ............ G02B 21/0024; G02B 21/0032; G02B 21/0052; G02B 21/006; G02B 21/0072; G02B 21/0076; G02B 21/36; G02B 21/361; G02B 21/365; G02B 27/0025; G02B 27/0068; G01N 21/6456; G01N 21/6458; G01N 2021/6463; G01N 2021/6471; G01N 21/6486
USPC ....... 359/365, 362, 363, 368, 369, 387, 388, 359/389, 390, 434, 435
See application file for complete search history.

(56) References Cited

U.S. PATENT DOCUMENTS

2017/0017071 A1   1/2017   Ue et al.
2020/0271910 A1   8/2020   Tsuchida et al.

OTHER PUBLICATIONS

Nikon Corporation, EP21874992.7, Exetended European Search Report dated Oct. 7, 2024, 7 pgs.

K. Wang et al., "Utilizing confocal microscopy to measure refractive index of articular cartilage", Thomas B. Kirk, Mechanical Engineering, Curtin University, GPO Box U1987, Perth, WA 6845, Australia, 11 pgs. 2012. https://doi.org/10.1111/j.1365-2818.2012.03674.x.

Joris J. Dirckx et al., "Refractive index of tissue measured with confocal microscopy", Journal of Biomedical Optics, vol. 10, Issue 4, 044014 (Jul. 2005), 8 pgs. https://doi.org/10.1117/1.1993487.

Shwetadwip Chowdhury et al., "Refractive index tomography with structured illumination", Optica vol. 4, Issue 5, pp. 537-545 (2017), 9 pgs. https://doi.org/10.1364/OPTICA.4.000537.

Shwetadwip Chowdhury et al., "Structured illumination microscopy for dual-modality 3D sub-diffraction resolution fluorescence and refractive-index reconstruction", Biomedical Optics Express vol. 8, Issue 12, pp. 5776-5793 (2017), 18 pgs. https://doi.org/10.1364/BOE.8.005776.

Neeraj Pandey et al., "A simple method to measure refractive index of optical glasses using focal displacement method", Proceedings vol. 9654, International Conference on Optics and Photonics 2015; 96540L (2015), International Conference on Optics and Photonics 2015, 2015, Kolkata, Indi, 6 pgs. https:/doi.org/10.1117/12.2181509.

* cited by examiner

| n | $m_{fc}$ |
|---|---|
| 1.335 | $m_{fc}(n=1.335)$ |
| 1.340 | $m_{fc}(n=1.340)$ |
| 1.345 | $m_{fc}(n=1.345)$ |
| 1.350 | $m_{fc}(n=1.350)$ |
| ⋮ | ⋮ |

DB1

FIG.23
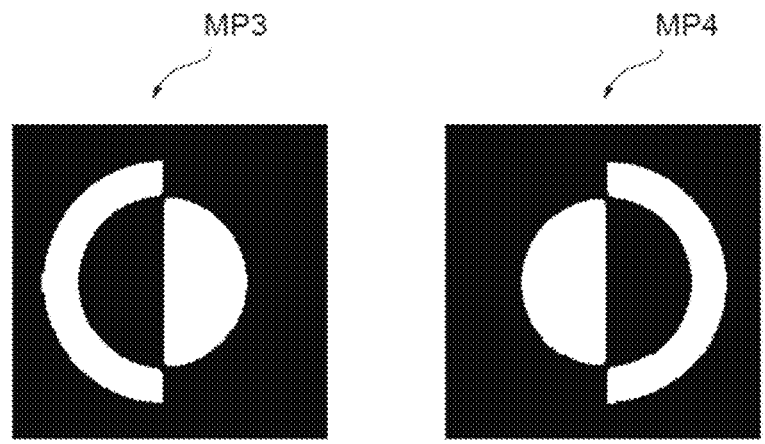
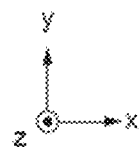
FIG.24
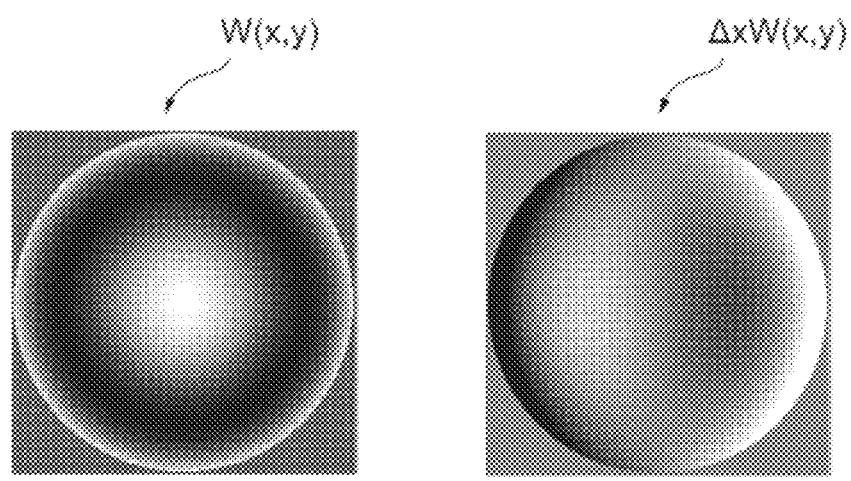
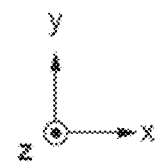

| n | m_sc |
|---|---|
| 1.335 | $m_{sc}(n=1.335)$ |
| 1.340 | $m_{sc}(n=1.340)$ |
| 1.345 | $m_{sc}(n=1.345)$ |
| 1.350 | $m_{sc}(n=1.350)$ |
| ⋮ | ⋮ |

| n | $\beta_z$ |
|---|---|
| 1.335 | $\beta_z(n=1.335)$ |
| 1.340 | $\beta_z(n=1.340)$ |
| 1.345 | $\beta_z(n=1.345)$ |
| 1.350 | $\beta_z(n=1.350)$ |
| ⋮ | ⋮ |

DB4

| n | $m_{CP}$ | $m_{LP}$ | $m_L{'}$ |
|---|---|---|---|
| 1.335 | $m_{CP}(n=1.335)$ | $m_{LP}(n=1.335)$ | $m_L{'}(n=1.335)$ |
| 1.340 | $m_{CP}(n=1.340)$ | $m_{LP}(n=1.340)$ | $m_L{'}(n=1.340)$ |
| 1.345 | $m_{CP}(n=1.345)$ | $m_{LP}(n=1.345)$ | $m_L{'}(n=1.345)$ |
| 1.350 | $m_{CP}(n=1.350)$ | $m_{LP}(n=1.350)$ | $m_L{'}(n=1.350)$ |
| ⋮ | ⋮ | ⋮ | ⋮ |

MICROSCOPE APPARATUS, SAMPLE REFRACTIVE INDEX MEASUREMENT METHOD FOR MICROSCOPE APPARATUS, AND SAMPLE REFRACTIVE INDEX MEASUREMENT PROGRAM FOR MICROSCOPE APPARATUS

RELATED APPLICATIONS

This application is a continuation of PCT Patent Application No. PCT/JP2021/031109, filed on Aug. 25, 2021, entitled "MICROSCOPE APPARATUS, METHOD FOR MEASURING REFRACTIVE INDEX OF SAMPLE USING MICROSCOPE APPARATUS, AND PROGRAM FOR MEASURING REFRACTIVE INDEX OF SAMPLE USING MICROSCOPE APPARATUS," which claims priority to Japanese Patent Application No. 2020-165984, filed on Sep. 30, 2020, all of which are hereby incorporated by reference herein in their entireties.

TECHNICAL FIELD

The present invention relates to a microscope apparatus, a sample refractive index measurement method for a microscope apparatus, and a sample refractive index measurement program for a microscope apparatus.

TECHNICAL BACKGROUND

A technique has been known which calculates a refractive index of an arbitrary section of a sample by using a correction apparatus which corrects a spherical aberration (for example, see Patent Literature 1).

PRIOR ARTS LIST

Patent Document

Patent Literature 1: Japanese Laid-Open Patent Publication No. 2017-026665(A) (corresponding to US 2017/017071)

SUMMARY OF THE INVENTION

A first aspect provides a microscope apparatus including: an illumination optical system which guides illumination light from a light source to a sample; a detection unit which detects detection light from the sample; a detection optical system which guides the detection light from the sample to the detection unit; a member which is provided in at least one of the illumination optical system and the detection optical system; a switching unit that changes at least one of a cross-sectional shape of the illumination light in a plane which intersects with an optical axis of the illumination optical system and a cross-sectional shape of the detection light in a plane which intersects with an optical axis of the detection optical system, by inserting, removing, or controlling the member; and an arithmetic control unit which calculates information about a movement amount of at least one of a light condensing position of the illumination light and an image forming position of the detection light, the movement amount accompanying insertion, removal, or control of the member by the switching unit, and calculates a refractive index of the sample based on the information about the movement amount.

A second aspect provides a sample refractive index measurement method for a microscope apparatus, the microscope apparatus including: an illumination optical system which guides illumination light from a light source to a sample; a detection unit which detects detection light from the sample; a detection optical system which guides the detection light from the sample to the detection unit; a member which is provided in at least one of the illumination optical system and the detection optical system; a switching unit that changes at least one of a cross-sectional shape of the illumination light in a plane which intersects with an optical axis of the illumination optical system and a cross-sectional shape of the detection light in a plane which intersects with an optical axis of the detection optical system, by inserting, removing, or controlling the member; and an arithmetic control unit, in which the sample refractive index measurement method includes: calculating information about a movement amount of at least one of a light condensing position of the illumination light and an image forming position of the detection light, the movement amount accompanying insertion, removal, or control of the member by the switching unit; and calculating a refractive index of the sample based on the information about the movement amount.

A third aspect provides a sample refractive index measurement program for a microscope apparatus, the microscope apparatus including: an illumination optical system which guides illumination light from a light source to a sample; a detection unit which detects detection light from the sample; a detection optical system which guides the detection light from the sample to the detection unit; a member which is provided in at least one of the illumination optical system and the detection optical system; a switching unit that changes at least one of a cross-sectional shape of the illumination light in a plane which intersects with an optical axis of the illumination optical system and a cross-sectional shape of the detection light in a plane which intersects with an optical axis of the detection optical system, by inserting, removing, or controlling the member; and an arithmetic control unit, in which the sample refractive index measurement program causes a computer to execute: a process of calculating information about a movement amount of at least one of a light condensing position of the illumination light and an image forming position of the detection light, the movement amount accompanying insertion, removal, or control of the member by the switching unit; and a process of calculating a refractive index of the sample based on the information about the movement amount.

BRIEF DESCRIPTION OF THE DRAWINGS

FIG. 23 is a schematic diagram illustrating two mask patterns according to a fourth embodiment.

FIG. 24 is a schematic diagram illustrating a shape of a wave surface having a spherical aberration and a shape in a case where the wave surface is differentiated in an x direction.

FIG. 29 is a schematic diagram illustrating a setting data table according to the fifth embodiment.

FIGS. 32A-32C are graphs according to the sixth embodiment, in which FIG. 32A is a graph illustrating a relationship between an observation depth and an optimal rotation position of a correction collar, FIG. 32B is a graph illustrating a relationship between the observation depth and an optimal position of an objective lens, and FIG. 32C is a graph illustrating a relationship between the observation depth and a position of the objective lens in a case where the rotation position of the correction collar is fixed.

DESCRIPTION OF THE EMBODIMENTS

First Embodiment

Figure 1:
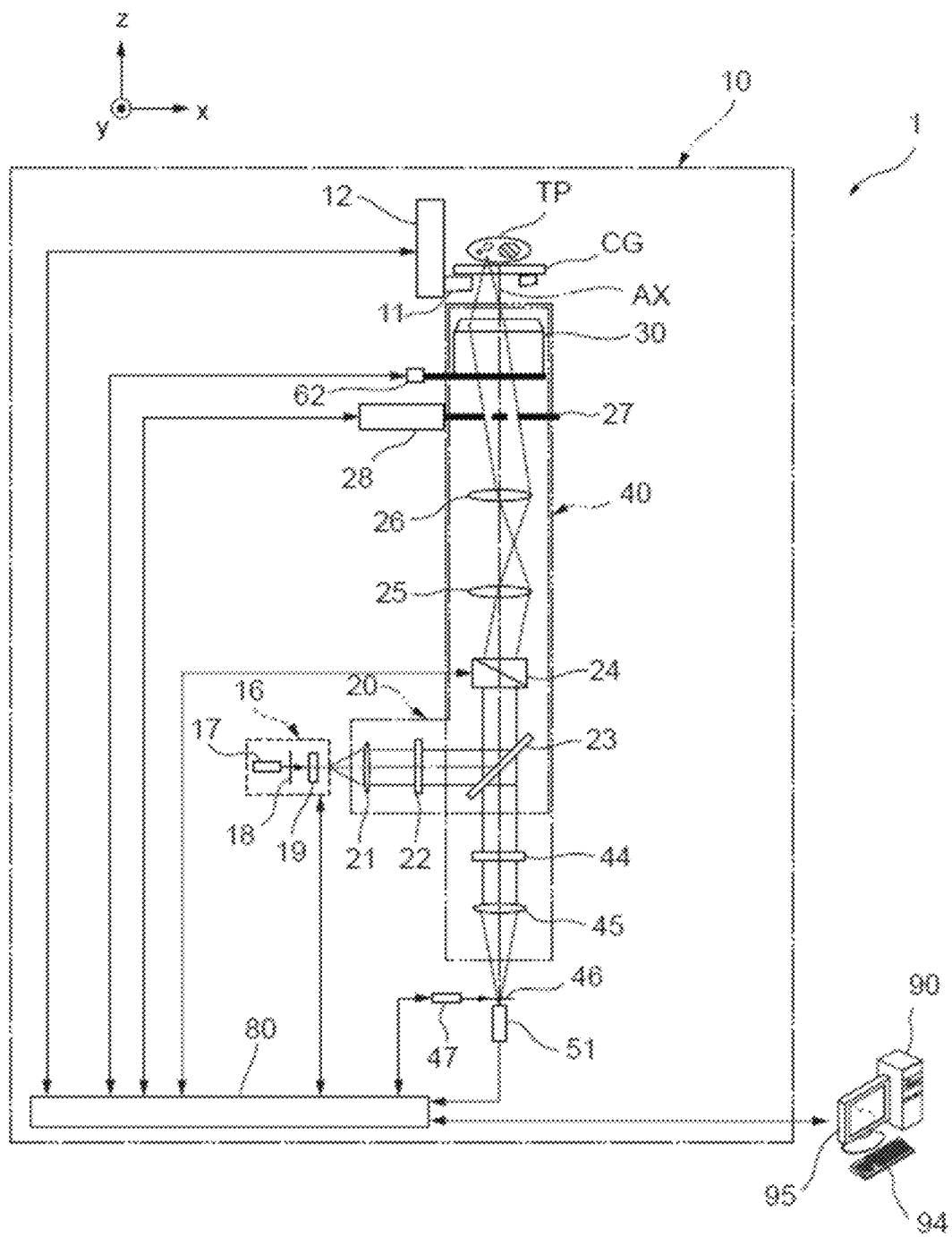
FIG. 1 is a diagram illustrating a configuration of a microscope apparatus according to a first embodiment.

A first embodiment will be described. FIG. 1 is a diagram illustrating a configuration of a microscope apparatus 1 according to the first embodiment. The microscope apparatus 1 is configured with a confocal microscope 10 and an information processing apparatus 90 as main units. The confocal microscope 10 and the information processing apparatus 90 are configured to be capable of mutual transmission and reception of data. In the following description, a coordinate axis which extends in an optical axis direction of an objective lens 30 of the confocal microscope 10 is set as a z axis. Further, coordinate axes which extend in mutually orthogonal directions in a plane perpendicular to the z axis are set as an x axis and a y axis.

Figure 2:
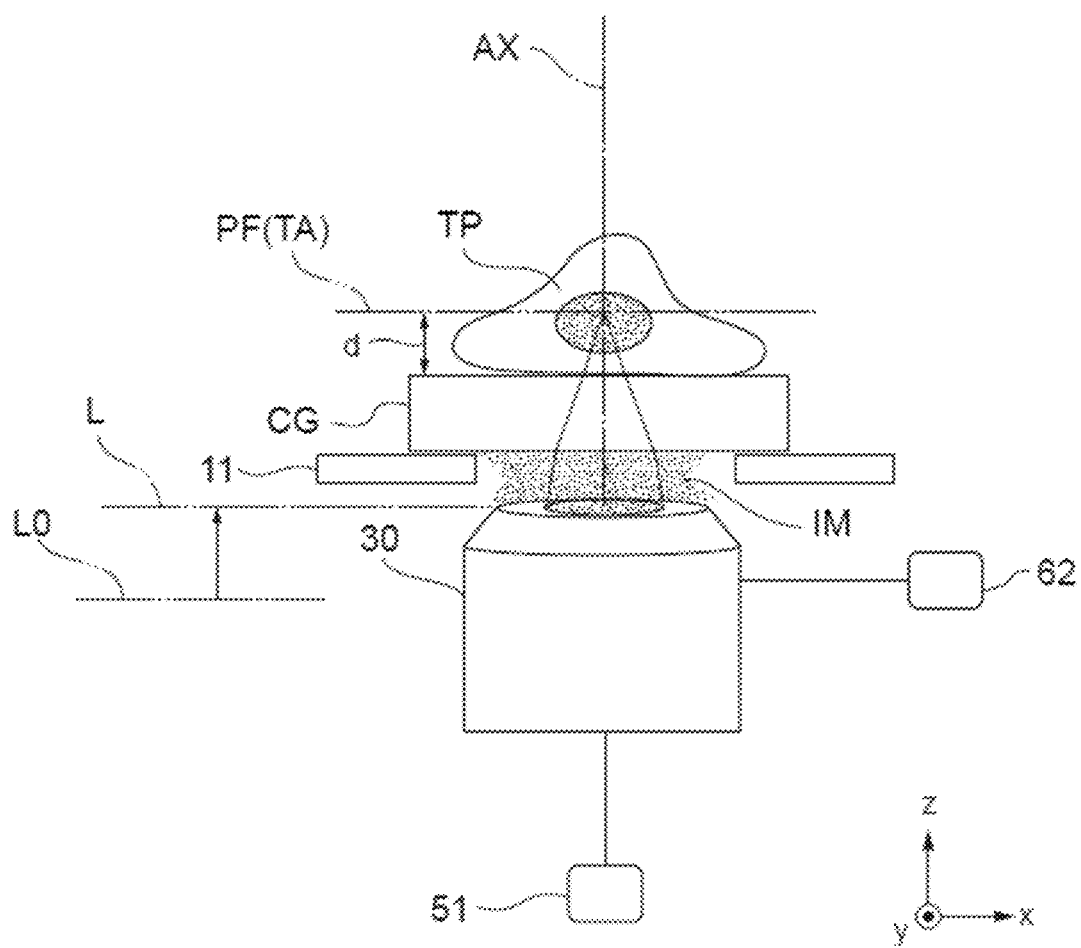
FIG. 2 is an explanatory diagram illustrating a change in an observation depth with respect to a change in a position of an objective lens according to the first embodiment.

The confocal microscope 10 includes a stage 11, a light source unit 16, an illumination optical system 20, a detection optical system 40, a detection unit 51, and a microscope control unit 80. As illustrated in FIG. 2, the stage 11 is formed into a plate shape which has an opening in a central part. The stage 11 supports cover glass CG on which a sample TP as an observation target is placed (see FIG. 2). Examples of the sample TP may include a biological sample (not illustrated), a bead (not illustrated), and so forth, for example. A biological sample is a sample with a thickness such as a fluorescently stained cell. A bead is a fine spherical body (with a diameter of approximately 0.2 μm, for example) which is fluorescently marked and formed of polystyrene.

As illustrated in FIG. 1, the stage 11 is provided with a stage driving unit 12. The stage driving unit 12 moves the stage 11 in a plane perpendicular to the z axis (an optical axis AX of the objective lens 30). The stage 11 is moved in a plane perpendicular to the z axis by the stage driving unit 12, and it is thereby possible to acquire images of the sample TP, which is supported by the stage 11 via the cover glass CG, in a wide range. Note that the stage driving unit 12 may move the stage 11 along the z axis (the optical axis AX of the objective lens 30).

The light source unit 16 emits excitation light for exciting a fluorescent substance contained in the sample TP. The light source unit 16 has a light source 17, a shutter 18, and an acousto-optical element 19. As the light source 17, for example, a laser light source or the like is used which is capable of emitting laser light (excitation light) in a predetermined wavelength range.

The illumination optical system 20 illuminates the sample TP by the excitation light emitted from the light source unit 16. The illumination optical system 20 has, in order from the light source unit 16 side, an illumination lens 21, an excitation filter 22, a dichroic mirror 23, a scanner 24, a relay lenses 25 and 26, a mask 27, and the objective lens 30. The illumination lens 21 is a collimator lens for causing the excitation light emitted from the light source unit 16 to become parallel light. The excitation filter 22 has characteristics to transmit the excitation light from the light source unit 16 and to block at least a part of light at other wavelengths (for example, natural light and stray light). The dichroic mirror 23 has characteristics to reflect the excitation light emitted from the light source unit 16 and to transmit light in a predetermined wavelength band (for example, fluorescence) among kinds of light produced in the sample TP on the stage 11. The scanner 24 scans the sample TP by the excitation light from the light source unit 16 in two directions of the x direction and the y direction. As the scanner 24, for example, a galvano scanner, a resonant scanner, or the like is used. The relay lenses 25 and 26 relay light between the scanner 24 and the objective lens 30. A mask switching unit 28 is provided for the mask 27 (details will be described later).

The objective lens 30 is arranged in the vicinity below the stage 11. The objective lens 30 is opposite to the sample TP on the stage 11 via the opening of the stage 11 and the cover glass CG (see FIG. 2). A gap portion between the objective lens 30 and the cover glass CG is filled with an immersion liquid IM (see FIG. 2). Note that a material with which the gap portion between the objective lens 30 and the cover glass CG is filled is not limited to the immersion liquid IM, but the gap portion may be filled with a gas such as air.

The objective lens 30 is provided with an objective z-position driving unit 62. The objective z-position driving unit 62 is configured by using an electric motor (not illustrated), for example. The objective z-position driving unit 62 moves the objective lens 30 together with a revolver (not illustrated) up and down in the z direction. As illustrated in FIG. 2, when the objective lens 30 is moved in the z direction by the objective z-position driving unit 62, a relative position of the objective lens 30 to the sample TP is changed, and a position of a focal point PF of the objective lens 30 with respect to the sample TP is changed in the z direction. The position of the focal point PF of the objective lens 30 is displaced in the z direction by the objective z-position driving unit 62, and it is thereby possible to acquire images of cross sections (observation surfaces TA) of the sample TA in different positions in the z direction (the optical axis direction of the objective lens 30). In the following, a plurality of images of cross sections of the sample TP in different positions in the z direction may be referred to as z-stack images of the sample TP.

The detection optical system 40 guides the fluorescence produced in the sample TP to a detection unit. The detection optical system 40 includes, in order from the sample TP side, the objective lens 30, the mask 27, the relay lens 26 and 25, the scanner 24, and the dichroic mirror 23. In addition, the detection optical system 40 has, in order from the dichroic mirror 23 side, a fluorescence filter 44 and a light condensing lens 45. The fluorescence filter 44 has characteristics to transmit light in a predetermined wavelength band (for example, the fluorescence) among kinds of light from the sample TP. The fluorescence filter 44 blocks at least a part of the excitation light, natural light, stray light, and so forth which are reflected by the sample TP, for example. The light condensing lens 45 condenses the fluorescence which is given off from a fine region (a diffraction limit of the objective lens) of the sample TP. The detection unit 51 detects the fluorescence produced in the sample TP via the detection optical system 40. As the detection unit 51, for example, a photomultiplier tube is used.

A pinhole 46 is provided in the vicinity of the detection unit 51 between the detection optical system 40 and the detection unit 51. The pinhole 46 is arranged in a position conjugate with a focal position of the objective lens 30 on the sample TP side. The pinhole 46 allows only light from a focal plane of the objective lens 30 (a plane that is perpendicular to the optical axis AX of the objective lens 30 which passes through the focal position of the objective lens 30) or from a plane deviating from the focal plane in the optical axis direction in a predetermined movement allowable range to pass and blocks other light. The pinhole 46 is provided with a pinhole driving unit 47. The pinhole driving unit 47 enlarges or shrinks a size of the pinhole 46. The pinhole driving unit 47 enlarges or shrinks the size of the pinhole 46, and the above-described predetermined movement allowable range can thereby be changed.

The microscope control unit 80 controls the stage driving unit 12, the pinhole driving unit 47, the detection unit 51, and so forth. Further, as acquisition conditions of images of the sample TP, the microscope control unit 80 sets light intensity of the excitation light emitted from the light source unit 16, the size of the pinhole 46, a scanning speed of the excitation light for the sample TP, and so forth, for example.

The excitation light emitted from the light source unit 16 is transmitted through the illumination lens 21 of the illumination optical system 20 and thereby becomes generally parallel light. The excitation light transmitted through the illumination lens 21 passes through the excitation filter 22 and is incident on the dichroic mirror 23. The excitation light incident on the dichroic mirror 23 is reflected by the dichroic mirror 23 and is incident on the scanner 24. The scanner 24 scans the sample TP by the excitation light incident on the scanner 24 in the two directions of the x direction and the y direction. The excitation light incident on the scanner 24 passes through the scanner 24, is transmitted through the objective lens 30, and is condensed on the focal plane of the objective lens 30. A portion in the sample TP in which the excitation light is condensed (that is, a portion which overlaps with the focal plane of the objective lens 30) is two-dimensionally scanned by the scanner 24 in the two directions of the x direction and the y direction.

The fluorescence is given off from the fluorescent substance contained in a portion in the sample TP in which the excitation light is condensed. The fluorescence given off from the sample TP is incident on the objective lens 30 as the detection optical system 40. The fluorescence incident on the objective lens 30 is transmitted through the objective lens 30, passes through the scanner 24, and is incident on the dichroic mirror 23. Because the wavelength of the fluorescence incident on the dichroic mirror 23 is different from that of the excitation light, the fluorescence is transmitted through the dichroic mirror 23 and reaches the fluorescence filter 44. The fluorescence reaching the fluorescence filter 44 passes through the fluorescence filter 44, is transmitted through the light condensing lens 45, and is condensed in a position conjugate with the focal position of the objective lens 30. The fluorescence which is condensed in the position conjugate with the focal position of the objective lens 30 passes through the pinhole 46 and is incident on the detection unit 51.

The detection unit 51 performs photoelectric conversion for light (fluorescence) incident on the detection unit 51 and generates, as a detection signal of light, data corresponding to a light amount (brightness) of the light. The detection unit 51 outputs the generated data to a detection control unit 82 (see FIG. 3) of the microscope control unit 80. An arithmetic apparatus 91 (see FIG. 3) of an information processing apparatus 90 performs a process of setting data input from the detection control unit 82 as data of one pixel and of aligning the data synchronously with a two-dimensional scan by the scanner 24, thereby generates one set of image data in which data of a plurality of pixels are two-dimensionally (in two directions) aligned, and causes a storage unit 92 (see FIG. 3) such as a RAM to store the image data. Consequently, the arithmetic apparatus 91 acquires an image of the sample TP.

The mask 27 allows a part of either one or both of light fluxes of the excitation light emitted from the light source unit 16 and the fluorescence given off from the sample TP to transmit therethrough and blocks another part of the light fluxes. The mask 27 is arranged in a range, in which the excitation light or the fluorescence given off from one point of the sample TP becomes generally parallel light, in the illumination optical system 20, the detection optical system 40, or a shared optical path of the two optical systems. As the mask 27, a plate-shaped element which blocks a part of light and allows another part to transmit therethrough may be used, and other than such a plate-shaped element, for example, a DMD (digital mirror device) or a liquid crystal SLM (spatial light modulator) may be used. In a case where the DMD is used, for example, a mirror in a region in which light on the DMD is blocked is turned to an OFF state, while a mirror in a region through which light is transmitted is turned to an ON state, and it is thereby possible to block a part of light and to allow a part of light to be transmitted. In a case where the liquid crystal SLM is used, for example, a phase pattern which diffracts light in a direction in which light is not incident on a sample or a detector is created in a region in which light on the liquid crystal SLM is blocked, phase modulation is not applied to a region through which light is transmitted, and it is thereby possible to block a part of light and to allow a part of light to be transmitted.

The mask switching unit 28 changes mask patterns related to sizes, shapes, arrangement, and so forth of a region through which light is transmitted and a region in which light is blocked in the mask 27. For example, mask patterns may be changed by switching a plurality of masks in which mutually different mask patterns are formed and by pulling out those from and inserting those into a mask installation position, or mask patterns may be changed by rotating or parallelly moving a plate-shaped element in which plural mask patterns are formed. Further, in a case where the DMD or the liquid crystal SLM is used as the mask 27, the mask switching unit 28 changes spatial patterns of the DMD or the liquid crystal SLM. Note that switching among masks in the present invention is not limited to automatic switching. For example, mask patterns may be changed by manual insertion or removal of masks by a user.

Figure 3:
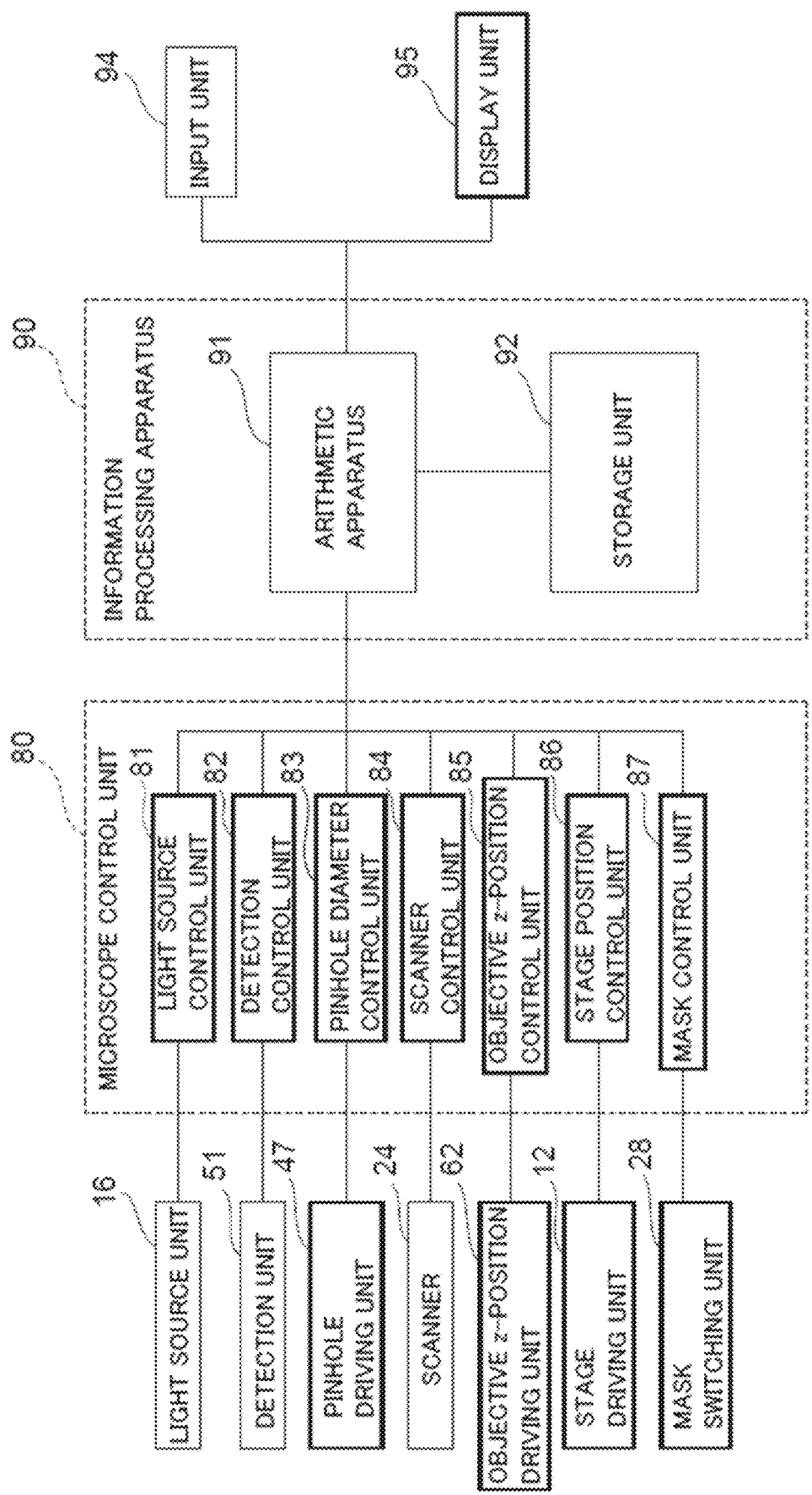
FIG. 3 is a block diagram illustrating electrical connection between a microscope control unit and an information processing apparatus according to the first embodiment.

FIG. 3 is a block diagram illustrating electrical connection between the microscope control unit 80 and the information processing apparatus 90 of the confocal microscope 10 according to the first embodiment. The microscope control unit 80 and the information processing apparatus 90 configure an arithmetic control unit according to the present invention. The microscope control unit 80 has a light source control unit 81, a detection control unit 82, a pinhole diameter control unit 83, a scanner control unit 84, an objective z-position control unit 85, a stage position control unit 86, and a mask control unit 87.

The light source control unit 81 is electrically connected with the light source unit 16 and controls the light source unit 16. The detection control unit 82 is electrically connected with the detection unit 51 and controls the detection unit 51. The pinhole diameter control unit 83 is electrically connected with the pinhole driving unit 47 and controls the pinhole driving unit 47. The scanner control unit 84 is electrically connected with the scanner 24 and controls the scanner 24. The objective z-position control unit 85 is electrically connected with the objective z-position driving unit 62 and controls the objective z-position driving unit 62. The stage position control unit 86 is electrically connected with the stage driving unit 12 and controls the stage driving unit 12. The mask control unit 87 is electrically connected with the mask switching unit 28 and controls the mask switching unit 28.

The information processing apparatus 90 has the arithmetic apparatus 91 and the storage unit 92. The arithmetic apparatus 91 is electrically connected with the control units 81 to 87 of the microscope control unit 80. The arithmetic apparatus 91 performs processes in accordance with process contents (programs) retained in the storage unit 92 and controls the control units 81 to 87 connected therewith. The storage unit 92 is configured by using a memory such as a RAM, a hard disk, or the like. The storage unit 92 stores the process contents to be executed by the arithmetic apparatus 91 and various data to be input from the arithmetic apparatus 91. An input unit 94 is an input interface which is capable of being operated by the user. The input unit 94 includes at least one of a mouse, a keyboard, a touch pad, a trackball, and so forth, for example. The input unit 94 detects an operation by the user and outputs a detection result as input data, which are input by the user, to the arithmetic apparatus 91 of the information processing apparatus 90. A display unit 95 is a liquid crystal display or the like, for example. The arithmetic apparatus 91 of the information processing apparatus 90 causes the display unit 95 to display a GUI (graphical user interface) necessary for an operation of the confocal microscope 10, an image of the sample TP which is output from the microscope control unit 80 of the confocal microscope 10, and a calculated sample refractive index.

Figure 4:
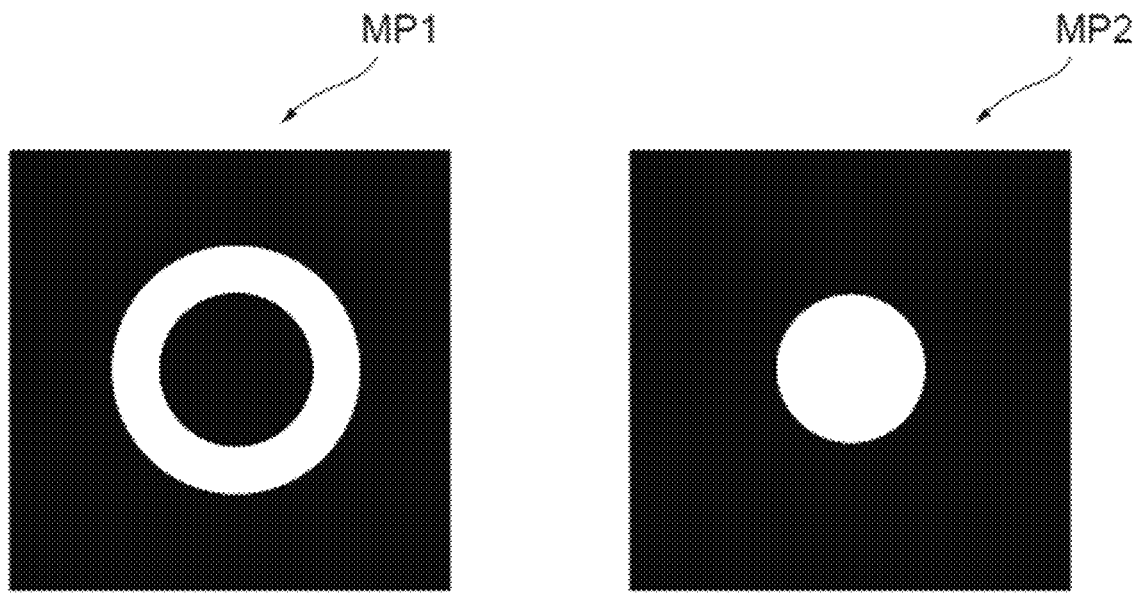
FIG. 4 is a schematic diagram illustrating two mask patterns according to the first embodiment.

Next, a description will be made about a method for calculating a refractive index of the sample TP (hereinafter referred to as a sample refractive index measurement method). When an aberration is present in an optical system and mask patterns arranged in an illumination optical system are changed, a light condensing position of the excitation light (illumination light) is changed. When mask patterns arranged in a detection optical system are changed, an image forming position of the fluorescence (detection light), which is given off from a fine region (the diffraction limit of the objective lens) in which a sample is present, is changed. When mask patterns arranged in a shared optical path of the illumination optical system and the detection optical system are changed, both of the light condensing position of the excitation light (illumination light) and the image forming position of the fluorescence (detection light) are changed. In the following, at least one of the light condensing position of the excitation light (illumination light) and the image forming position of the fluorescence (detection light) will be referred to as a "focusing position". In the sample refractive index measurement method according to the first embodiment, at a plurality of observation depth positions (objective lens z-positions described later), movement amounts of the focusing position, in the z direction, of an optical system including the objective lens 30 are obtained, the movement amounts being produced when mask patterns of the mask 27 are changed, and the refractive index of the sample TP is calculated based on the obtained movement amounts of the focusing position. FIG. 4 illustrates two mask patterns of the mask 27 which are used in the present embodiment. A mask pattern MP1 is a mask pattern which has a light passing region (a region indicated in white) in a circularly annular shape (a region surrounded by two concentric circles), causes only a light flux incident on the light passing region among light fluxes incident on the mask 27 to pass (be transmitted) therethrough, and blocks light incident on other portion (other than the light passing region). A mask pattern MP2 is a mask pattern which has a light passing region (a region indicated in white) in a circular shape (which corresponds to an inner diameter of the circularly annular shape of the mask pattern MP1, for example, but is not limited to this), causes only a light flux incident on the light passing region (a portion of the light flux in the vicinity of a center) among light fluxes incident on the mask 27 to pass therethrough, and blocks light incident on other portion (other than the light passing region). Note that the mask patterns in the present invention are not limited to the above mask patterns. By using only either one of the mask pattern MP1 or the mask pattern MP2, the sample refractive index may be calculated based on a movement amount of the focusing position between a state where the mask is put in the optical path and a state where no mask is put therein. Further, by using three or more different mask patterns, the sample refractive index may be calculated based on plural movement amounts of the focusing position among the respective mask patterns.

Figure 5:
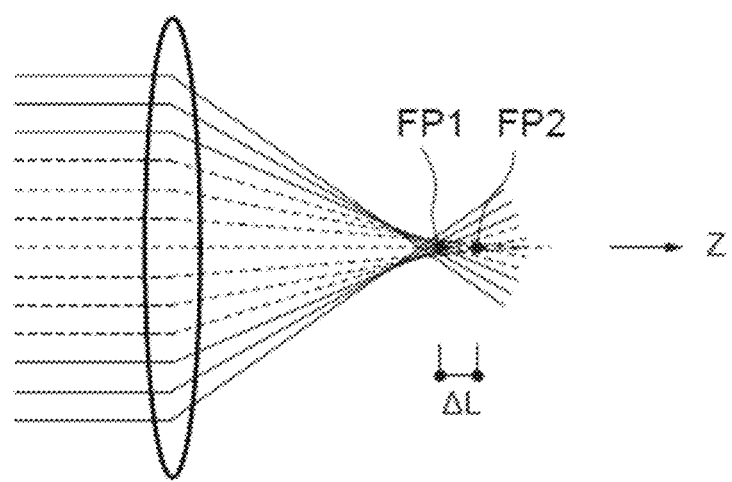
FIG. 5 is a schematic diagram for explaining a relationship between the mask pattern and a movement amount of a light condensing position of excitation light (illumination light).

For example, for a reason that the refractive index of the sample TP is different from the refractive index of the immersion liquid IM, a spherical aberration may occur to an optical system which includes the sample TP. As illustrated in FIG. 5, when the spherical aberration is present, a position movement in the z direction (the optical axis direction of the lens) occurs between a light condensing position FP1, which is formed by light condensing, by the optical system, of a circularly annular light flux (light passing through the mask pattern MP1, for example), and a light condensing position FP2, which is formed by light condensing, by the optical system, of light (light passing through the mask pattern MP2, for example) in a central portion (which corresponds to the inner diameter of the circularly annular shape, for example, but is not limited to this) of the light flux. The movement amount $\Delta L$ between the light condensing positions becomes larger as a spherical aberration amount becomes larger.

Figure 6:
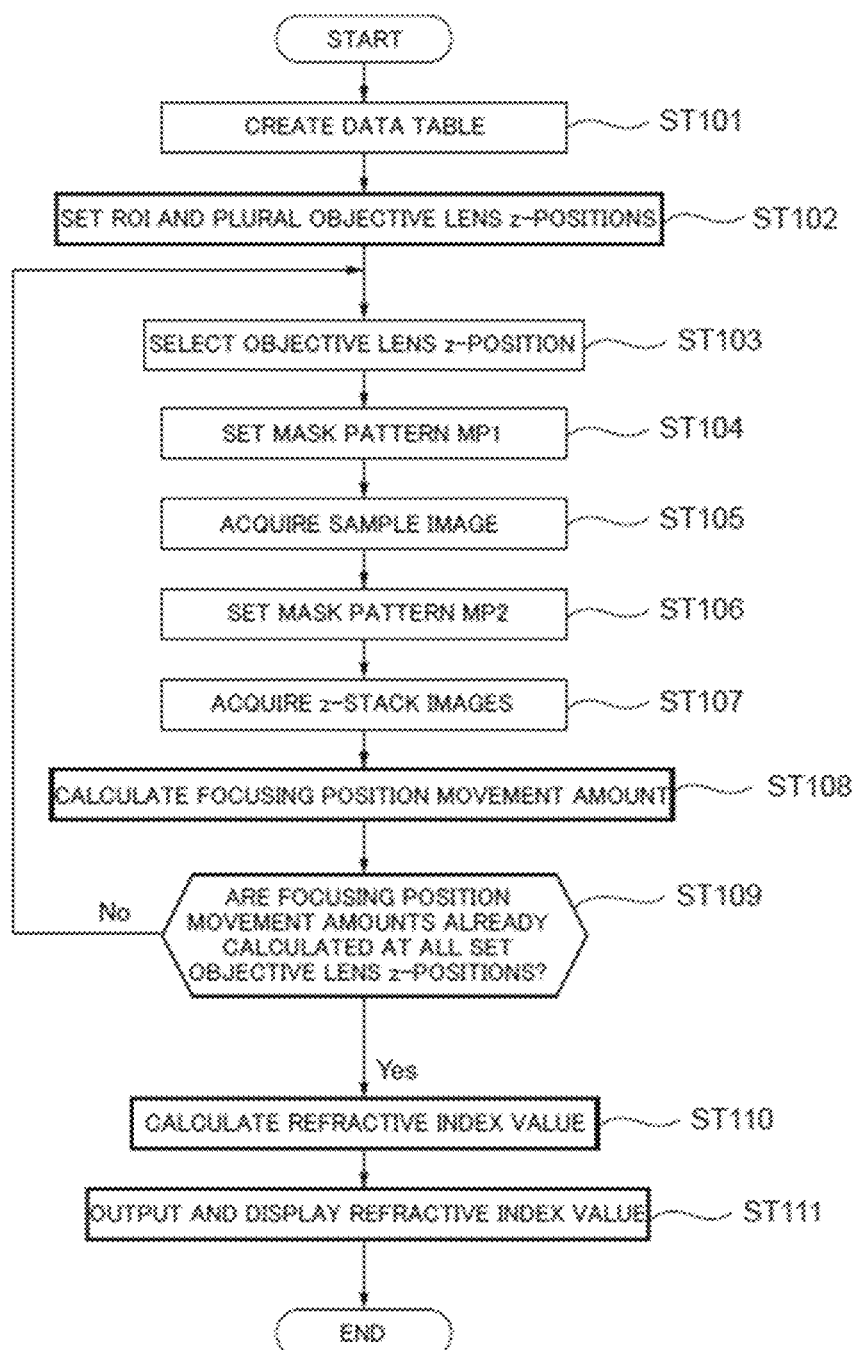
FIG. 6 is a flowchart illustrating a sample refractive index measurement method according to the first embodiment.

FIG. 6 is a flowchart illustrating the sample refractive index measurement method according to the first embodiment. Processes of steps illustrated in FIG. 6 are executed in accordance with predetermined control programs by the microscope control unit 80 or the arithmetic apparatus 91 of the information processing apparatus 90. First, in step ST101, a setting data table DB1 (corresponding to first information according to the present invention) which represents a relationship between a sample refractive index n and an L-$\Delta L$ change ratio $m_{fc}$ is created in advance (see FIG. 7). The L-$\Delta L$ change ratio $m_{fc}$ denotes a ratio between an objective lens z-position L and the movement amount $\Delta L$ of the focusing position in the z direction in a case where a change is performed between the mask patterns MP1 and MP2. The objective lens z-position L denotes a position of the objective lens 30 in the z direction with respect to a predetermined reference position L0 as an origin position (see FIG. 2). The objective lens z-position L is changed, and an observation depth d (a position in the z direction in which the focal point PF of the objective lens 30 is positioned) is thereby changed (see FIG. 2). The objective lens z-position can be detected by using a change amount in an angle of a gear, which drives the objective lens 30 in the z direction, from a reference position, for example.

It is possible to obtain the relationship between the sample refractive index n and the L-$\Delta L$ change ratio $m_{fc}$ by performing an optical simulation, for example. Specifically, a sample refractive index, an immersion liquid refractive index, a cover glass thickness, an aberration of an optical system, and an observation depth in the sample are set, and for example, a z-position $L_T$ of the objective lens is thereby obtained at which a maximum intensity ratio (hereinafter referred to as a Strehl ratio) of a known PSF (point spread function) becomes the maximum. For example, the objective lens z-position at which the Strehl ratio becomes the maximum in a state where any mask pattern is not installed in the optical path is set as $L_{T0}$, the objective lens z-position at which the Strehl ratio becomes the maximum in a state where the mask pattern MP1 is installed in the optical path is set as $L_{T1}$, and the objective lens z-position at which the Strehl ratio becomes the maximum in a state where the mask pattern MP2 is installed in the optical path is set as $L_{T2}$. In this case, a movement amount $\Delta L_T$ of the focusing position which is produced when switching is performed between the mask patterns MP1 and MP2 can be obtained by the following expression (1).

[Math. 1]

$$\Delta L_T = L_{T2} - L_{T1} \quad (1)$$

For example, at plural observation depths, the objective lens z-positions $L_{T0}$ and the movement amounts $\Delta L_T$ of the focusing position are obtained, and a scatter diagram is created on which corresponding points at which $L_{T0}$ corresponds to $\Delta L_T$ are plotted. Then, a straight line is fitted to plots on the created scatter diagram, for example, and the slope of the straight line is obtained as the L-ΔL change ratio $m_{fc}$. It is possible to create the setting data table DB1 by setting plural sample refractive indices and by obtaining the L-ΔL change ratios $m_{fc}$ in accordance with the respective sample refractive indices. The created setting data table DB1 is retained in the storage unit 92. Note that data tables may be created and retained for plural conditions such as wavelengths and temperatures and may properly be used in accordance with observation conditions.

The relationship between the sample refractive index n and the L-ΔL change ratio $m_{fc}$ may experimentally be obtained by using a sample whose refractive index is known, for example. In this case, processes of step ST102 to step ST109 described later are performed for the sample whose refractive index is known, and a scatter diagram is thereafter created on which corresponding points at which objective lens z-positions L correspond to experimentally obtained movement amounts $\Delta L_{TE}$ are plotted. Then, a straight line is fitted to plots on the created scatter diagram, and the L-ΔL change ratio $m_{fc}$ is calculated from the slope of the straight line. It is possible to create the setting data table DB1 by obtaining the L-ΔL change ratios $m_{fc}$ in accordance with respective sample refractive indices for plural samples whose refractive indices are known.

Figures 7, 8:
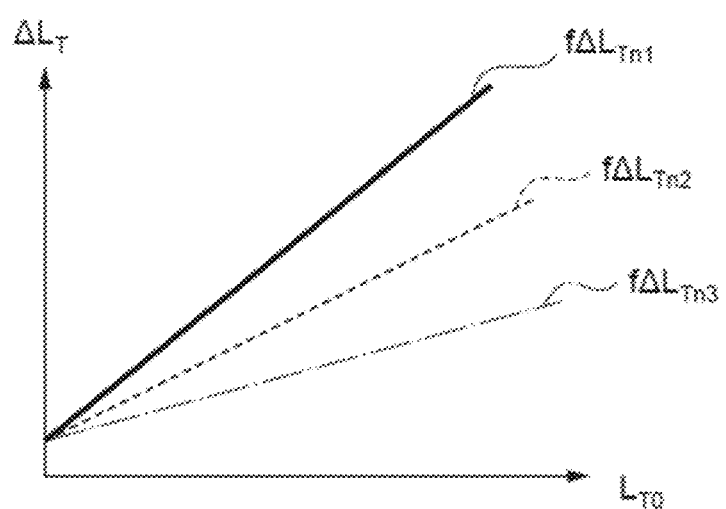
FIG. 7 is a schematic diagram illustrating a setting data table according to the first embodiment.
FIG. 8 is a schematic diagram illustrating a relationship between an objective lens z-position and a movement amount of at least one of the light condensing position of the excitation light (illumination light) and an image forming position of fluorescence (detection light) which are produced when the mask patterns are switched, with respect to each sample refractive index.

FIG. 8 is a diagram which illustrates, as an example, the relationship between the objective lens z-position $L_{T0}$ and the movement amount $\Delta L_T$ of the focusing position which is produced when switching is performed between the mask patterns MP1 and MP2, with respect to each sample refractive index. Here, the objective lens z-position at which the objective lens z-position $L_{T0}$ becomes zero is arbitrarily defined, and for example, the objective lens z-position when the focusing position is present on a boundary surface between the sample and the cover glass, or the like, may be set. As illustrated in FIG. 8, for example, the relationship between the objective lens z-position $L_{T0}$ and the movement amount $\Delta L_T$ of the focusing position in a case where the sample refractive index is n1 can be represented by a straight line $f\Delta L_{Tn1}$. The relationship between the objective lens z-position $L_{T0}$ and the movement amount $\Delta L_T$ of the focusing position in a case where the sample refractive index is n2 can be represented by a straight line $f\Delta L_{Tn2}$. The relationship between the objective lens z-position $L_{T0}$ and the movement amount $\Delta L_T$ of the focusing position in a case where the sample refractive index is n3 can be represented by a straight line $f\Delta L_{Tn3}$. In this case, the L-ΔL change ratio $m_{fc}$ in a case where the sample refractive index is n1 is obtained as the slope of the straight line $f\Delta L_{Tn1}$. The L-ΔL change ratio $m_{fc}$ in a case where the sample refractive index n is n2 is obtained as the slope of a straight line $f\Delta L_{Tn2}$. The L-ΔL change ratio $m_{fc}$ in a case where the sample refractive index is n3 is obtained as the slope of a straight line $f\Delta L_{Tn3}$. In the example illustrated in FIG. 8, in order of the sample refractive indices of n1, n2, and n3, the differences from the immersion liquid refractive index are large, and the L-ΔL change ratios $m_{fc}$ are also large.

Figure 9:
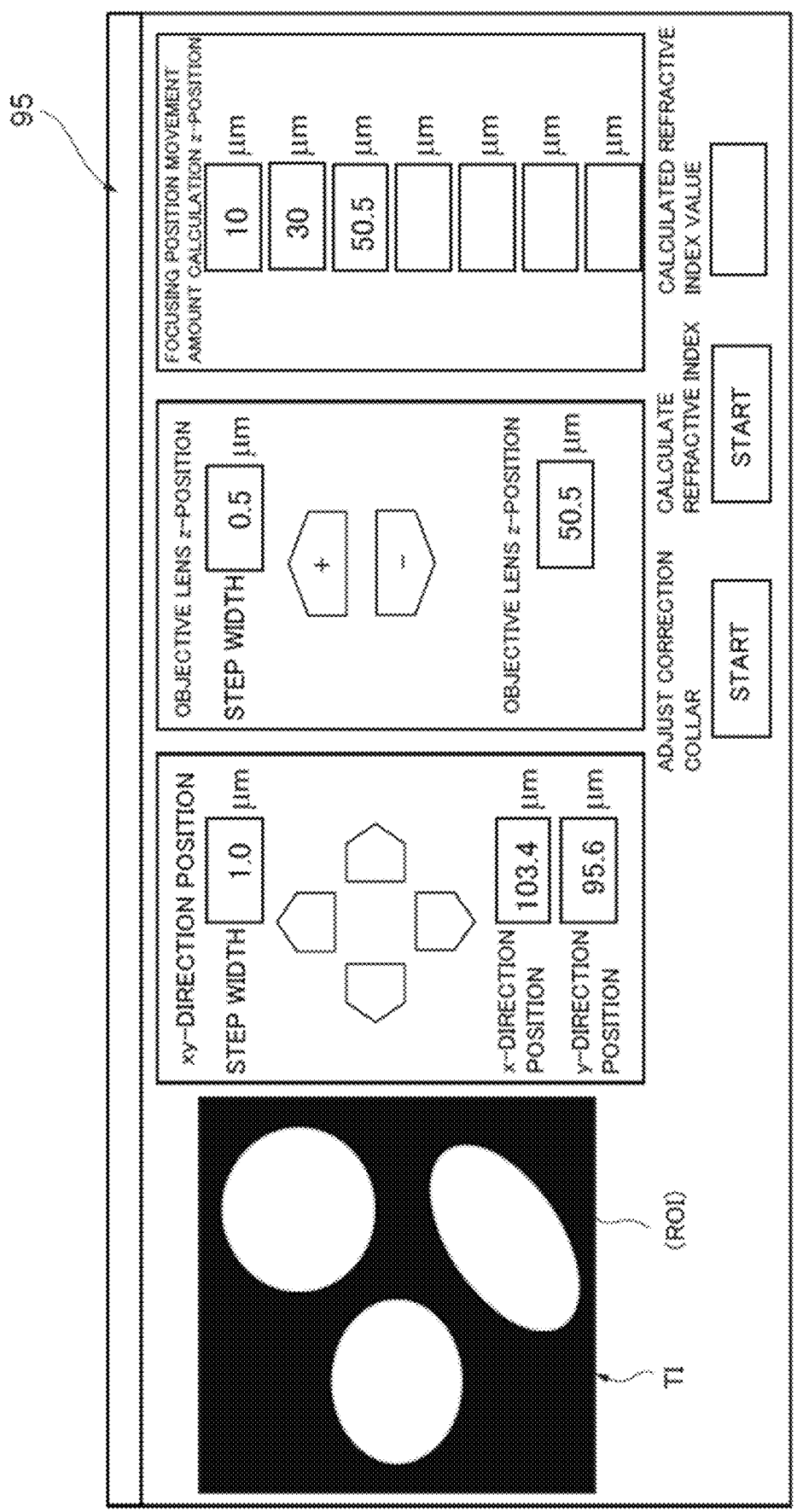
FIG. 9 is a schematic diagram illustrating one example of a GUI which is used when the observation depth and so forth are set.

In step ST102, an xy-direction position of the sample whose refractive index is obtained and plural objective lens z-positions L for which the movement amounts of the focusing position are obtained are set. As illustrated in FIG. 9, by using the GUI to be displayed on the display unit 95, the user performs, for the input unit 94, operations for inputting an x-direction position and a y-direction position of an observation region ROI (stage 11) while viewing a sample image TI (a sample image which is acquired in a state where the mask pattern is not set) and can thereby set the observation region ROI. When the user performs, for the input unit 94, an operation for inputting the objective lens z-position L and the operations for inputting the x-direction position and the y-direction position of the observation region ROI (stage 11), the input unit 94 outputs input data corresponding to those operations to the objective z-position control unit 85 and the stage position control unit 86 of the microscope control unit 80 via the arithmetic apparatus 91.

The user changes the objective lens z-position L by using the GUI and makes a determination by viewing a state of the sample image which is changed in response to the change, thereby decides plural objective lens z-positions for calculating the movement amounts ΔL of the focusing position (hereinafter referred to as a focusing position movement amount calculation z-position), and inputs those in input fields by using the GUI. In FIG. 9, as plural focusing position movement amount calculation z-positions, 3 positions of 10, 30, and 50.5 μm are raised as examples. Note that the focusing position movement amount calculation z-positions may automatically be set. In this case, for example, a method is present that sets a predetermined number of focusing position movement amount calculation z-positions which are defined in advance at equivalent distances in a range of the objective lens z-position, the range being defined in advance. The user operates a start button for refractive index calculation on the GUI, and the process thereby moves to step ST103 and subsequent steps.

In step ST103, one among the plural focusing position movement amount calculation z-positions which are set in step ST102 is selected, and the objective lens 30 is moved to the selected focusing position movement amount calculation z-position (referred to as an objective lens z-position Lc). In step ST104, the mask pattern in the mask 27 is set to the mask pattern MP1.

In step ST105, the sample image is acquired. Specifically, the microscope control unit 80 irradiates the sample TP with laser light (excitation light) from the light source unit 16 via the mask 27 of the mask pattern MP1 and the objective lens 30. The detection unit 51 detects light (fluorescence), which passes through the objective lens 30 and the mask 27 of the mask pattern MP1, from the sample TP and outputs the detection signal to the microscope control unit 80. The detection signal is output to the arithmetic apparatus 91 via the microscope control unit 80. The arithmetic apparatus 91 performs a process of aligning detection signals input from the microscope control unit 80 synchronously with a two-dimensional scan by the scanner 24 and thereby generates the sample image at the objective lens z-position Lc in a case of the mask pattern MP1. The generated sample image is retained in the storage unit 92.

In step ST106, the mask pattern in the mask 27 is changed to the mask pattern MP2. In step ST107, sample images (the z-stack images of the sample TP) at plural objective lens z-positions among which the objective lens z-position is set as the center are acquired. Specifically, in a state where the objective lens 30 is moved to the objective lens z-position Lc, the microscope control unit 80 irradiates the sample TP with the laser light (excitation light) from the light source unit 16 via the mask 27 of the mask pattern MP2 and the objective lens 30. The detection unit 51 detects the light (fluorescence), which passes through the objective lens 30 and the mask 27 of the mask pattern MP2, from the sample TP and outputs the detection signal to the microscope control unit 80. The detection signal is output to the arithmetic apparatus 91 via the microscope control unit 80. The arithmetic apparatus 91 performs a process of aligning detection signals input from the microscope control unit 80 synchronously with a two-dimensional scan by the scanner 24 and thereby generates the sample image at the objective lens z-position Lc in a case of the mask pattern MP2.

Figure 10:
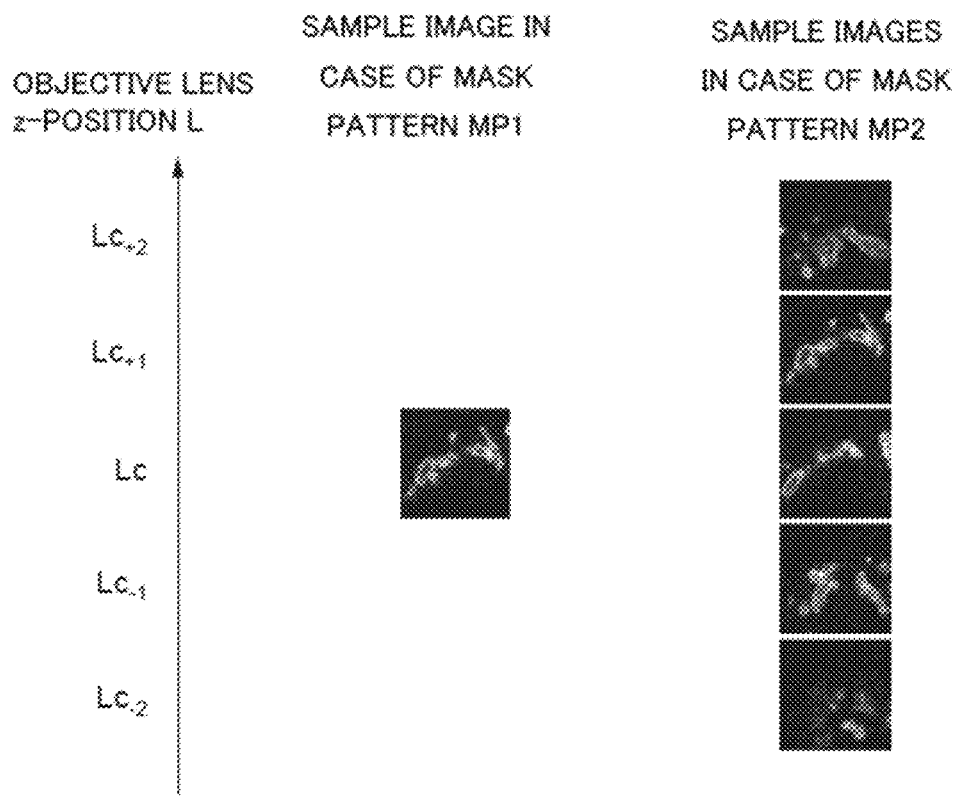
FIG. 10 is a schematic diagram illustrating examples of a sample image at a predetermined objective lens z-position in a case of a mask pattern MP1 and sample images at a plurality of objective lens z-positions in a case of a mask pattern MP2, according to the first embodiment.

Subsequently, the objective lens 30 is sequentially moved to the other objective lens z-positions, and after each of the movements, similarly to the above, the sample image (z-stack images) at each of the objective lens z-positions in a case of the mask pattern MP2 is generated. The generated z-stack images are retained in the storage unit 92. A range in the z direction for acquiring the z-stack images is set to a range larger than twice the maximum value of the movement amount ΔL of the focusing position which occurs under presumed observation conditions. FIG. 10 illustrates, as examples, the sample image at the objective lens z-position Lc in a case of the mask pattern MP1 and the sample images (z-stack images) at plural objective lens z-positions ($Lc_{+2}$, $Lc_{+1}$, Lc, $Lc_{-1}$, and $Lc_{-2}$) in a case of the mask pattern MP2.

Figure 11:
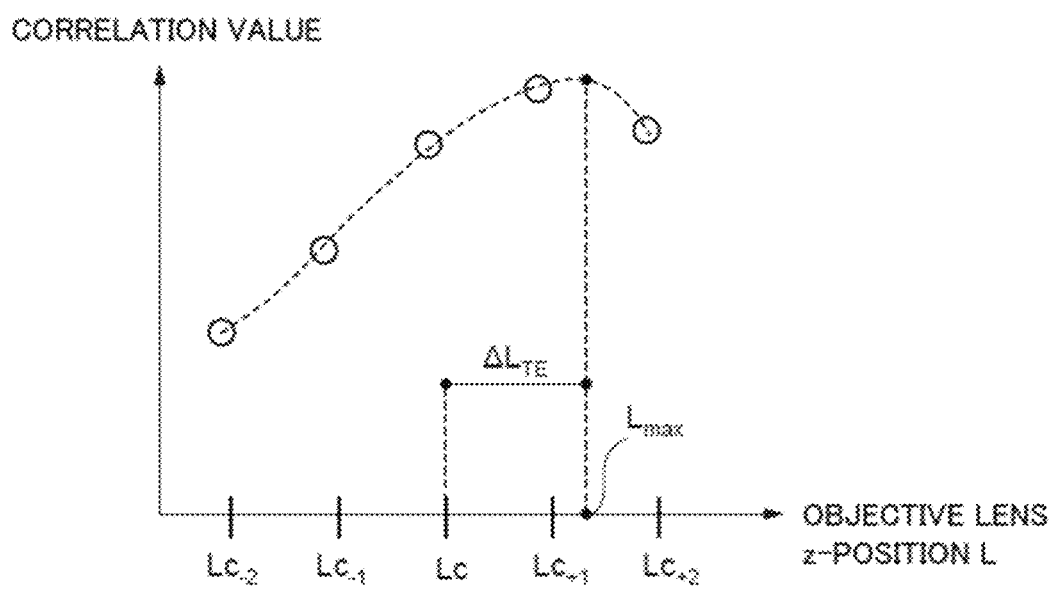
FIG. 11 is a graph illustrating a relationship between the objective lens z-position and a correlation value according to the first embodiment.

In step ST108, the movement amounts of the focusing position (corresponding to second information according to the present invention) are calculated from the sample image at the objective lens z-position Lc in a case of the mask pattern MP1, which is acquired in step ST105, and the z-stack images in a case of the mask pattern MP2, which are acquired in step ST107. For example, correlation values are calculated between the sample image at the objective lens z-position Lc in a case of the mask pattern MP1, which is acquired in step ST105, and the plural sample images, which are acquired at the respective objective lens z-positions ($Lc_{+2}$, $Lc_{+1}$, Lc, $Lc_{-1}$, and $Lc_{-2}$) in a case of the mask pattern MP2 in step ST107. Then, as illustrated in FIG. 11, a scatter diagram is created on which corresponding points at which the objective lens z-positions ($Lc_{+2}$, $Lc_{+1}$, Lc, $Lc_{-1}$, and $Lc_{-2}$) correspond to the calculated correlation values are plotted. Interpolation or function approximation is performed for plots on the scatter diagram, and the objective lens z-position at which the correlation value becomes the maximum is set as $L_{max}$. As a method for performing the interpolation, for example, a method is present which performs Lagrange interpolation or spline interpolation for plots of the correlation values with respect to the objective lens z-positions. As a method for performing the function approximation, for example, a method is present in which by a least squares method, a quadratic curve or a Gaussian function is fitted to the plots of the correlation values with respect to the objective lens z-positions. When the movement amount of the focusing position is set as $\Delta L_{TE}$, $\Delta L_{TE}$ can be calculated by the following expression (2). The calculated movement amount $\Delta L_{TE}$ of the focusing position is retained in the storage unit 92 together with the objective lens z-position Lc selected in step ST103.

[Math. 2]

$$\Delta L_{TE} = L_{max} - L_c \quad (2)$$

In step ST109, it is determined whether the movement amounts $\Delta L_{TE}$ of the focusing position are calculated for all of the objective lens z-positions which are set in step ST102. In a case where calculation is not yet performed for all of those (step ST109: No), the process returns to step ST103, and the objective lens z-position is moved to the next position. In a case where calculation is already performed for all of those (step ST109: Yes), the process moves to step ST110.

Figure 12:
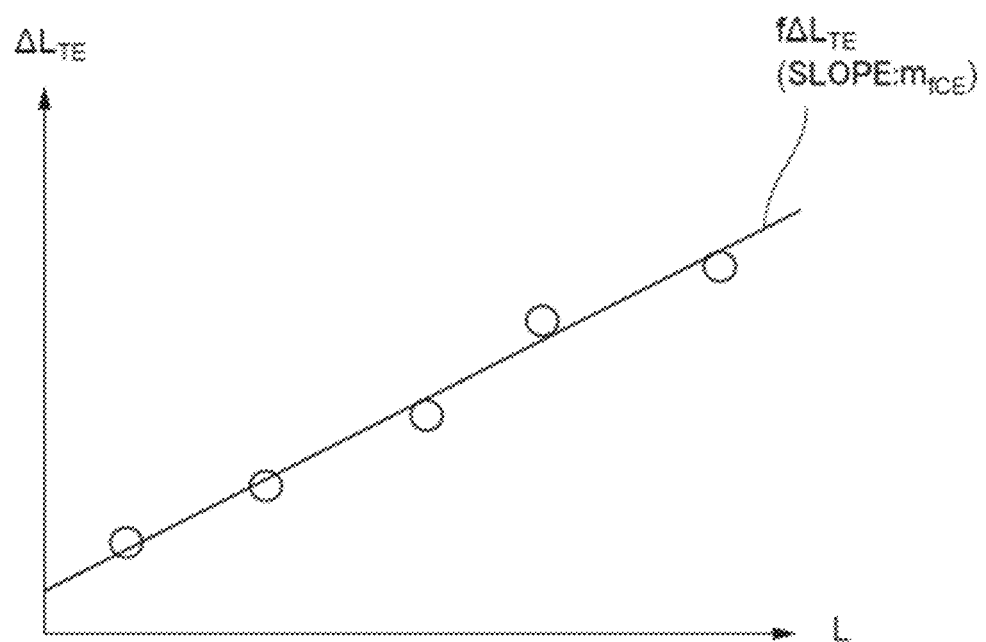
FIG. 12 is a graph illustrating a relationship between the objective lens z-position and a movement amount of a focusing position in a z direction according to the first embodiment.

In step ST110, a sample refractive index value is calculated. The sample refractive index value is calculated as follows, for example. First, as illustrated in FIG. 12, a scatter diagram is created on which corresponding points, at which the objective lens z-positions L set in step ST102 correspond to the movement amounts $\Delta L_{TE}$ of the focusing position, the movement amounts $\Delta L_{TE}$ being calculated at the respective objective lens z-positions L, are plotted. Then, one straight line $f\Delta L_{TE}$ is fitted to plots on the created scatter diagram, and a slope $m_{fcE}$ of the straight line $f\Delta L_{TE}$ (corresponding to third information according to the present invention) is calculated. The calculated slope $m_{fcE}$ is collated with the setting data table DB1 (see FIG. 7) created in step ST101, and the sample refractive index is thereby obtained. For example, the L–ΔL change ratio $m_{fc}$, whose value is closest to the calculated slope $m_{fcE}$, on the setting data table DB1 is selected, and the value of the refractive index n which corresponds to the selected L–ΔL change ratio $m_{fc}$ may be set as the sample refractive index. Further, for example, by interpolating the relationship between the refractive index n on the setting data table DB1 and the L–ΔL change ratio $m_{fc}$, the refractive index corresponding to the calculated slope $m_{fcE}$ may be calculated.

In step ST111, the sample refractive index calculated in step ST110 is displayed on the GUI to be displayed on the display unit 95 and is thereby presented to the user. The calculated sample refractive index values may be retained in the storage unit 92 and be used for other processes.

Note that in the above-described description, one sample image is acquired in step ST105, and the z-stack images are acquired in step ST107; however, the z-stack images may be acquired in ST105, and one sample image may be acquired in step ST107. Further, the z-stack images may be acquired in both of step ST105 and step ST107, and in step ST108, the movement amount of the focusing position may be calculated based on the correlation values among plural images in the respective z-stack images.

In the first embodiment, the refractive index of the sample TP can be obtained based on the movement amounts of the focusing position in the z direction which are produced when changes are performed between the mask patterns MP1 and MP2 at plural objective lens z-positions. The obtained sample refractive index can be used for optimizing apparatus parameters in the microscope apparatus 1.

Second Embodiment

Figure 13:
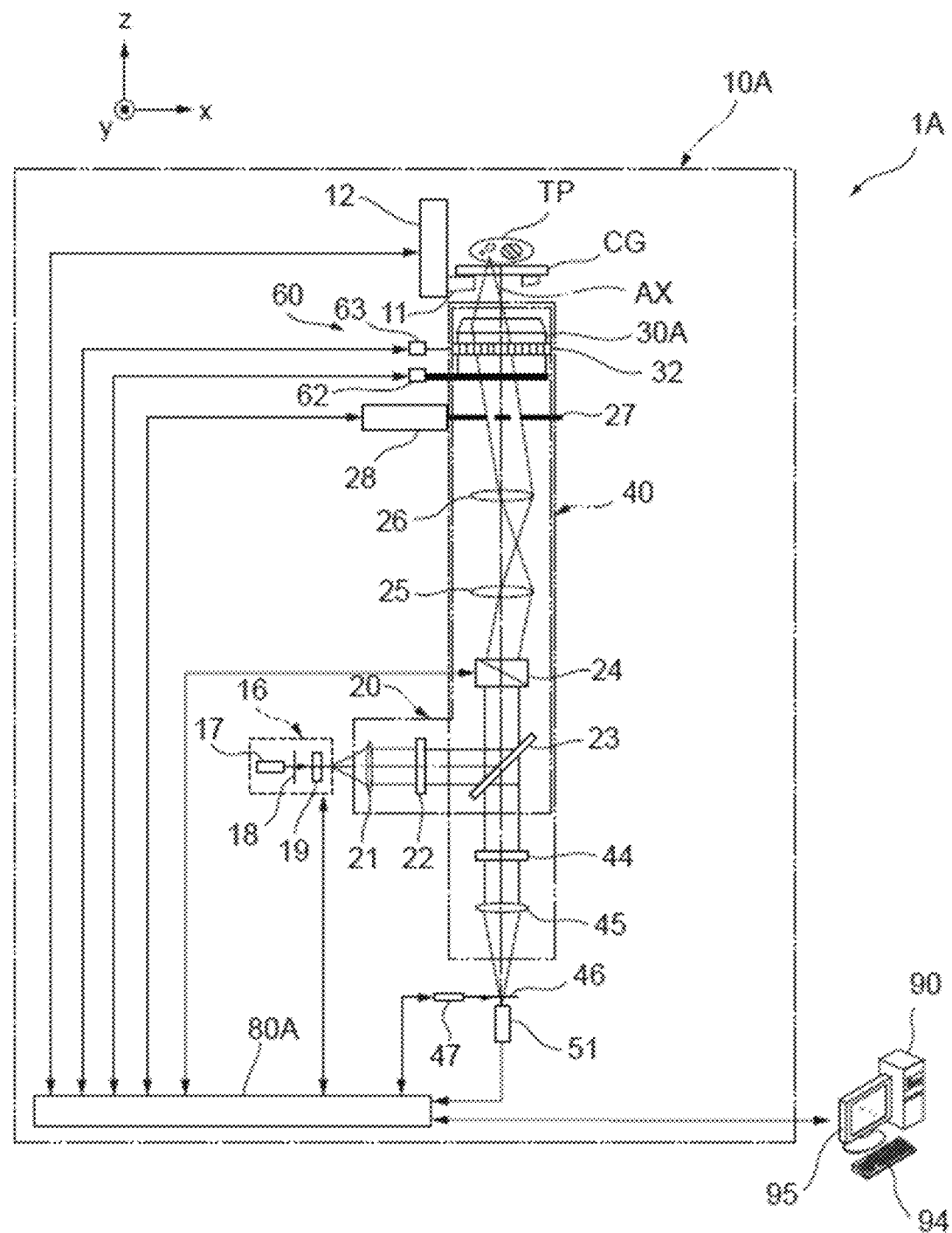
FIG. 13 is a diagram illustrating a configuration of a microscope apparatus according to a second embodiment.

A second embodiment will be described. FIG. 13 is a diagram illustrating a configuration of a microscope apparatus 1A according to the second embodiment. The microscope apparatus 1A has similar configurations to those of the microscope apparatus 1 according to the first embodiment, the same or similar reference characters will appropriately be given to the configurations similar to those of the above-described first embodiment, and descriptions thereof will not be made or will be simplified. The microscope apparatus 1A includes a confocal microscope 10A which has an aberration correction unit 60 and a microscope control unit 80A and is, in this point, different from the microscope apparatus 1 according to the first embodiment.

Figure 14:
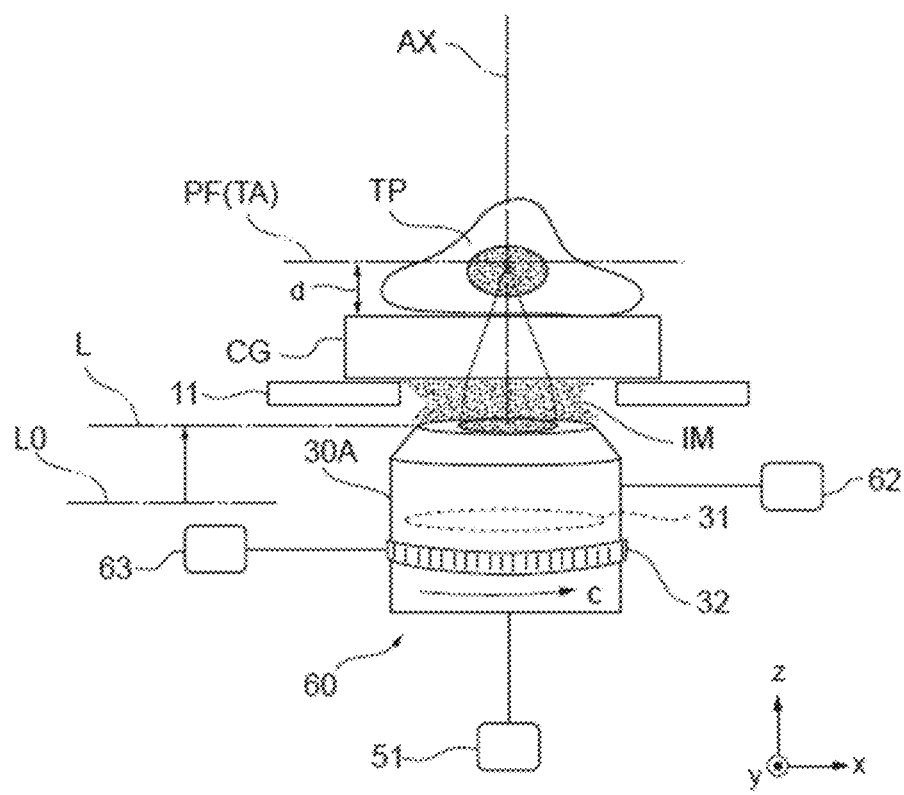
FIG. 14 is an enlarged diagram illustrating an aberration correction unit in a confocal microscope according to the second embodiment.

FIG. 14 is an enlarged diagram of the aberration correction unit 60 in the confocal microscope 10A. The aberration correction unit 60 corrects a spherical aberration due to a distance between a distal end of an objective lens 30A and the cover glass CG, the thickness of the cover glass CG, an observation depth in a sample, and so forth. The objective lens 30A is retained in the vicinity below the stage 11 by a revolver (not illustrated). The objective lens 30A has an aberration correction lens 31 and a correction collar 32. The aberration correction lens 31 moves along the optical axis AX of the objective lens 30A and is thereby capable of changing the spherical aberration of the objective lens 30A. The correction collar 32 is provided on a barrel portion of the objective lens 30A to be rotatable around the optical axis AX of the objective lens 30A as a center. In response to rotation of the correction collar 32, the aberration correction lens 31 moves along the optical axis AX of the objective lens 30A. For example, by using a cam structure or the like, the aberration correction lens 31 may be configured to move along the optical axis AX of the objective lens 30A.

The aberration correction unit 60 includes the aberration correction lens 31 and the correction collar 32 of the objective lens 30A and the detection unit 51. In addition, the aberration correction unit 60 includes a correction collar driving unit 63 and an objective z-position driving unit 62. The correction collar driving unit 63 is configured by using an electric motor (not illustrated), for example. The correction collar driving unit 63 rotates and drives the correction collar 32, changes a rotation position C of the correction collar 32, and moves the aberration correction lens 31 along the optical axis AX of the objective lens 30A. The correction collar driving unit 63 changes the rotation position C of the correction collar 32, changes a position of the aberration correction lens 31 on the optical axis, and thereby changes the spherical aberration of the objective lens 30A. The objective z-position driving unit 62 has a similar configuration and functions to those of the microscope apparatus 1 according to the first embodiment.

Figure 15:
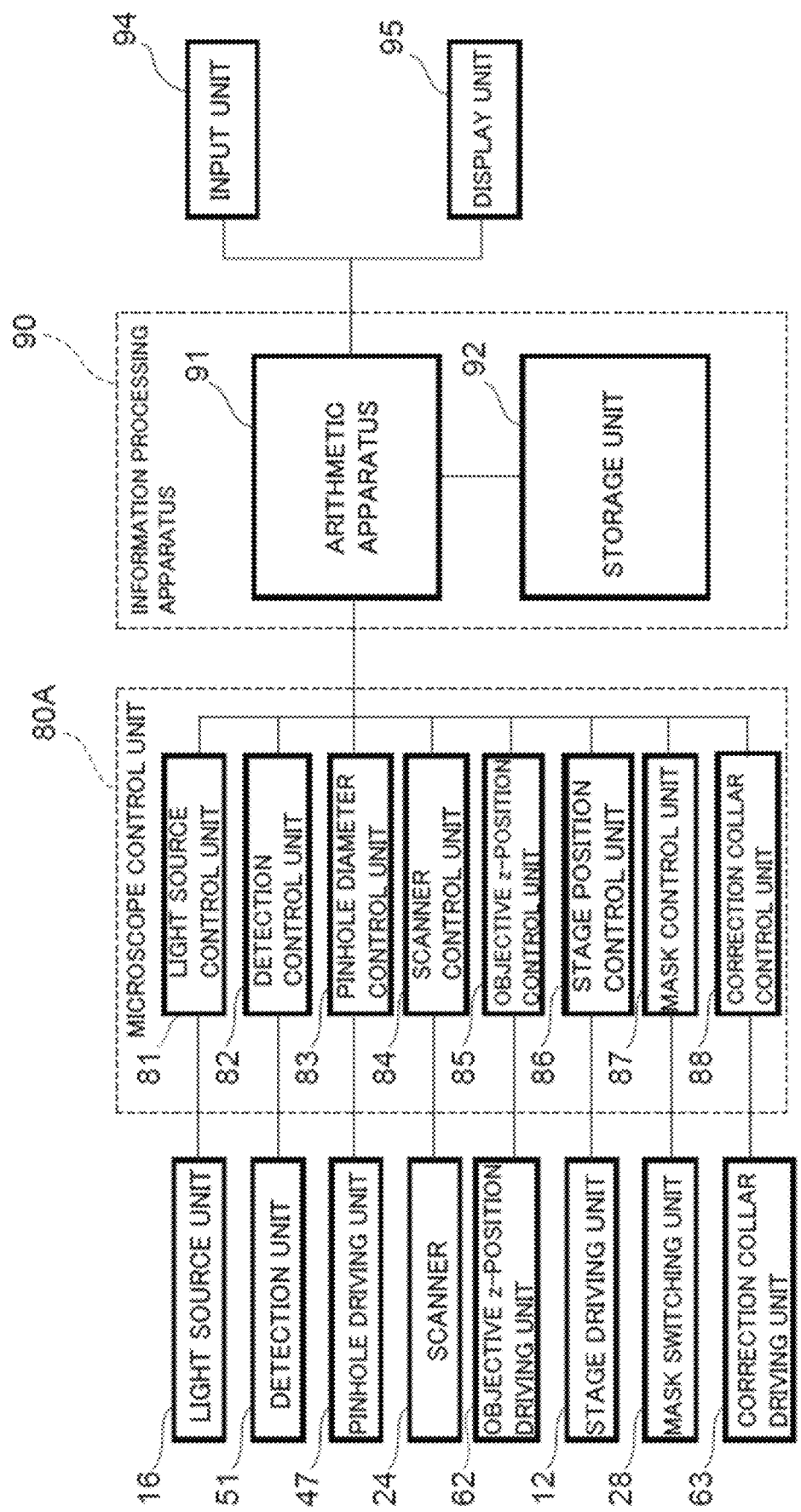
FIG. 15 is a block diagram illustrating electrical connection between a microscope control unit and an information processing apparatus according to the second embodiment.

FIG. 15 is a block diagram illustrating electrical connection between the microscope control unit 80A and the information processing apparatus 90 of the confocal microscope 10A. The microscope control unit 80A and the information processing apparatus 90 configure the arithmetic control unit according to the present invention. The microscope control unit 80A according to the second embodiment includes a correction collar control unit 88 in addition to the configurations of the microscope control unit 80 according to the first embodiment and is, in this point, different from the microscope control unit 80 according to the first embodiment. The correction collar control unit 88 is electrically connected with the correction collar driving unit 63 and controls the correction collar driving unit 63.

Next, a sample refractive index measurement method according to the second embodiment will be described. In the sample refractive index measurement method according to the second embodiment, while two objective lens z-positions are set and the correction collar 32 is adjusted to an optimal position at one of the objective lens z-positions, the movement amounts of the focusing position in the z direction are obtained when changes between the mask patterns MP1 and MP2 are performed at the other objective lens z-position, and the sample refractive index is thereby calculated based on the obtained movement amounts of the focusing position.

Figure 16:
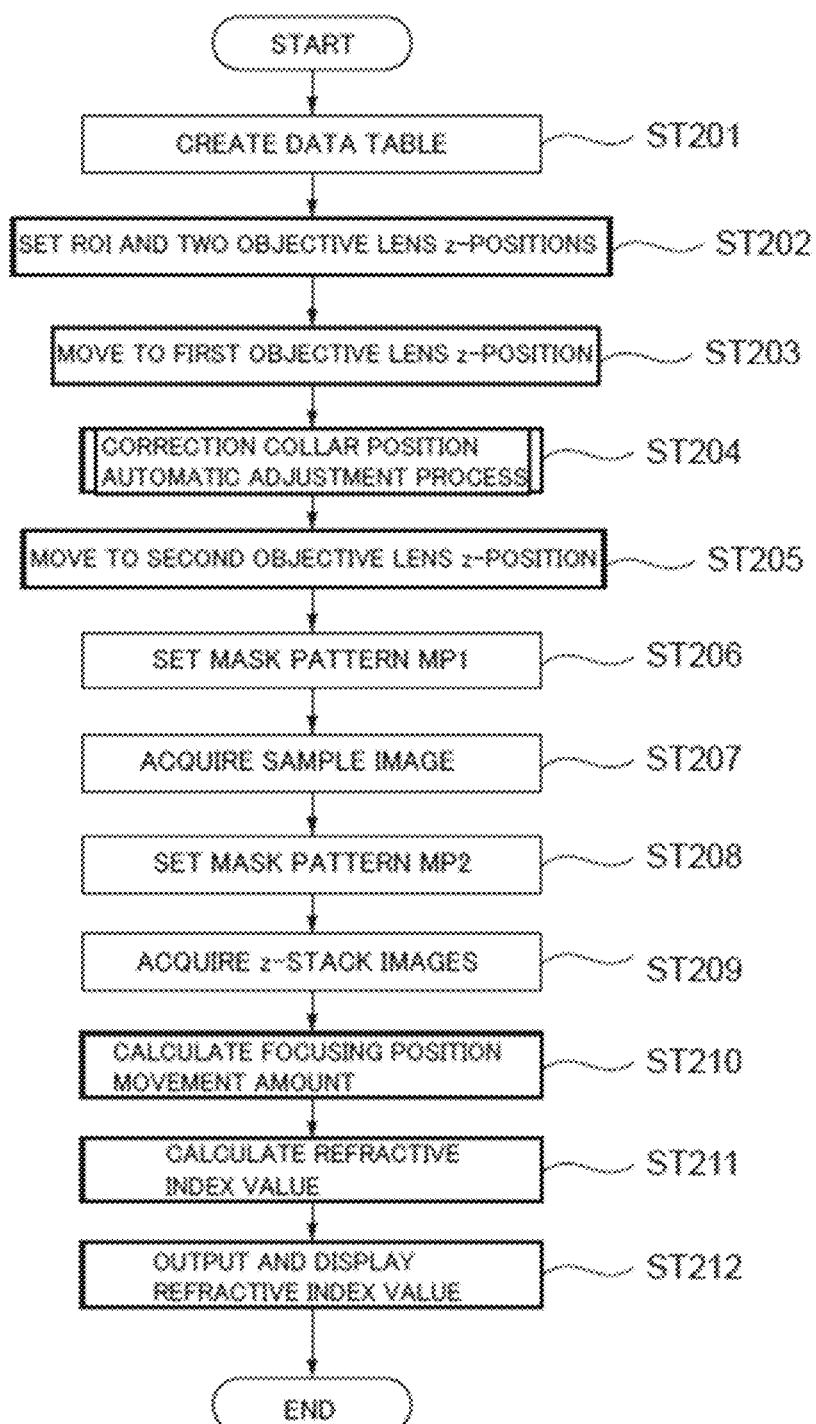
FIG. 16 is a flowchart illustrating a sample refractive index measurement method according to the second embodiment.

FIG. 16 is a flowchart illustrating the sample refractive index measurement method according to the second embodiment. Processes of steps illustrated in FIG. 16 are executed in accordance with predetermined control programs by the microscope control unit 80A or the arithmetic apparatus 91 of the information processing apparatus 90. First, in step ST201, similarly to step ST101 in the first embodiment, a data table is created in advance. As the data table, the setting data table DB1 (see FIG. 7) similar to that of the first embodiment is used. In the second embodiment also, it is possible to create the setting data table DB1 (corresponding to seventh information according to the present invention) by performing an optical simulation in advance and by obtaining the relationship between plural sample refractive indices n and the L-$\Delta$L change ratios $m_{fc}$.

In step ST202, similarly to step ST102 in the first embodiment, the xy-direction position of the sample whose refractive index is obtained and plural (two in the present embodiment) objective lens z-positions L for which the movement amounts of the focusing position are obtained are set. Similar to the first embodiment, by using the GUI to be displayed on the display unit 95, the user can set the observation region ROI and set two objective lens z-positions (referred to as $L_{2\_1}$ and $L_{2\_2}$). Note that the two objective lens z-positions may be defined in advance.

In step ST203, the objective lens 30A is moved to the first objective lens z-position $L_{2\_1}$ which is defined in step ST202.

In step ST204, a correction collar position automatic adjustment process which will later be described in detail is performed. Accordingly, a correction collar position becomes optimal at the first objective lens z-position $L_{2\_1}$, and the spherical aberration amount becomes the minimum. Thus, even if the mask patterns of the mask 27 are changed between the two mask patterns MP1 and MP2 in this state, a movement of the focusing position hardly occurs. Note that in a case where the focusing position is also changed when the correction collar position is changed, $L_{2\_1}$ is substituted by $LP_S$ which is calculated in step ST227 described later, and $L_{2\_2}$ is substituted by $L_{2\_2}-(LP_S-L_{2\_1})$.

In step ST205, the objective lens 30A is moved to the second objective lens z-position $L_{2\_2}$ which is defined in step ST202.

In step ST206 to step ST210, processes similar to step ST104 to step ST108 in the first embodiment are performed. Accordingly, the movement amount $\Delta L_{TE}$ of the focusing position at the second objective lens z-position $L_{2\_2}$ (which corresponds to eighth information according to the present invention) is calculated.

Figure 17:
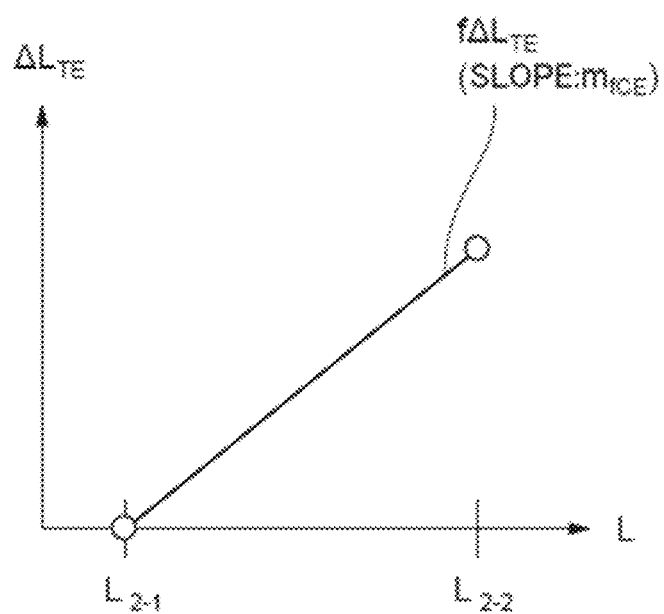
FIG. 17 is a graph illustrating a relationship between an objective lens z-position and a movement amount of a focusing position in a z direction according to the second embodiment.

In step ST211, the sample refractive index value is calculated. The sample refractive index value is calculated as follows, for example. First, as illustrated in FIG. 17, on a coordinate diagram in which the objective lens z-position L is set as the horizontal axis and the movement amount $\Delta L_{TE}$ of the focusing position is set as the vertical axis, a corresponding point at which the first objective lens z-position $L_{2\_1}$ corresponds to the movement amount $\Delta L_{TE}$ (=0) of the focusing position and a corresponding point at which the second objective lens z-position $L_{2\_2}$ corresponds to the movement amount $\Delta L_{TE}$ of the focusing position are plotted. Then, a straight line f$\Delta L_{TE2}$ which connects the two plotted corresponding points is obtained, and the slope $m_{fcE}$ (corresponding to ninth information of the present invention) of the straight line f$\Delta L_{TE}$ is calculated. As described above, because the movement amount of the focusing position at the first objective lens z-position is hardly present, the slope $m_{fcE}$ can be calculated by the following expression (3).

[Math. 3]

$$m_{fcE} = \Delta L_{TE}/(L_{2-2} - L_{2-1}) \tag{3}$$

The calculated slope $m_{fcE}$ is collated with the setting data table DB1 (see FIG. 7) created in step ST201, and the sample refractive index is thereby calculated. In step ST212, similarly to step ST111 in the first embodiment, the calculated sample refractive index is presented to the user.

Figure 18:
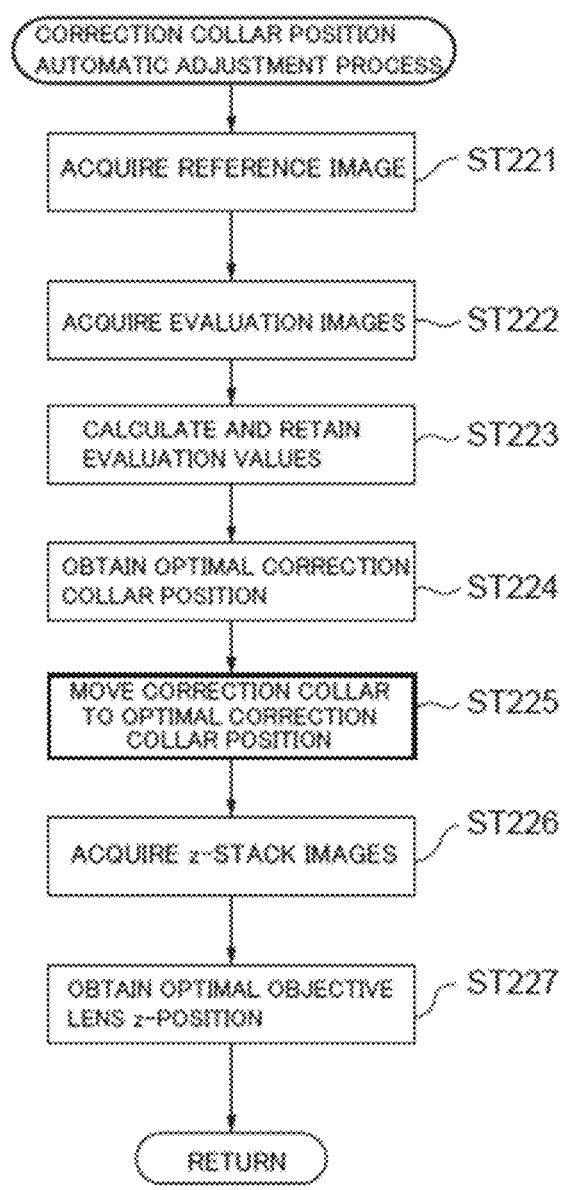
FIG. 18 is a flowchart illustrating details of a correction collar position decision process according to the second embodiment.

Here, details of the correction collar position automatic adjustment process will be described. FIG. 18 is a flowchart illustrating details of the correction collar position automatic adjustment process. In step ST221, the microscope control unit 80A acquires an image of the sample TP. The image of the sample TP which is acquired in step ST221 is set as a reference image of the sample TP. In the following, a rotation position of the correction collar 32 in acquisition of the reference image may be referred to as a reference correction collar position CA, and a position of the objective lens 30A may be referred to as a reference objective lens z-position LA. The microscope control unit 80A causes the light source unit 16 to emit the laser light (excitation light). Further, the detection control unit 82 of the microscope control unit 80A transmits a control signal to the detection unit 51, and the detection unit 51 which receives the control signal outputs a detection signal of light (fluorescence) from the sample TP to the arithmetic apparatus 91 of the information processing apparatus 90 via the detection control unit 82. The arithmetic apparatus 91 of the information processing apparatus 90 performs a process of aligning the detection signal (the above-described data of one pixel) of the light which is input from the detection unit 51 synchronously with a two-dimensional scan by the scanner 24 and thereby generates the reference image of the sample TP. The arithmetic apparatus 91 of the information processing apparatus 90 outputs generated reference image data of the sample TP to the storage unit 92.

In step ST222, the correction collar control unit 88 of the microscope control unit 80A rotates and moves the correction collar 32 to a rotation position in an initial state, and an objective z-position control unit 85 moves, in the z direction, the objective lens 30A to a position in an initial state. In the following, the rotation position of the correction collar 32 in the initial state may be referred to as an initial state correction collar position $C_{A0}$, and the position of the objective lens 30A in the initial state may be referred to as an initial state objective lens z-position $L_{A0}$. Subsequently, the microscope control unit 80A acquires plural kinds of evaluation images of the sample TP in a case where the rotation position C of the correction collar 32 is changed from the initial state correction collar position $C_{A0}$ by predetermined rotation movement amounts and the position L of the objective lens 30A is changed from the initial state objective lens z-position $L_{A0}$ by predetermined movement amounts. Note that at each of the rotation positions C of the correction collar 32 and each of the positions L of the objective lens 30A, one evaluation image may be acquired, or plural evaluation images may be acquired. In this case, the correction collar control unit 88 of the microscope control unit 80A transmits a control signal to the correction collar driving unit 63, and the correction collar driving unit 63 which receives the control signal rotates and moves the correction collar 32 from the initial state correction collar position $C_{A0}$ by the predetermined rotation movement amount at each time. The objective z-position control unit 85 of the microscope control unit 80A transmits a control signal to an objective z-position driving unit 62, and the objective z-position driving unit 62 which receives the control signal moves, in the z direction, the objective lens 30A from the initial state objective lens z-position $L_{A0}$ by the predetermined movement amount at each time. At each of the rotation positions of the correction collar 32 and each of the positions of the objective lens 30A, the microscope control unit 80A causes the light source unit 16 to emit the laser light (excitation light). Further, the detection control unit 82 of the microscope control unit 80A transmits a control signal to the detection unit 51, and the detection unit 51 which receives the control signal outputs a detection signal of light (fluorescence) from the sample TP to the arithmetic apparatus 91 of the information processing apparatus 90 via the detection control unit 82 of the microscope control unit 80A. The arithmetic apparatus 91 of the information processing apparatus 90 performs a process of aligning the detection signal (the above-described data of one pixel) of the light which is input from the detection control unit 82 synchronously with a two-dimensional scan by the scanner 24 and thereby generates the evaluation image of the sample TP. The arithmetic apparatus 91 outputs generated evaluation image data of the sample TP to the storage unit 92.

In step ST223, the arithmetic apparatus 91 of the information processing apparatus 90 respectively obtains correlation values between the reference image data of the sample TP, which are stored in the storage unit 92, and the plural kinds of evaluation image data of the sample TP, which are generated in step ST222. The arithmetic apparatus 91 selects the evaluation images at the positions of the objective lens 30A, at which the correlation values with the reference image data of the sample TP become maximums, among the evaluation images of the sample TP, for which the rotation position of the correction collar 32 is the same but the positions L of the objective lens 30A are different, as the evaluation images at the respective rotation positions of the correction collar 32. As for each of the rotation positions of the correction collar 32, the arithmetic apparatus 91 obtains an evaluation value v based on the selected evaluation image data of the sample TP. The arithmetic apparatus 91 retains data of the obtained evaluation values v and data of the rotation positions C of the correction collar 32 which correspond to the evaluation values v by causing the storage unit 92 to store those. As the evaluation value v, for example, a contrast of the image, an integrated value of signal intensities (luminance) of the image, an integrated value of frequency components in a predetermined frequency region which can be obtained by performing a Fourier transform for the signal intensities of the image, and so forth can be used. Further, as the evaluation value v, the correlation value among plural images, which are acquired under conditions of the same rotation position C of the correction collar 32 and the same position L of the objective lens 30A, may be used.

Figure 19:
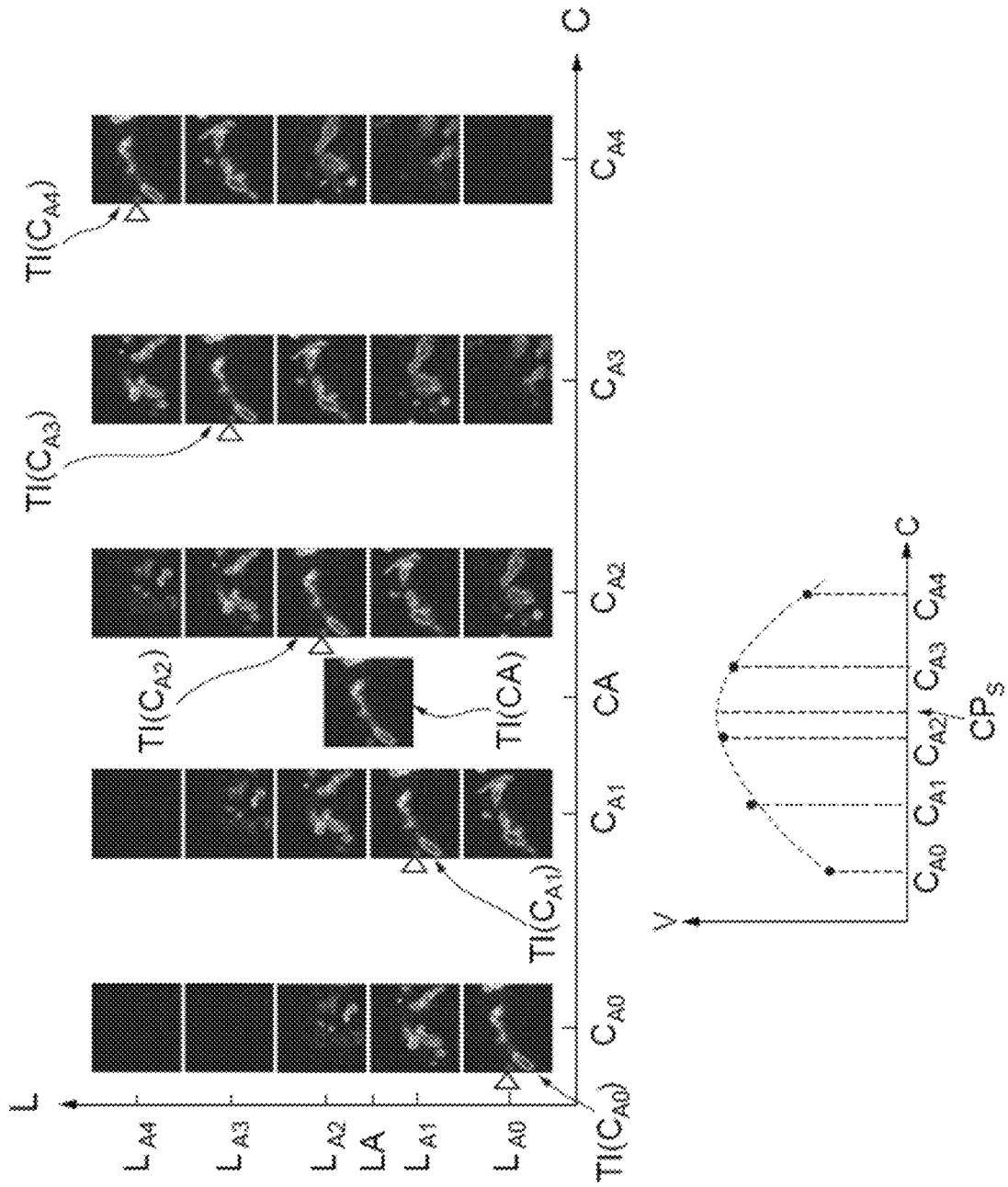
FIG. 19 is a graph illustrating examples of evaluation values in the correction collar position decision process according to the second embodiment.

FIG. 19 is a graph illustrating examples of the evaluation value v which can be obtained by changing the rotation position C of the correction collar 32. As illustrated in FIG. 19, in a case where a designated number of times in which the rotation position C of the correction collar 32 is changed is set to four times from the initial state correction collar position $C_{A0}$, the microscope control unit 80A first acquires a reference image TI (CA) of the sample TP. In addition to that, at the initial state correction collar position $C_{A0}$ in which the correction collar 32 is already rotated and moved from the reference correction collar position CA by a predetermined initial rotation amount, the microscope control unit 80A acquires the evaluation images of the sample TP when the position of the objective lens 30A is displaced to the initial state objective lens z-position $L_{40}$ and to four positions $L_{A1}$ to $L_{A4}$. Among those evaluation images, the arithmetic apparatus 91 of the information processing apparatus 90 selects the evaluation image at the initial state objective lens z-position $L_{40}$, which is indicated by a first Δ sign from the left side in FIG. 19 and whose correlation value becomes the maximum, as the evaluation image TI ($C_{A0}$) at the initial state correction collar position $CA_0$.

At a rotation position $C_{A1}$ in which the correction collar 32 is already rotated and moved by a first rotation amount from the initial state correction collar position $C_{A0}$, the microscope control unit 80A acquires the evaluation images of the sample TP when the position of the objective lens 30A is displaced to the initial state objective lens z-position $L_{40}$ and to the four positions $L_{A1}$ to $L_{A4}$. Among those evaluation images, the arithmetic apparatus 91 of the information processing apparatus 90 selects the evaluation image at the position $L_{A1}$ of the objective lens 30A, which is indicated by a second Δ sign from the left side in FIG. 19 and whose correlation value becomes the maximum, as the evaluation image TI ($C_{A1}$) at the rotation position $C_{A1}$ of the correction collar 32. At a rotation position $C_{A2}$ in which the correction collar 32 is already rotated and moved by a second rotation amount from the initial state correction collar position $C_{A0}$, the microscope control unit 80A acquires the evaluation images of the sample TP when the position L of the objective lens 30A is displaced to the initial state objective lens z-position $L_{40}$ and to the four positions $L_{A1}$ to $L_{A4}$. Among those evaluation images, the arithmetic apparatus 91 of the information processing apparatus 90 selects the evaluation image at the position $L_{A2}$ of the objective lens 30A, which is indicated by a third Δ sign from the left side in FIG. 19 and whose correlation value becomes the maximum, as the evaluation image TI ($C_{A2}$) at the rotation position $C_{A2}$ of the correction collar 32.

At a rotation position $C_{A3}$ in which the correction collar 32 is already rotated and moved by a third rotation amount from the initial state correction collar position $C_{A0}$, the microscope control unit 80A acquires the evaluation images of the sample TP when the position L of the objective lens 30A is displaced to the initial state objective lens z-position $L_{40}$ and to the four positions $L_{A1}$ to $L_{A4}$. Among those evaluation images, the arithmetic apparatus 91 of the information processing apparatus 90 selects the evaluation image at the position $L_{A3}$ of the objective lens 30A, which is indicated by a fourth Δ sign from the left side in FIG. 19 and whose correlation value becomes the maximum, as the evaluation image TI ($C_{A3}$) at the rotation position $C_{A3}$ of the correction collar 32. At a rotation position $C_{A4}$ in which the correction collar 32 is already rotated and moved by a fourth rotation amount from the initial state correction collar position $C_{A0}$, the microscope control unit 80A acquires the evaluation images of the sample TP when the position L of the objective lens 30A is displaced to the initial state objective lens z-position $L_{40}$ and to the four positions $L_{A1}$ to $L_{A4}$. Among those evaluation images, the arithmetic apparatus 91 of the information processing apparatus 90 selects the evaluation image at the position $L_{A4}$ of the objective lens 30A, which is indicated by a fifth Δ sign from the left side in FIG. 19 and whose correlation value becomes the maximum, as the evaluation image TI ($C_{A4}$) at the rotation position $C_{A4}$ of the correction collar 32. Based on the selected evaluation image data, the arithmetic apparatus 91 of the information processing apparatus 90 can obtain the evaluation values v at the initial state correction collar position $C_{A0}$ and the rotation positions $C_{A1}$ to $C_{A4}$ which correspond to one to four movements from the initial state correction collar position $C_{A0}$.

In step ST224, the arithmetic apparatus 91 of the information processing apparatus 90 obtains an optimal correction collar position $CP_S$ of the correction collar 32 based on the evaluation values v at plural rotation positions of the correction collar 32, the evaluation values v being stored in the storage unit 92. Specifically, the arithmetic apparatus 91 creates a scatter diagram on which the evaluation values v for the plural rotation positions of the correction collar 32 are plotted. Then, as illustrated in FIG. 19, the arithmetic apparatus 91 performs interpolation or function approximation for the plots and thereby obtains the optimal correction collar position $CP_S$ of the correction collar 32 at which the evaluation value v becomes the maximum. The arithmetic apparatus 91 outputs data of the obtained optimal correction collar position $CP_S$ of the correction collar 32 to the correction collar control unit 88 of the microscope control unit 80A. As a method for performing the interpolation, for example, a method is present which performs Lagrange interpolation or spline interpolation for the plots of the evaluation values v for the plural rotation positions $C_{A0}$ to $C_{A4}$ of the correction collar 32. As a method for performing the function approximation, for example, a method is present in which by the least squares method, a quadratic curve or a Gaussian function is fitted to the plots of the evaluation values v for the plural rotation positions $C_{A0}$ to $C_{A4}$ of the correction collar 32. In accordance with necessity, the obtained optimal correction collar position $CP_S$ may be retained in the storage unit 92.

In step ST225, the correction collar control unit 88 of the microscope control unit 80A transmits a control signal to the correction collar driving unit 63, and the correction collar driving unit 63 which receives the control signal rotates and moves the correction collar 32 to the optimal correction collar position $CP_S$ obtained in step ST224.

In step ST226, the microscope control unit 80A acquires evaluation z-stack images of the sample TP for which the position L of the objective lens 30A is changed in a state where the correction collar 32 is rotated and moved to the optimal correction collar position $CP_S$. In this case, the objective z-position control unit 85 of the microscope control unit 80A transmits a control signal to the objective z-position driving unit 62, and the objective z-position driving unit 62 which receives the control signal moves the objective lens 30A in the z direction. At each of the positions of the objective lens 30A, the microscope control unit 80A causes the light source unit 16 to emit the laser light (excitation light). Further, the detection control unit 82 of the microscope control unit 80A transmits a control signal to the detection unit 51, and the detection unit 51 which receives the control signal outputs a detection signal of the light (fluorescence) from the sample TP to the arithmetic apparatus 91 of the information processing apparatus 90 via the detection control unit 82 of the microscope control unit 80A. The arithmetic apparatus 91 of the information processing apparatus 90 performs a process of aligning the detection signal (the above-described data of one pixel) of the light which is input from the detection control unit 82 synchronously with a two-dimensional scan by the scanner 24 and thereby generates the evaluation z-stack images of the sample TP. The arithmetic apparatus 91 of the information processing apparatus 90 outputs generated evaluation z-stack image data of the sample TP to the storage unit 92.

In step ST227, the arithmetic apparatus 91 of the information processing apparatus 90 respectively obtains correlation values between the reference image data of the sample TP, which are stored in storage unit 92, and the evaluation z-stack image data of the sample TP, which are generated in step ST226. The arithmetic apparatus 91 obtains the position of the objective lens 30A, at which the image whose correlation value becomes the maximum can be obtained, among the evaluation z-stack images of the sample TP as an optimal objective lens z-position $LP_S$. Note that the arithmetic apparatus 91 may create a scatter diagram on which the correlation values for plural positions of the objective lens 30A are plotted. Then, the arithmetic apparatus 91 may perform interpolation or function approximation for the plots and may thereby obtain the position of the objective lens 30A, at which the correlation value becomes the maximum, as the optimal objective lens z-position $LP_S$. In accordance with necessity, an obtained optimal objective lens z-position $LP_S$ may be retained in the storage unit 92.

In the second embodiment, the sample refractive index can be obtained based on the movement amount of the focusing position in the z direction which is produced when a change is performed between the mask patterns MP1 and MP2 at one objective lens z-position between two objective lens z-positions. The obtained sample refractive index can be used for optimizing apparatus parameters in the microscope apparatus 1A.

Third Embodiment

A third embodiment will be described. A microscope apparatus according to the third embodiment is similar to the microscope apparatus 1 according to the first embodiment, and a microscope control unit and an information processing apparatus are similar to the microscope control unit 80 and the information processing apparatus 90 in the first embodiment. The same reference characters are appropriately given to similar configurations to those of the above-described first embodiment, and descriptions thereof will not be made or will be simplified.

Figure 20:
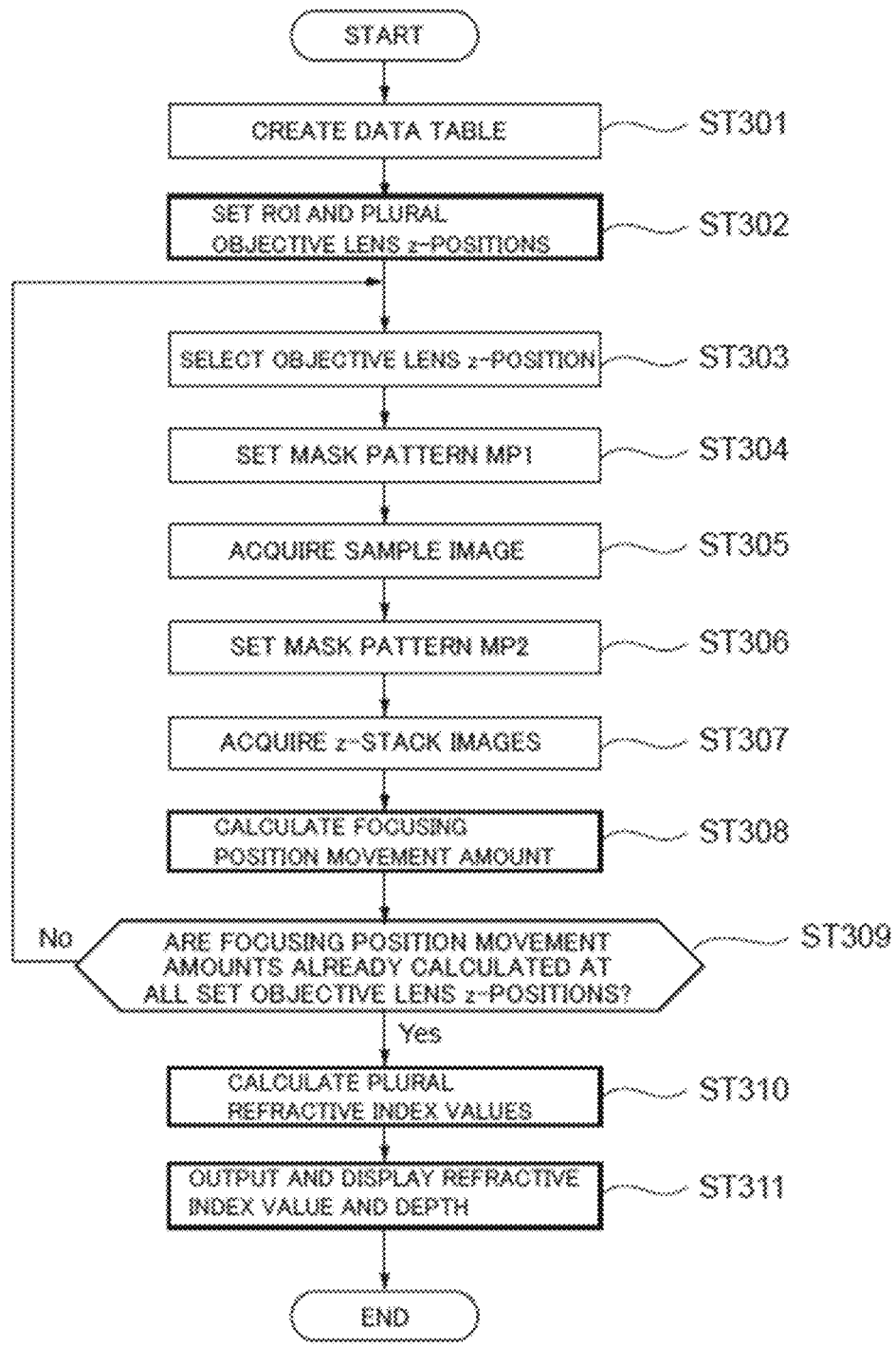
FIG. 20 is a flowchart illustrating a sample refractive index measurement method according to a third embodiment.

FIG. 20 is a flowchart illustrating a sample refractive index measurement method according to the third embodiment. Based on FIG. 20, the sample refractive index measurement method according to the third embodiment will be described. In the sample refractive index measurement method according to the third embodiment, in a case where the sample refractive indices are different among plural depth regions (for example, layer-like regions) of the sample TP, the respective sample refractive indices at the depth regions are calculated. In step ST301 to step ST309, processes similar to step ST101 to step ST109 in the first embodiment are performed.

Figure 21:
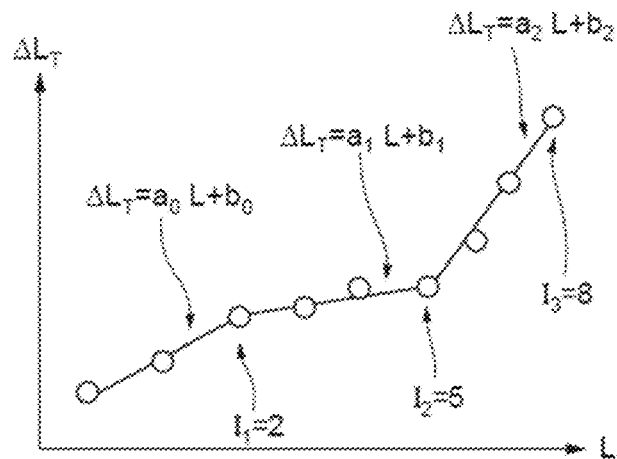
FIG. 21 is a graph illustrating a relationship between an objective lens z-position and a movement amount of a focusing position in a z direction according to the third embodiment.

In step ST310, the sample refractive index value at each of the depth regions of the sample TP is calculated. The refractive index value is calculated as follows, for example. In general, as illustrated in FIG. 21, a scatter diagram is first created on which corresponding points, at which the objective lens z-positions L set in step ST302 correspond to the movement amounts (here, referred to as $\Delta L_T$) of the focusing position, the movement amounts being calculated at the respective objective lens z-positions L in step ST308, are plotted. Then, straight lines are fitted to plots on the created scatter diagram. In a case where the sample refractive indices are different among the depth regions, ratios (L–ΔL change ratios $m_{fc}$) between the objective lens z-position L and the movement amount ΔL of the focusing position are different among the depth regions. Accordingly, for example, the plots are fitted by using a model that represents plural straight lines which are different among the depth regions, and the sample refractive indices for plural depth regions are thereby obtained.

Specifically, combinations of N objective lens z-positions L acquired in step ST303 to step ST309 and the corresponding movement amounts $\Delta L_T$ of the focusing position are set as $(L(i), \Delta L_T(i))$ (i denotes an index representing data, and i=0, 1, . . . , N−1. Further, L(i)<L(i+1)). The N sets of data are fitted by M (M<N) straight lines, and the slopes of the straight lines are obtained as the L-ΔL change ratios for the respective depth regions. FIG. 21 illustrates, as an example, a state where nine sets of data are fitted by three straight lines. In this case, the objective lens z-position L of an intersection point between the different straight lines (a boundary between the adjacent depth regions) is set as a parameter, and the boundary is selected such that an evaluation function described later becomes the minimum. A model of a relationship between the objective lens z-positions represented by the M straight lines with different slopes and the movement amounts $\Delta L_T$ of the focusing position is expressed by the following expression (4).

[Math. 4]

$$\Delta L_T = f(L \mid a_0, a_1, \cdots a_{M-1}, b_0, b_1, \cdots b_{M-2}, I_1, I_2, \cdots I_{M-1}) \quad (4)$$
$$= a_m L + b_m \ (L(I_m) \le L < L(I_{m+1}))$$

Here, $a_0, a_1, \ldots, a_{M-1}$ are M parameters which denote the slopes of the straight lines, and $b_0, b_1, \ldots, b_{M-1}$ are M parameters which denotes intercepts of the straight lines. Terms $I_1, \ldots, I_{M-1}$ denote integers which represent indices of data included in one straight line and satisfies $0<I_1<I_2< \ldots <I_{M-1}<N-1$. The above model is formed with (3M−1) parameters of $a_m$, $b_m$, and $I_m$. The number M and the (3M−1) parameters which best represent acquired data $(L(i), \Delta L_T(i))$ are selected such that the evaluation function expressed by the following expression (5) becomes the minimum.

[Math. 5]

$$s = 2\left[\sum_{i=0}^{N-1}(\Delta L_T(i) - f(L(i)1 \mid a_0, a_1, \ldots a_{M-1}, b_0, b_1, \ldots b_{M-1}, I_1, I_2, \ldots I_{M-1}))^2\right] + \alpha M \quad (5)$$

Here, a term αM is a term of penalty due to an increase in the number of straight lines representing the acquired data. As the value of a coefficient α, a value which can most precisely calculate the refractive index is defined in advance by using samples and so forth whose refractive indices are known, for example.

Based on the slopes $a_0, a_1, \ldots, a_{M-1}$ obtained as described above, similarly to step ST110 in the first embodiment, it is possible to obtain M sample refractive index values $n_0, n_1, \ldots, n_{M-1}$ by referring to the setting data table DB1. Note that in a case where the number M of regions (depth regions) in the z direction in which the sample refractive indices are different is known, M may be fixed. Further, the objective lens z-position L in a case where a focal point of the objective lens 30 is present on a boundary surface where the refractive index changes is obtained as follows. When the objective lens z-position in a case where the focal point of the objective lens 30 is present on the boundary surface between the sample refractive indices nj and nj+1 is set as $L_j$, $L_j$ can be obtained as the objective lens z-position L of the intersection point between two obtained straight lines which are $\Delta L_T = a_j L + b_j$ and $\Delta L_T = a_{j+1} L + b_{j+1}$. In such a manner, the objective lens z-positions as M−1 refractive index boundaries (referred to as $Lb_0$, $Lb_1$, ..., $Lb_{M-2}$) can be obtained.

Figure 22:
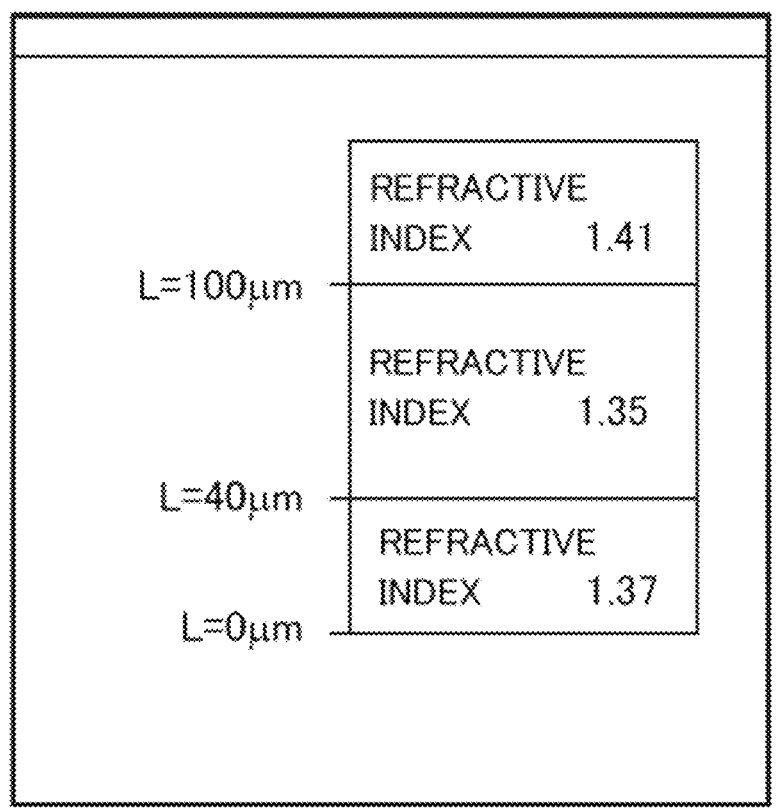
FIG. 22 is a diagram illustrating a relationship between the objective lens z-position and a sample refractive index according to the third embodiment.

In step ST311, plural obtained sample refractive index values and objective lens z-positions L as the boundaries at which the refractive indices are changed are displayed on the GUI to be displayed on the display unit 95 and are thereby presented to the user. For example, as illustrated in FIG. 22, the refractive index values and the objective lens z-positions can be displayed by indicating those by numerical values and diagrams.

In the third embodiment, the refractive indices of the sample TP for the respective depth regions can be obtained based on the movement amounts of the focusing position in the z direction which are produced when changes are performed between the mask patterns MP1 and MP2 at plural objective lens z-positions. The obtained sample refractive index can be used for optimizing apparatus parameters in the microscope apparatus 1.

Fourth Embodiment

A fourth embodiment will be described. A microscope apparatus according to the fourth embodiment is similar to the microscope apparatus 1 according to the first embodiment, and a microscope control unit and an information processing apparatus are similar to the microscope control unit 80 and the information processing apparatus 90 in the first embodiment. The same reference characters are appropriately given to similar configurations to those of the above-described first embodiment, and descriptions thereof will not be made or will be simplified.

In the fourth embodiment, the mask patterns which are changed in the mask 27 are different from those used in the first to third embodiments. Then, when mask patterns are changed, the movement of the focusing position of an optical system including the objective lens 30 is caused not to occur in the z direction but to occur in the xy direction, and the sample refractive index is calculated based on the movement amount of the focusing position in the xy direction. As examples of mask patterns used in the fourth embodiment, FIG. 23 illustrates mask patterns MP3 and MP4. In the mask pattern MP3, a light passing region (a region indicated in white) in a semicircular annular shape is arranged on a negative side in the x direction, and a light transmitting region (a region indicated in white) in a semi-disk shape is arranged on a positive side in the x direction. The mask pattern MP4 forms symmetry with the mask pattern MP3 in the x direction, and a light passing region in a semicircular annular shape is arranged on the positive side in the x direction, and a light transmitting region in a semi-disk shape is arranged on the negative side in the x direction.

FIG. 24 schematically illustrates a shape of a wave surface W(x, y) having a spherical aberration and a shape in a case where the wave surface W(x, y) is differentiated in the x direction (referred to as differentiated wave surface $\Delta_x W(x, y)$). In the diagram of the wave surface W(x, y), for example, a low concentration (bright) region becomes a region which is protruded toward a front side of the page, and a high concentration (dark) region becomes a region which is recessed with respect to the front side of the page. Further, in the diagram of the differentiated wave surface $\Delta_x$ W(x, y), for example, a low concentration (bright) region becomes a region whose slope in the x direction becomes positive (+), and a high concentration (dark) region becomes a region whose slope in the x direction becomes negative (−). When the wave surface W(x, y) is incident on the mask pattern MP3, a portion whose slope becomes negative in the differentiated wave surface $\Delta_x$ W(x, y) passes through the mask pattern MP3, and a portion whose slope becomes positive is blocked. On the other hand, when the wave surface W(x, y) is incident on the mask pattern MP4, the portion whose slope becomes positive in the differentiated wave surface $\Delta_x$ W(x, y) passes through the mask pattern MP4, and the portion whose slope becomes negative is blocked. Thus, the slope of the whole wave surface W(x, y) in the x direction is different between a case where the wave surface W(x, y) passes through the mask pattern MP3 and a case where the wave surface W(x, y) passes through the mask pattern MP4. Accordingly, the movement of the focusing position is produced in the x direction. In the fourth embodiment, the movement amounts of the focusing position in the xy direction between cases of the mask pattern MP3 and cases of the mask pattern MP4 are obtained, and the sample refractive index is calculated based on the movement amounts in the xy direction.

Figure 25:
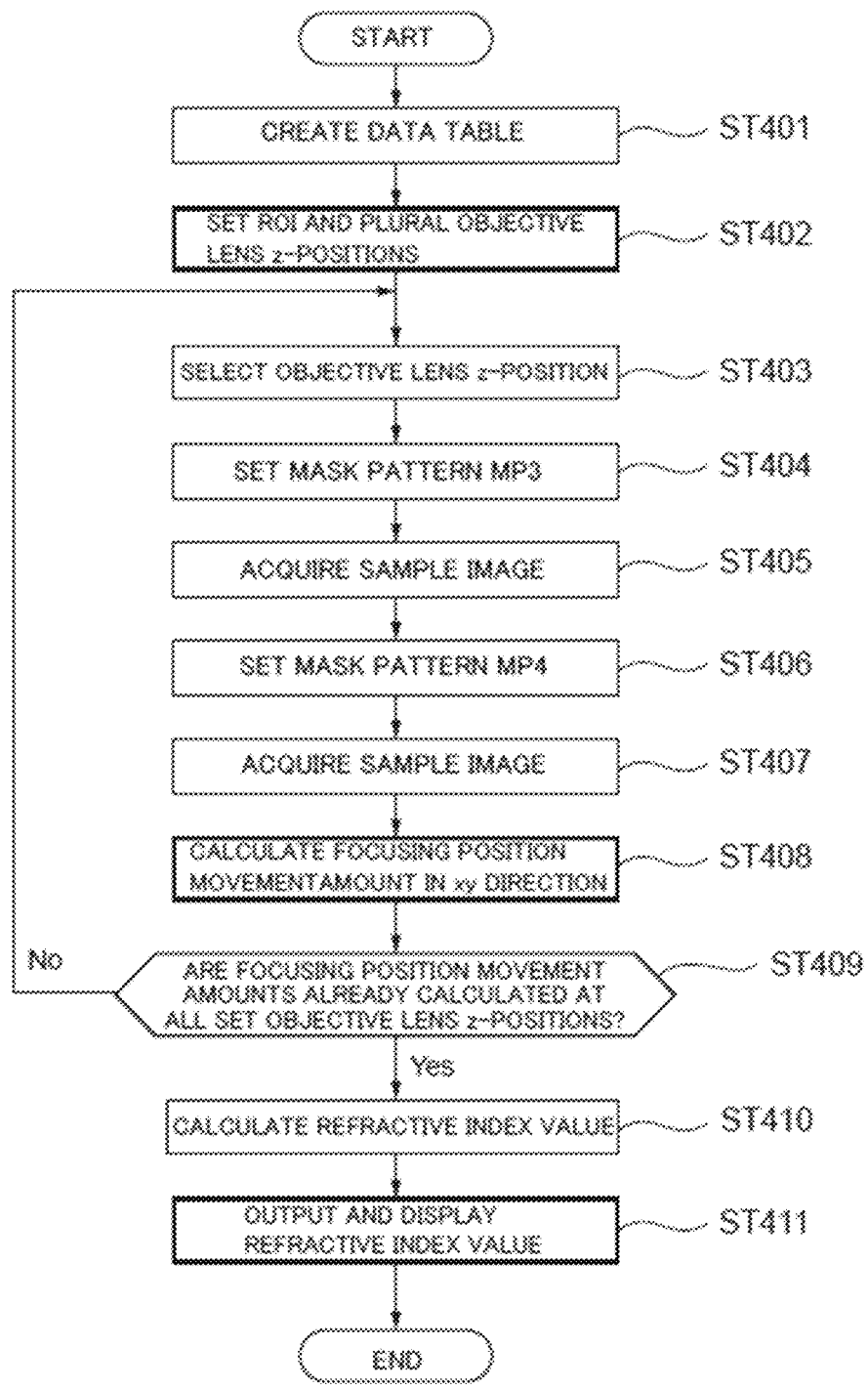
FIG. 25 is a flowchart illustrating a sample refractive index measurement method according to a fourth embodiment.

FIG. 25 is a flowchart illustrating a sample refractive index measurement method according to the fourth embodiment. Based on FIG. 25, the sample refractive index measurement method according to the fourth embodiment will be described. First, in step ST401, a setting data table DB2 (see FIG. 26) is created in advance which represents a relationship between the sample refractive index n and an L-ΔXY change ratio $m_{sc}$. The L-ΔXY change ratio $m_{sc}$ denotes a ratio between the objective lens z-position L and a movement amount $\Delta XY_T$ of the focusing position in the xy direction which is produced when a change is performed between the mask patterns MP3 and MP4.

It is possible to obtain a relationship between the sample refractive index and the L-ΔXY change ratio $m_{sc}$ by performing an optical simulation. Specifically, the sample refractive index, the immersion liquid refractive index, the cover glass thickness, the aberration of an optical system, and the observation depth in the sample are set, and for example, the z-position $L_T$ of the objective lens and an xy position $(X_T, Y_T)$ are thereby obtained at which the Strehl ratio of the PSF (point spread function) becomes the maximum. For example, the objective lens z-position at which the Strehl ratio becomes the maximum in a state where any mask pattern is not installed in an optical path is set as $L_{T0}$, the objective lens z-position and the xy position at which the Strehl ratio becomes the maximum in a state where the mask pattern MP3 is installed in the optical path are set as $L_{T1}$ and $(X_{T1}, Y_{T1})$, and the objective lens z-position and the xy position at which the Strehl ratio becomes the maximum in a state where the mask pattern MP4 is installed in the optical path are set as $L_{T2}$ and $(X_{T2}, Y_{T2})$. In this case, the movement amount $\Delta XY_T$ of the focusing position which is produced when switching is performed between the mask patterns MP3 and MP4 can be obtained by the following expression (6).

[Math. 6]

$$\Delta XY_T = \sqrt{(X_{T2} - X_{T1})^2 + (Y_{T2} - Y_{T1})^2} \qquad (6)$$

For example, at plural observation depths, the objective lens z-positions $L_{T0}$ and the movement amounts $\Delta XY_T$ of the focusing position in the xy direction are obtained, and a scatter diagram is created on which corresponding points at which $L_{T0}$ corresponds to $\Delta XY_T$ are plotted. Then, a straight line is fitted to plots on the created scatter diagram, for example, and the slope of the straight line is obtained as the L-$\Delta XY$ change ratio $m_{sc}$. It is possible to create the setting data table DB2 by setting plural sample refractive indices and by obtaining the L-$\Delta XY$ change ratios $m_{sc}$ in accordance with the respective sample refractive indices. The created setting data table DB2 is retained in the storage unit 92. Note that data tables may be created and retained for plural conditions such as wavelengths and temperatures and may properly be used in accordance with observation conditions.

In step ST402 and step ST403, processes similar to step ST102 and step ST103 in the first embodiment are performed. In step ST404, the mask pattern in the mask 27 is set to the mask pattern MP3. In step ST405, a sample image at a focusing position movement amount calculation z-position Lc in the xy direction, which is selected in step ST403, is acquired.

In step ST406, the mask pattern in the mask 27 is set to the mask pattern MP4. In step ST407, a sample image at the focusing position movement amount calculation z-position Lc, which is selected in step ST403, is acquired. Differently from the first embodiment, z-stack images do not have to be acquired in a state where the second mask pattern MP4 is set, and only one sample image may be acquired.

In step ST408, the movement amount in the xy direction between images is calculated from the image acquired in step ST405 and the image acquired in step ST407. For example, a mutual correlation function between the image acquired in step ST405 and the image acquired in step ST407 is calculated. The movement amount between the images are calculated based on the xy position at which the mutual correlation function takes a peak value, and the movement amount $\Delta XY_T$ of the focusing position in the xy direction is obtained based on the movement amount between the images. In this case, interpolation or function approximation is performed for the mutual correlation function, and a movement amount in subpixels may be calculated. The calculated movement amount $\Delta XY_T$ of the focusing position in the xy direction is retained in the storage unit 92 together with the z-position Lc selected in step ST103.

In step ST409, it is determined whether the movement amounts $\Delta XY_T$ of the focusing position in the xy direction are calculated for all of the objective lens z-positions which are set in step ST402. In a case where calculation is not yet performed for all of those (step ST409: No), the process returns to step ST403, and the objective lens z-position is moved to the next position. In a case where calculation is already performed for all of those (step ST409: Yes), the process moves to step ST410.

Figures 26, 27:
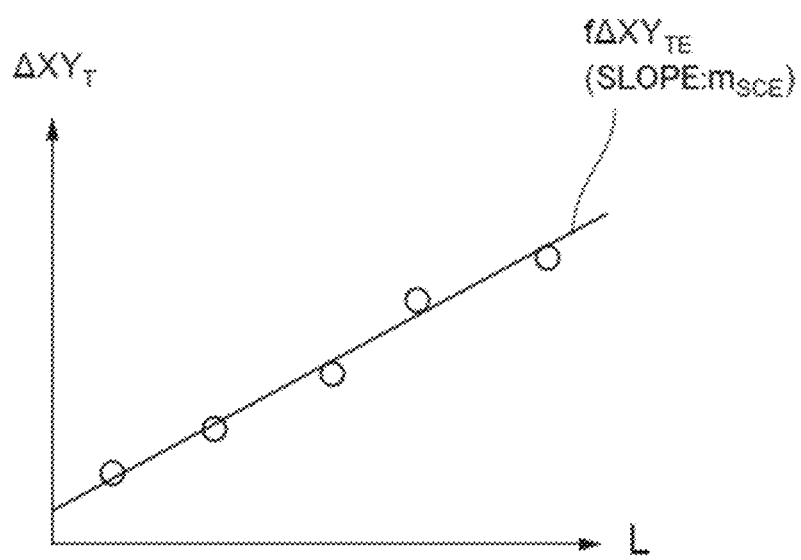
FIG. 26 is a schematic diagram illustrating a setting data table according to the fourth embodiment.
FIG. 27 is a graph illustrating a relationship between an objective lens z-position and a movement amount of at least one of a light condensing position of an excitation light (illumination light) and an image forming position of fluorescence (detection light) in an xy direction, according to the fourth embodiment.

In step ST410, the sample refractive index value is calculated. The sample refractive index value is calculated as follows, for example. First, as illustrated in FIG. 27, a scatter diagram is created on which corresponding points, at which the objective lens z-positions L set in step ST402 correspond to the movement amounts $\Delta XY_T$ of the focusing position in the xy direction, the movement amounts $\Delta XY_T$ being calculated at the respective objective lens z-positions, are plotted. Then, one straight line f$\Delta XY_{TE}$ is fitted to plots on the created scatter diagram, and a slope $m_{scE}$ of the straight line f$\Delta XY_{TE}$ is calculated. The calculated slope $m_{scE}$ is collated with the setting data table DB2 (see FIG. 26) created in step ST401, and the sample refractive index is thereby obtained. For example, the L-$\Delta XY$ change ratio $m_{sc}$, whose value is closest to the calculated slope $m_{scE}$, on the setting data table DB2 is selected, and the value of the refractive index n which corresponds to the selected L-$\Delta XY$ change ratio $m_{sc}$ may be set as the sample refractive index. Further, for example, by interpolating the relationship between the refractive index n on the setting data table DB2 and the L-$\Delta XY$ change ratio $m_{sc}$, the refractive index corresponding to the calculated slope $m_{scE}$ may be calculated.

In step ST411, the sample refractive index calculated in step ST410 is displayed on the GUI to be displayed on the display unit 95 and is thereby presented to the user. Note that also in the first to third embodiments, by using the mask patterns MP3 and MP4 similar to the present embodiment, the sample refractive index may be calculated based on the movement amounts of the focusing position in the xy direction (position movement amounts in the XY direction between acquired sample images) instead of the movement amounts of the focusing position in the z direction of the optical system including the objective lens 30 or 30A. Further, the sample refractive index may be calculated based on both kinds of information of the movement amounts of the focusing position in the z direction in a case where the mask patterns are switched and of the movement amounts of the focusing position in the xy direction.

In the fourth embodiment, the sample refractive index can be obtained based on the movement amounts of the focusing position in the xy direction which are produced when changes are performed between the mask patterns MP3 and MP4 at plural objective lens z-positions. Further, the obtained sample refractive index can be used for optimizing apparatus parameters in the microscope apparatus 1.

Fifth Embodiment

A fifth embodiment will be described. A microscope apparatus according to the fifth embodiment is similar to the microscope apparatus 1 according to the first embodiment, and a microscope control unit and an information processing apparatus are similar to the microscope control unit 80 and the information processing apparatus 90 in the first embodiment. The same reference characters are appropriately given to similar configurations to those of the above-described first embodiment, and descriptions thereof will not be made or will be simplified.

In the fifth embodiment, each of the two mask patterns MP1 and MP2 is set on an optical path, the z-stack images of the sample TP are acquired, and the sample refractive index is thereby measured based on a relative magnification (difference in scale) in the z direction between two sets of acquired z-stack images (the z-stack images in a case of the mask pattern MP1 and the z-stack images in a case of the mask pattern MP2). Because the magnifications in the z direction between the two sets of z-stack images are changed in accordance with the sample refractive index, the sample refractive index can be calculated from the magnifications.

Figure 28:
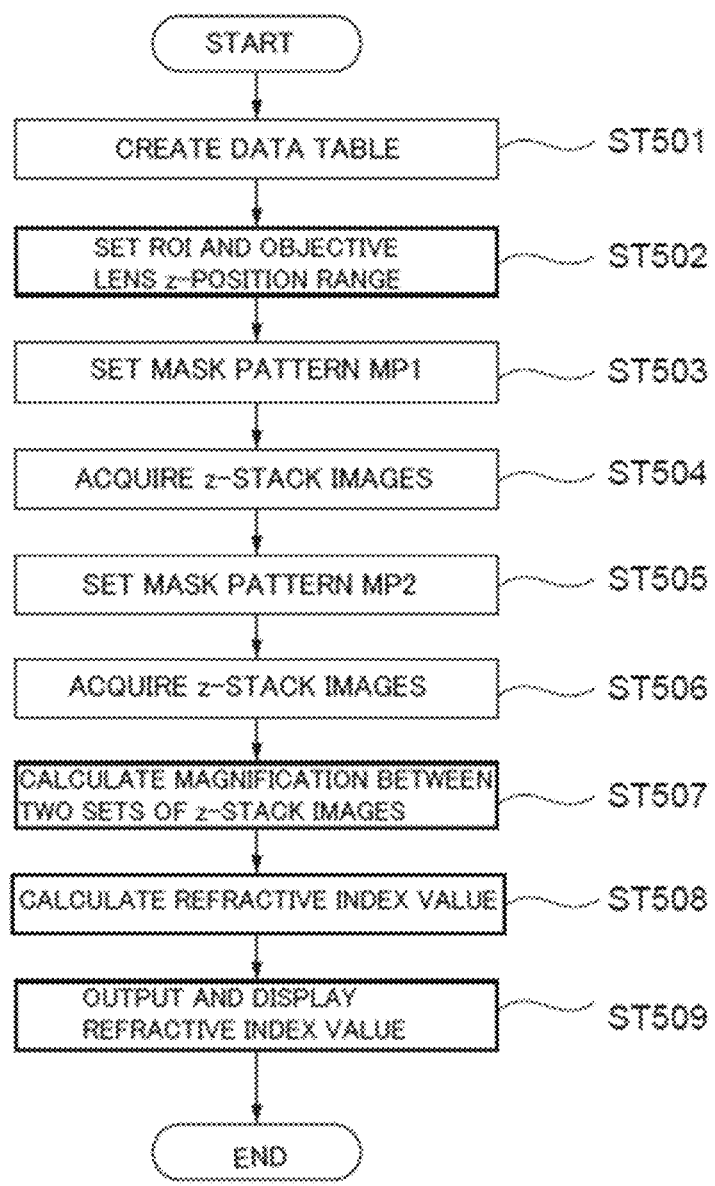
FIG. 28 is a flowchart illustrating a sample refractive index measurement method according to a fifth embodiment.

FIG. 28 is a flowchart illustrating a sample refractive index measurement method according to the fifth embodiment. Based on FIG. 28, the sample refractive index measurement method according to the fifth embodiment will be described. First, in step ST501, a setting data table DB4 (see FIG. 29) is created in advance which represents a relationship between the sample refractive index n and a magnification βz in the z direction between two sets of z-stack images. It is possible to obtain the relationship between the sample refractive index n and the magnification βz by performing an optical simulation.

Specifically, the sample refractive index, the immersion liquid refractive index, the cover glass thickness, the aberration of an optical system, and the observation depth in the sample are set, and for example, the z-position $L_T$ of the objective lens is thereby obtained at which the Strehl ratio of the PSF (point spread function) becomes the maximum. The objective lens z-position at which the Strehl ratio becomes the maximum in a state where the mask pattern MP1 is installed in the optical path is set as $L_{T1}$, and the objective lens z-position at which the Strehl ratio becomes the maximum in a state where the mask pattern MP2 is installed in the optical path is set as $L_{T2}$. The positions $L_{T1}$ and $L_{T2}$ are obtained at plural observation depths, and a scatter diagram is created in which the horizontal axis represents $L_n$ and the vertical axis represents $L_{T2}$. Then, a straight line is fitted to the scatter diagram, for example, and the slope of the straight line is obtained as the magnification βz in the z direction. It is possible to create the setting data table DB4 which represents the relationship between the sample refractive index n and the magnification βz by setting plural sample refractive indices and by obtaining the respective magnification βz. The created setting data table DB4 is retained in the storage unit 92. Note that data tables may be created and retained for plural conditions such as wavelengths and temperatures and may properly be used in accordance with observation conditions.

In step ST502, by using the GUI as illustrated in FIG. 9, the user decides the xy-direction position (x-direction position and y-direction position) of the observation region ROI for acquiring the z-stack images, decides a movable range of the objective lens z-position for acquiring the z-stack images while viewing the sample image TI, and inputs those in the input fields by using the GUI. In the present embodiment, instead of the focusing position movement amount calculation z-position which is input in the first embodiment, two objective lens z-positions which are a z-stack upper end and a z-stack lower end are input. The user operates the start button on the GUI, and the process thereby moves to step ST503 and subsequent steps.

In step ST503, the mask pattern in the mask 27 is set to the mask pattern MP1. In step ST504, the z-stack images of the sample TP (corresponding to a first image according to the present invention) are acquired based on the xy position and the movable range (the z-stack upper end and the z-stack lower end) of the objective lens z-position which are set in step ST502.

In step ST505, the mask pattern in the mask 27 is set to the mask pattern MP2. In step ST506, similarly to step ST504, the z-stack images of the sample TP (corresponding to a second image according to the present invention) are acquired.

Figure 30:
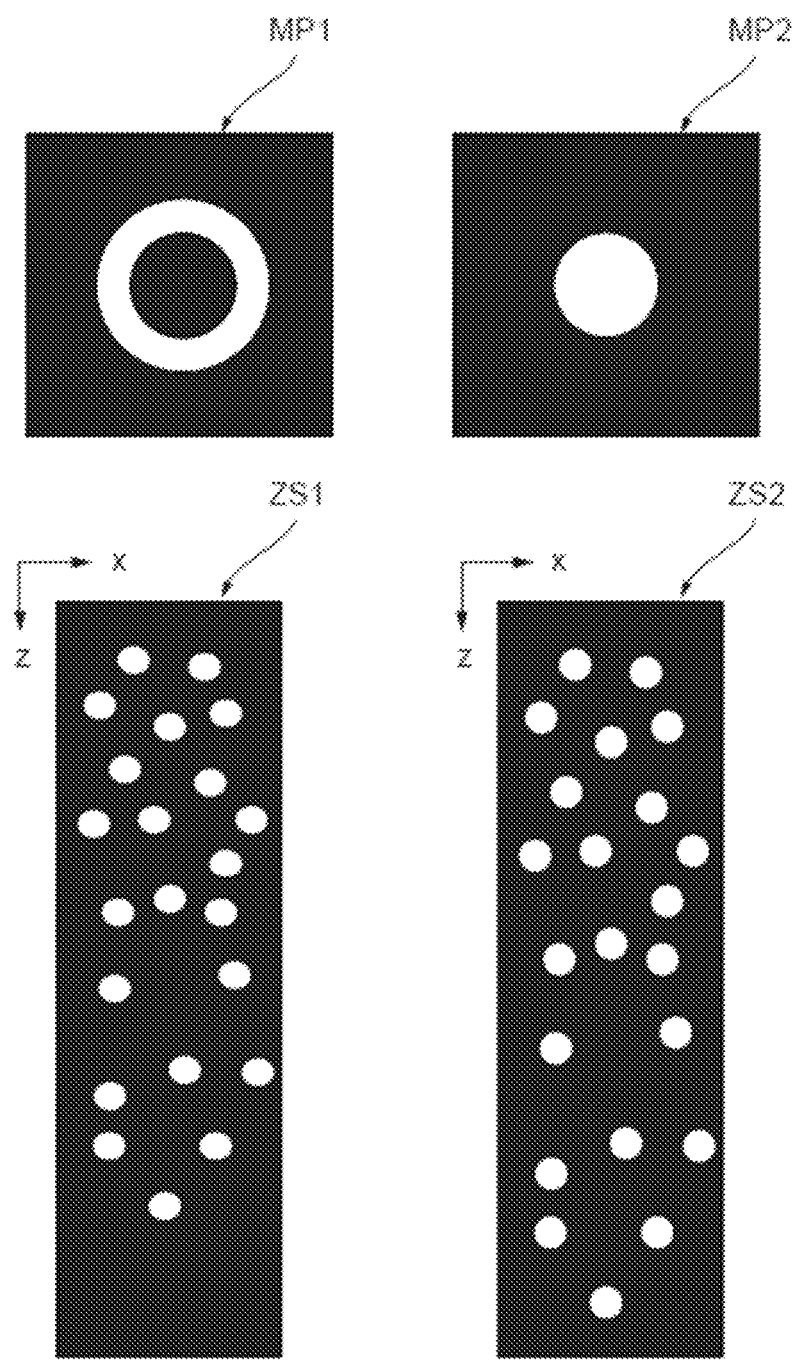
FIG. 30 is a schematic diagram illustrating xz cross-sectional images which respectively correspond to two mask patterns according to the fifth embodiment.

In step ST507, the magnification βz in the z direction between the z-stack images in a case of the mask pattern MP1 which are acquired in step ST504 and the z-stack images in a case of the mask pattern MP2 which are acquired in step ST506 is obtained. It is possible to obtain the magnification βz in the z direction by the following method, for example. First, an xz cross-sectional image ZS1 in a case of the mask pattern MP1 is created based on the z-stack images in a case of the mask pattern MP1, and an xz cross-sectional image ZS2 in a case of the mask pattern MP2 is created based on the z-stack images in a case of the mask pattern MP2 (see FIG. 30). Then, the xz cross-sectional image ZS1 is shrunk or enlarged in the z direction, an image correlation value with the xz cross-sectional image ZS2 is thereby calculated, and an enlarging magnification or a shrinking magnification, at which the correlation value becomes highest, is obtained as the magnification βz in the z direction.

Further, it is also possible to obtain the magnification βz in the z direction by the following method, for example. First, from the z-stack images in a case of the mask pattern MP1, xy cross-sectional images at two arbitrary z-direction positions (set as $z_{1\_1}$ and $z_{1\_2}$) in a case of the mask pattern MP1 are extracted. Further, from the z-stack images in a case of the mask pattern MP2, xy cross-sectional images at all of z-direction positions in a case of the mask pattern MP2 are extracted. Then, based on the fact that the two xy cross-sectional images in a case of the mask pattern MP1 have high correlation values with the xy cross-sectional images at which z-direction positions in a case of the mask pattern MP2, the magnification βz in the z direction can be obtained. Specifically, the image correlation values are calculated between the two xy cross-sectional images in a case of the mask pattern MP1 and the xy cross-sectional images at all of z-direction positions in a case of the mask pattern MP2. When an xy cross-sectional image z-direction position in a case of the mask pattern MP2, which provides the highest correlation value with the xy cross-sectional image at the z-direction position $z_{1\_1}$ in a case of the mask pattern MP1, is set as $z_{2\_1}$ and an xy cross-sectional image z-direction position in a case of the mask pattern MP2, which provides the highest correlation value with the xy cross-sectional image at the z-direction position $z_{1\_2}$ in a case of the mask pattern MP1, is set as $z_{2\_2}$, the magnification βz can be obtained by using the following formula (7).

[Math. 7]

$$βz=(z_{1\_2}-z_{1\_1})/(z_{2\_2}-z_{2\_1}) \quad (7)$$

In step ST508, the magnification βz obtained in step ST507 is collated with the setting data table DB4 which is created in advance in step ST501, and the sample refractive index is thereby obtained. For example, the value of the refractive index n that corresponds to the magnification βz on the setting data table DB4, which is closest to the magnification βz obtained in step ST507, may be set as the sample refractive index. Further, for example, by interpolating the relationship between the refractive index n on the setting data table DB4 and the magnification βz, the refractive index corresponding to the magnification βz obtained in step ST507 may be calculated.

In step ST509, the sample refractive index calculated in step ST508 is displayed on the GUI to be displayed on the display unit 95 and is thereby presented to the user. The calculated sample refractive index values may be retained in the storage unit 92 and be used for other processes. Note that in the present embodiment, the magnifications βz are calculated for plural depth regions, and the respective sample refractive indices for the depth regions may be calculated.

In the fifth embodiment, the sample refractive index can be obtained based on the magnifications between the sets of z-stack images which are acquired by performing changes between the mask patterns MP1 and MP2. The obtained sample refractive index can be used for optimizing apparatus parameters in the microscope apparatus 1.

Sixth Embodiment

A sixth embodiment will be described. A microscope apparatus according to the sixth embodiment is similar to the microscope apparatus 1A according to the second embodiment, and a microscope control unit and an information processing apparatus are similar to the microscope control unit 80A and the information processing apparatus 90 in the second embodiment. The same reference characters are appropriately given to similar configurations to those of the above-described second embodiment, and descriptions thereof will not be made or will be simplified.

In the sixth embodiment, by using plural sample refractive indices for respective depth regions which can be obtained by the sample refractive index measurement method according to the third embodiment, the correction collar positions are set to optimal states with respect to the respective depth regions, and the z-stack images of the sample TP are thereby acquired. In the following, the optimal position of the correction collar 32 at a certain observation depth may be referred to as CP, and the optimal objective lens z-position may be referred to as LP. In the sixth embodiment, first, the z-position L of the objective lens 30A when the focusing position of the optical system including the objective lens 30A is at the position of a certain observation depth d is obtained. Next, the optimal correction collar position CP of the correction collar 32 and the optimal objective lens z-position LP of the objective lens 30A at the observation depth d are experimentally obtained. Then, the optimal correction collar positions CP of the correction collar 32 and the optimal objective lens z-positions LP of the objective lens 30A at other observation depths are obtained based on the plural sample refractive indices at the respective depth regions which are obtained in the third embodiment and the plural objective lens z-positions when the focusing positions of the optical system including the objective lens 30A are present in the boundary positions between the sample refractive indices.

Figure 31:
FIG. 31 is a schematic diagram illustrating a setting data table according to a sixth embodiment.

In the sixth embodiment, the storage unit 92 of the information processing apparatus 90 stores a setting data table DB3 illustrated in FIG. 31. As illustrated in FIG. 31, the setting data table DB3 is a data table which represents a relationship among the refractive index n of the sample TP, a CP-d change ratio $m_{CP}$, an LP-d change ratio mu, and an L'-d change ratio $m_{L'}$ (details of L' will be described later).

Figure 32A:
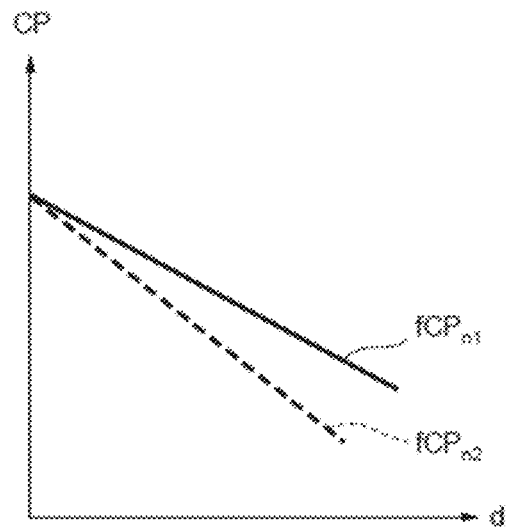

Here, the CP-d change ratio $m_{CP}$ is a ratio between a change amount in the observation depth d and a change amount in the optimal correction collar position CP of the correction collar 32, the change amount corresponding to a change in the observation depth d. For example, as illustrated in FIG. 32A, the relationship between the observation depth d and the optimal correction collar position CP in a case where the refractive index of the sample is $n_1$ can be represented by a straight line $fCP_{n1}$. The relationship between the observation depth d and the optimal correction collar position CP in a case where the refractive index of the sample TP is $n_2$ can be represented by a straight line $fCP_{n2}$. In this case, the CP-d change ratio $m_{CP}$ in a case where the refractive index of the sample TP is $n_1$ is obtained as the slope of the straight line $fCP_{n1}$. The CP-d change ratio $m_{CP}$ in a case where the refractive index of the sample TP is $n_2$ is obtained as the slope of the straight line $fCP_{n2}$ which is different from the slope of the straight line $fCP_{n1}$.

Figure 32B:
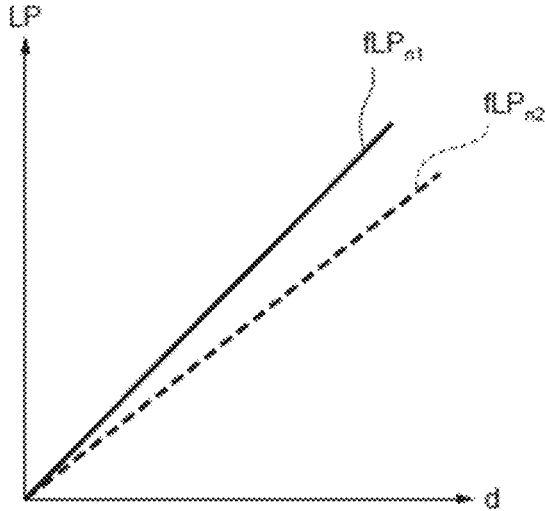

The LP-d change ratio $m_{LP}$ is a ratio between a change amount in the observation depth d and a change amount in the optimal objective lens z-position LP of the objective lens 30A, the change amount corresponding to a change in the observation depth d. The optimal objective lens z-position LP of the objective lens 30A is the optimal position of the objective lens 30A that results from correction of a displacement of the position of the focal point PF, the displacement corresponding to rotation of the correction collar 32 (see FIG. 33). For example, as illustrated in FIG. 32B, the relationship between the observation depth d and the optimal objective lens z-position LP in a case where the refractive index of the sample is $n_1$ can be represented by a straight line $fLP_{n1}$. The relationship between the observation depth d and the optimal objective lens z-position LP in a case where the refractive index of the sample TP is $n_2$ can be represented by a straight line $fLP_{n2}$. In this case, the LP-d change ratio $m_{LP}$ in a case where the refractive index of the sample TP is $n_1$ is obtained as the slope of the straight line $fLP_{n1}$. The LP-d change ratio $m_{LP}$ in a case where the refractive index of the sample TP is $n_2$ is obtained as the slope of the straight line $fLP_{n2}$ which is different from the slope of the straight line $fLP_{n1}$.

Figure 32C:
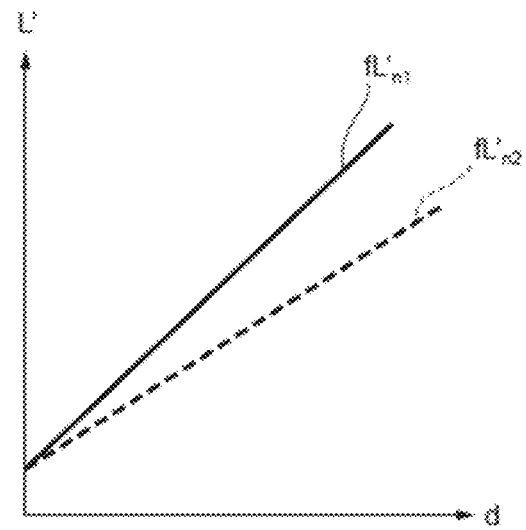

The L'-d change ratio $m_{L'}$ is a ratio between a change amount in the observation depth d and a change amount in a position L' of the objective lens 30A, the change amount corresponding to a change in the observation depth d. The position L' of the objective lens 30A is the z-position of the objective lens 30A in a case where it is assumed that the rotation position C of the correction collar C is fixed and where the focal point PF of the objective lens 30A is in a position of the observation depth d. For example, as illustrated in FIG. 32C, the relationship between the observation depth d and the z-position L' of the objective lens 30A in a case where the refractive index of the sample TP is $n_1$ can be represented by a straight line $fL'_{n1}$. The relationship between the observation depth d and the z-position L' of the objective lens 30A in a case where the refractive index of the sample TP is $n_2$ can be represented by a straight line $fL'_{n2}$. In this case, the L'-d change ratio $m_{L'}$ in a case where the refractive index of the sample TP is $n_1$ is obtained as the slope of the straight line $fL'_{n1}$. The L'-d change ratio $m_{L'}$ in a case where the refractive index n of the sample TP is $n_2$ is obtained as the slope of the straight line $fL'_{n2}$ which is different from the slope of the straight line $fL'_{n1}$.

Figure 33:
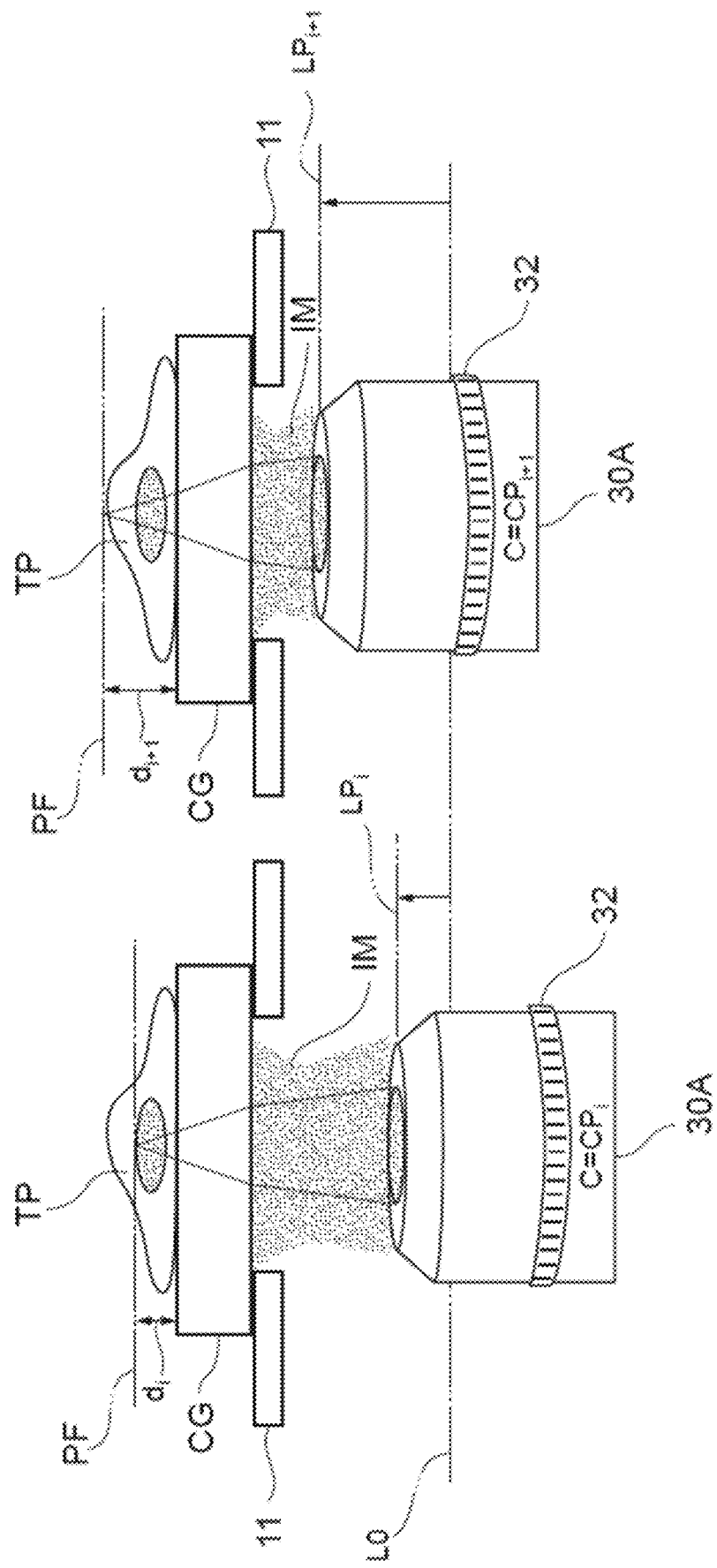
FIG. 33 is an explanatory diagram illustrating a relationship among the observation depth, the optimal rotation position of the correction collar, and the optimal position of the objective lens.
Figure 34:
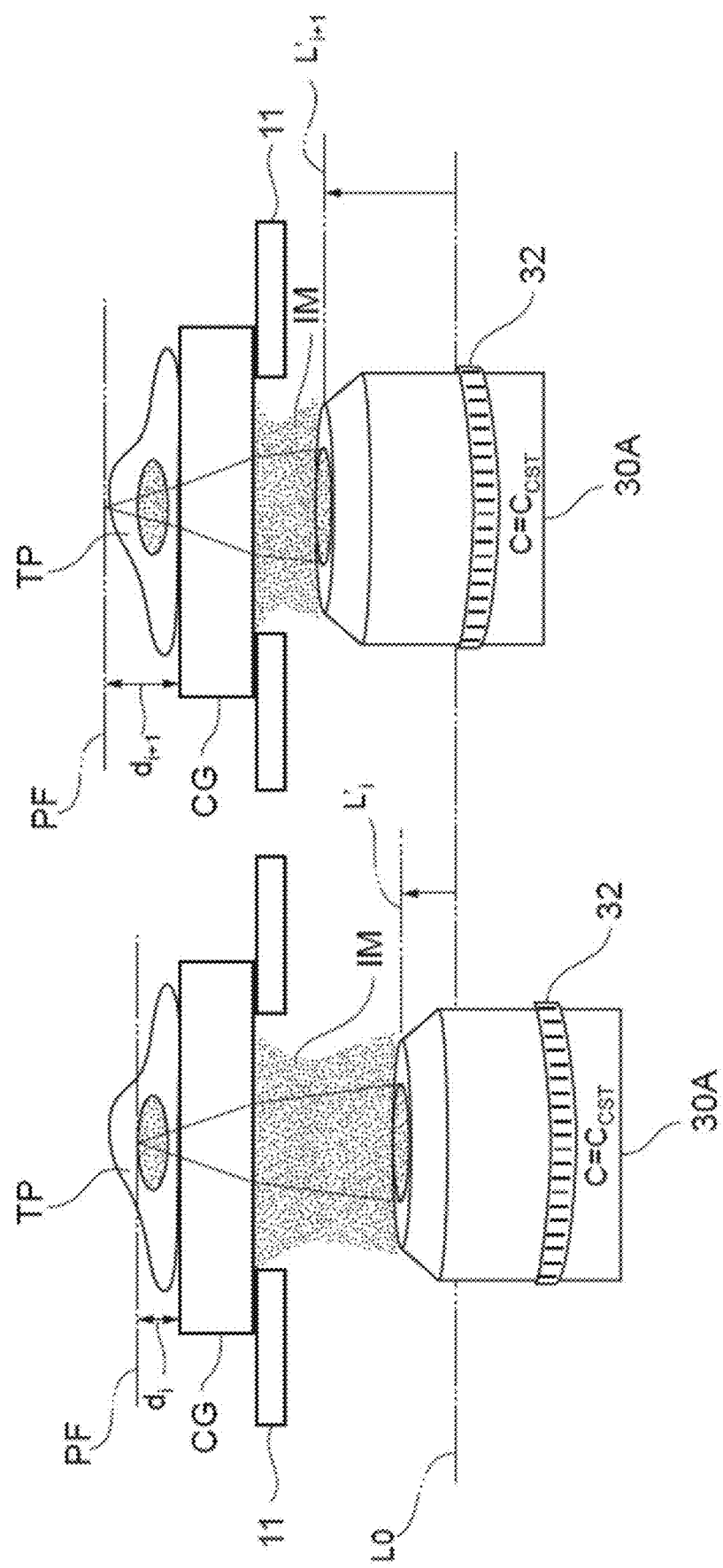
FIG. 34 is an explanatory diagram illustrating a relationship among the observation depth, the optimal rotation position of the correction collar, and the position of the objective lens in a case where the rotation position of the correction collar is fixed.

Note that as illustrated in FIG. 33, in a case where the rotation position of the correction collar 32 is displaced from $CP_i$ to $CP_{i+1}$ when the observation depth is displaced from $d_i$ to an observation depth $d_{i+1}$, it is assumed that the position of the objective lens 30A is displaced from $LP_i$ to $LP_{i+1}$. As illustrated in FIG. 34, in a case where the rotation position of the correction collar 32 is fixed to a fixed position ($C=C_{CST}$) when the observation depth is displaced from $d_i$ to the observation depth $d_{i+1}$, it is assumed that the position of the objective lens 30A is displaced from $L'_i$ to $L'_{i+1}$. A displacement amount ($L_{i+1}-L_i$) of the objective lens 30A when the rotation position of the correction collar 32 is displaced is different from a displacement amount ($L'_{i+1}-L'_i$) of the objective lens 30A in a case where the rotation position of the correction collar 32 is fixed.

Figure 35:
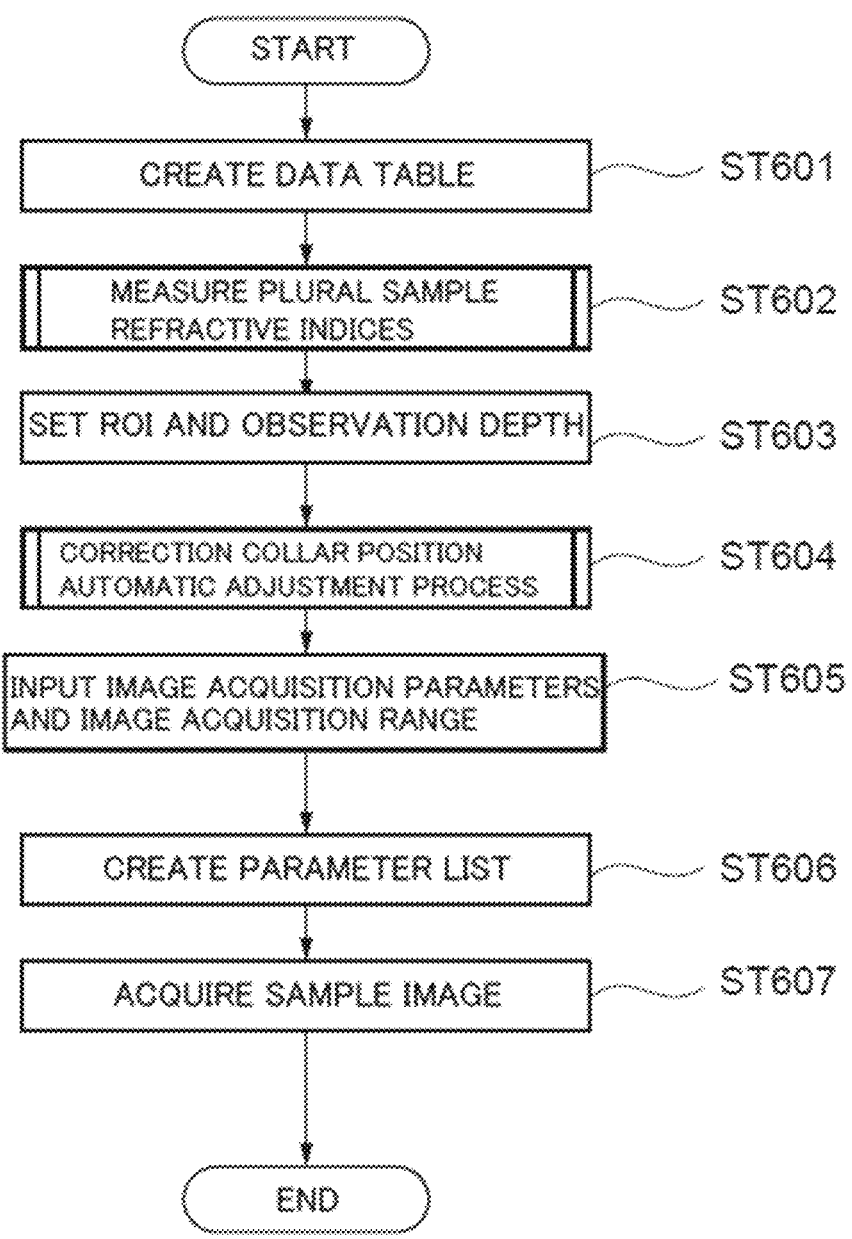
FIG. 35 is a flowchart illustrating a sample refractive index measurement method according to the sixth embodiment.

FIG. 35 is a flowchart illustrating a sample refractive index measurement method according to the sixth embodiment. Based on FIG. 35, a description will be made about the sample refractive index measurement method and a method for acquiring a sample image according to the sixth embodiment. First, in step ST601, the setting data table DB3 (corresponding to fourth information according to the present invention) is created. It is possible to create the setting data table DB3 by performing an optical simulation in advance and by obtaining the CP-d change ratio $m_{CP}$, the LP-d change ratio $m_{LP}$, and the L'-d change ratio $m_{L'}$ with respect to plural refractive indices. Specifically, by performing the optical simulation, the CP-d change ratio $m_{CP}$ and the LP-d change ratio $m_{LP}$ are obtained. In this case, first, at a certain observation depth d in the sample TP and in a two-dimensional parameter space of the rotation position C of the correction collar 32 and the position L of the objective lens 30A, the rotation position C of the correction collar 32 and the position L of the objective lens 30A are obtained which provide the best image forming state. Specifically, the sample refractive index, the cover glass thickness, the observation depth d in the sample TP, and so forth are set, the rotation position of the correction collar 32 (optimal correction collar position CP) and the position of the objective lens 30A (optimal objective lens z-position LP) are obtained which provide the best image forming state. As an index which represents the image forming state, the Strehl ratio of the PSF (point spread function) can be used.

Next, the optimal correction collar positions CP of the correction collar 32 are obtained for plural observation depths d, and a scatter diagram is thereby created on which corresponding points, at which the observation depths d correspond to the optimal correction collar positions CP of the correction collar 32, are plotted. Then, a straight line is fitted to plots on the created scatter diagram, for example, and the CP-d change ratio $m_{CP}$ is obtained. Further, the optimal objective lens z-positions LP of the objective lens 30A are obtained for plural observation depths d, and a scatter diagram is thereby created on which corresponding points, at which the observation depths d correspond to the optimal objective lens z-positions LP of the objective lens 30A, are plotted. Then, a straight line is fitted to plots on the created scatter diagram, for example, and the LP-d change ratio $m_{LP}$ is obtained.

Next, by performing the optical simulation, the L'-d change ratio $m_{L'}$ is obtained. In this case, the sample refractive index, the immersion liquid refractive index, the cover glass thickness, the observation depth d in the sample TP, and so forth are first set, the correction collar 32 is fixed to an arbitrary fixed rotation position $C_{CST}$, and with one-dimensional parameters about the objective lens z-position L, an objective lens z-position L' is obtained which provides the best image forming state. As the index which represents the image forming state, the Strehl ratio of the PSF (point spread function) can be used. Next, the objective lens z-positions L' are obtained for plural observation depths d, and a scatter diagram is thereby created on which corresponding points, at which the observation depths d correspond to the objective lens z-positions L', are plotted. Then, a straight line is fitted to plots on the created scatter diagram, for example, and the L'-d change ratio $m_{L'}$ is obtained. As the arbitrary fixed rotation position $C_{CST}$ of the correction collar 32, for example, an optimal rotation position of the correction collar at the observation depth d in the sample TP at which the user is predicted to most frequently perform observations may be used. Plural sample refractive indices are set, the CP-d change ratio $m_{CP}$, the LP-d change ratio mu, the L'-d change ratio $m_{L'}$ are obtained, and the CP-d change ratio $m_{CP}$, the LP-d change ratio mu, and the L'-d change ratio $m_{L'}$ are thereby obtained with respect to each of the sample refractive indices. The created setting data table DB3 is retained in the storage unit 92.

In step ST602, M sample refractive index values $n_0$, $n_1$, ..., $n_{M-1}$ which are different in accordance with the observation depth d of the sample TP and M−1 objective lens z-positions $Lk_0, Lk_1, ..., Lk_{M-2}$ when the focal points of the objective lens 30A are present on the boundary surfaces at which the refractive index changes are obtained. In step ST602, processes similar to step ST301 to step ST310 in the third embodiment are performed (see FIG. 20).

In step ST603, an observation depth $d_S$ and the position of the observation region ROI for experimentally obtaining the optimal correction collar position CP of the correction collar 32 and the optimal objective lens z-position LP of the objective lens 30A are set. As illustrated in FIG. 9, by using the GUI to be displayed on the display unit 95, the user performs, for the input unit 94, an operation for inputting the objective lens z-position L while viewing the sample image TI and sets the observation depth $d_S$. Further, by using the GUI to be displayed on the display unit 95, the user performs, for the input unit 94, operations for inputting the x-direction position and the y-direction position of the observation region ROI (stage 11) while viewing the sample image TI and thereby sets the observation region ROI. When the user performs, for the input unit 94, the operation for inputting the objective lens z-position L and the operations for inputting the x-direction position and the y-direction position of the observation region ROI (stage 11), the input unit 94 outputs input data corresponding to those operations to the microscope control unit 80A of the confocal microscope apparatus 10A via the arithmetic apparatus 91.

Figure 36:
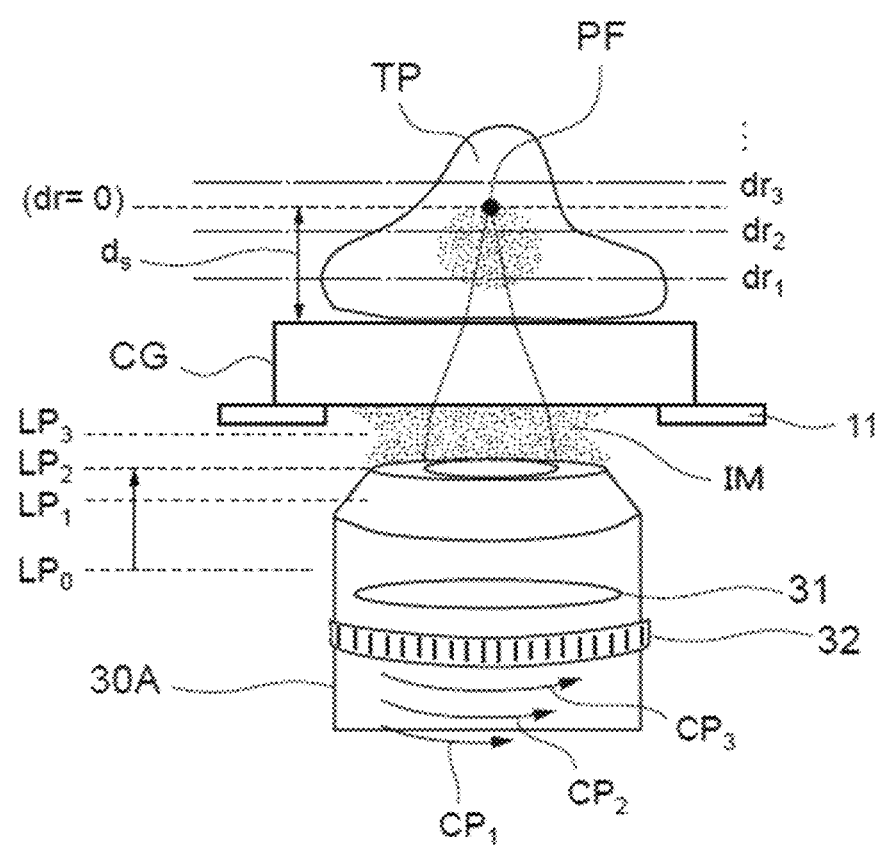
FIG. 36 is a schematic diagram illustrating a state where a focal point of the objective lens is at a position of the observation depth for experimentally obtaining the optimal correction collar position of the correction collar, according to the sixth embodiment.

FIG. 36 illustrates a state where the focal point PF of the objective lens 30A is at a position of the observation depth $d_S$ for experimentally obtaining the optimal correction collar position CP of the correction collar 32. As described by using FIG. 9, because the user does not actually know the observation depth $d_S$ for experimentally obtaining the optimal correction collar position CP of the correction collar 32, the observation depth $d_S$ is set by using an objective lens z-position $L_S$ when the focal point PF of the objective lens 30A is present at the position of the observation depth $d_S$. Note that a relative observation depth which sets a value at the observation depth $d_S$ to zero may be referred to as a relative observation depth dr. The objective lens z-position $L_S$ and the x-direction position and the y-direction position of the observation region ROI (stage 11) for experimentally obtaining the optimal correction collar position CP of the correction collar 32 are not limited to manual setting but may automatically be set under conditions such as a high signal intensity (luminance value) and high contrast of an image. The set objective lens z-position $L_S$ is retained in the storage unit 92. In the following description, a description will be made about a case where the user arbitrarily selects the objective lens z-position $L_S$ from the M−1 objective lens z-positions $Lk_0, Lk_1, ..., Lk_{M-2}$ in advance when the focal points PF of the objective lens 30A are present on the boundary surfaces at which the refractive index changes, the M−1 objective lens z-positions being obtained in step ST602. Note that as the objective lens z-position $L_S$, a value larger than $Lk_0$ may be selected.

In step ST604, when the user performs, for the input unit 94, an operation for selecting correction collar adjustment "start" on the GUI illustrated in FIG. 9, the input unit 94 outputs input data corresponding to the operation to the microscope control unit 80A of the confocal microscope apparatus 10A via the arithmetic apparatus 91 of the information processing apparatus 90. Then, at the observation depth $d_S$ (objective lens z-position $L_S$) and in the observation region ROI which are set in step ST603, a process for obtaining the optimal correction collar position $CP_S$ (corresponding to fifth information according to the present invention) of the correction collar 32 and the optimal objective lens z-position $LP_S$ is started. The optimal correction collar position $CP_S$ and the optimal objective lens z-position $LP_S$ are obtained by performing a correction collar position automatic adjustment process (see FIG. 18) similar to step ST204 in the second embodiment. The obtained optimal correction collar position $CP_S$ and optimal objective lens z-position $LP_S$ are respectively retained in the storage unit 92.

In step ST605, image acquisition parameters and an image acquisition range are input. As illustrated in FIG. 34, the user uses the GUI (setting input screen) to be displayed on the display unit 95 and thereby performs, for the input unit 94, operations for inputting the image acquisition parameters. As operations for inputting the image acquisition parameters, operations for inputting laser power (power of the light source), a scan pitch (a distance between scanning points in the sample TP to be scanned by the scanner 24), and the number of scanning points (the number of scanning points in the sample TP to be scanned by the scanner 24) are performed. The user uses the GUI to be displayed on the display unit 95 and thereby performs, for the input unit 94, operations for inputting the image acquisition range. As operations for inputting the image acquisition range, operations for inputting the number N of acquired z-stack images of the sample, an upper end position $L_{TP}$ of the objective lens, and a lower end position $L_{BM}$ of the objective lens are performed. In the following description, a description will be made about a case where among the M−1 objective lens z-positions $Lk_0, Lk_1, \ldots, Lk_{M-2}$ when the focal points PF of the objective lens 30A are present on the boundary surfaces at which the refractive index changes, the M−1 objective lens z-positions being obtained in step ST602, $L_{BM}$ is smaller than the smallest objective lens z-position $Lk_0$ ($LB_M < Lk_0$) and $L_{TP}$ is larger than the largest objective lens z-position $Lk_{M-2}$ ($Lk_{M-2} < L_{TP}$). Note that as $L_{BM}$, a value larger than $Lk_0$ may be selected.

When the user performs, for the input unit 94, the operations for inputting the image acquisition parameters and the operations for inputting the image acquisition range, the arithmetic apparatus 91 of the information processing apparatus 90 saves input data corresponding to those operations in the storage unit 92. Note that the z-stack images are acquired between the position of the focal point PF of the objective lens 30A when the upper end position $L_{TP}$ of the objective lens is set and the position of the focal point PF of the objective lens 30A when the lower end position $L_{BM}$ of the objective lens 30A is set.

Figure 38:
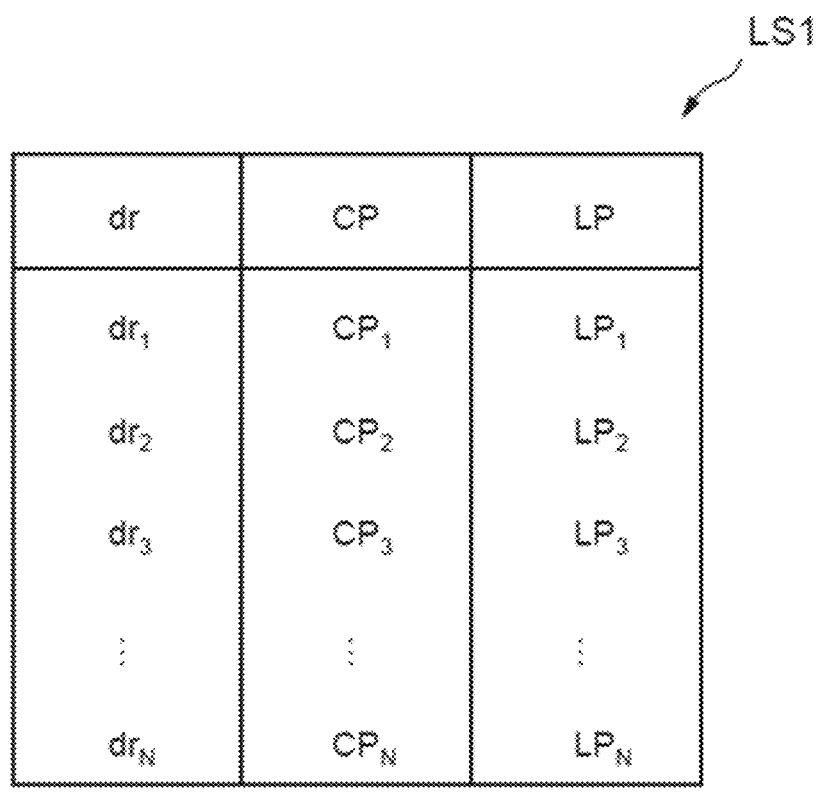
FIG. 38 is a schematic diagram illustrating a parameter list according to the sixth embodiment.

In step ST606, based on the setting data table DB3 retained in the storage unit 92, the M sample refractive index values $n_0, n_1, \ldots, n_{M-1}$ which are obtained in step ST602 and retained in the storage unit 92, the M−1 objective lens z-positions $Lk_0, Lk_1, \ldots, Lk_{M-2}$ when the focal points PF of the objective lens 30A are present on the boundary surfaces at which the refractive index changes, the objective lens z-position $L_S$ which is set in step ST603 and retained in the storage unit 92, the optimal correction collar position $CP_S$ of the correction collar 32 and the optimal objective lens z-position $LP_S$ which are experimentally obtained in step ST604 and retained in the storage unit 92, and the number N of acquired z-stack images of the sample TP, the upper end position $L_{TP}$ of the objective lens 30A, and the lower end position $L_{BM}$ of the objective lens 30A which are input by the user in step ST605 and retained in the storage unit 92, the arithmetic apparatus 91 creates a parameter list LS1 about settings of the confocal microscope 10A (see FIG. 38). As illustrated in FIG. 38, the parameter list LS1 is a list which indicates the relationship among the relative observation depth dr, the optimal correction collar position CP of the correction collar 32, and the optimal objective lens z-position LP of the objective lens 30A when the z-stack images of the sample TP are acquired.

In order to create the parameter list, first, based on the setting data table DB3 created in step ST601, CP-d change ratios $m_{CP0}, m_{CP1}, \ldots, m_{CPM-1}$, LP-d change ratios $m_{LP0}, m_{LP1}, \ldots, m_{LPM-1}$, and L'-d change ratios $m_{L'0}, m_{L'1}, \ldots, m_{L'M-1}$ are obtained which correspond to the M sample refractive index values $n_0, n_1, \ldots, n_{M-1}$ obtained in step ST602. In a case where the refractive index values which agree with the refractive indices $n_0, n_1, \ldots, n_{M-1}$ are not present in the setting data table, interpolation is performed for refractive index values near the refractive indices in the setting data table, and the CP-d change ratios $m_{CP0}, m_{CP1}, \ldots, m_{CPM-1}$, the LP-d change ratios $m_{LP0}, m_{LP1}, \ldots, m_{LPM-1}$, and the L'-d change ratios $m_{L'0}, m_{L'1}, \ldots, m_{L'M-1}$ may thereby be obtained.

Next, based on the M obtained L'-d change ratios $m_{L'0}, m_{L'1}, \ldots, m_{L'M-1}$ and the following expressions (7) and (8), the M−1 objective lens z-positions $Lk_0, Lk_1, \ldots, Lk_{M-2}$ when the focal points PF of the objective lens 30A are present on the boundary surfaces at which the refractive index changes are converted into respectively corresponding relative observation depths $drk_0, drk_1, \ldots, drk_{M-1}$ in the sample TP. In the following expressions (8) and (9), the objective lens z-positions obtained in a state where the correction collar position is fixed are divided by $m_{L'i}$ (i=0, 1, ..., N−1), and it is thereby possible to convert the objective lens z-positions into the depths in the sample TP.

[Math. 8]

$$drk_0 = (Lk_0 - L_S)/m_{L+0} \tag{8}$$

$$drk_i = (Lk_i - L_{i-1})/m_{L+i} + drk_{i-1} \tag{9}$$

Next, a lower end depth $dr_{BM}$ of the relative observation depth and an upper end depth $dr_{TP}$ of the relative observation depth when the z-stack images of the sample TP are acquired are obtained from the following expressions (10) and (11). Note that a reason why $LP_S$ is subtracted in the following expressions (10) and (11) is because parameter setting in step ST605 is executed in a state where the correction collar position is present at $CP_S$ and the focal point PF of the objective lens is at the relative observation depth dr=0 when the objective lens z-position is present at $LP_S$.

[Math. 9]

$$dr_{BM} = (L_{BM} - LP_S)/m_{L+1} \tag{10}$$

$$dr_{TP} = (L_{TP} - LP_S + L_S - Lk_{M-2})/m_{L+i} + drk_{M-2} \tag{11}$$

Next, a relative observation depth $dr_j$ which is changed when the z-stack images of the sample TP are acquired is obtained. Here, a term j denotes integers from 1 to N (the number N of acquired z-stack images of the sample TP). The relative observation depth $dr_j$ (a relative observation depth position of a j-th acquired image) is obtained by using the following expression (12). In the following expression (12), in order to obtain the j-th relative observation depth, a step width for acquiring the z-stack images which is multiplied by an image acquisition index (j−1) is added to the lower end depth $dr_{BM}$ of the relative observation depth.

[Math. 10]

$$dr_j = dr_{BM} + \frac{dr_{TP} - dr_{BM}}{N-1} \times (j-1) \tag{12}$$

Figure 39:
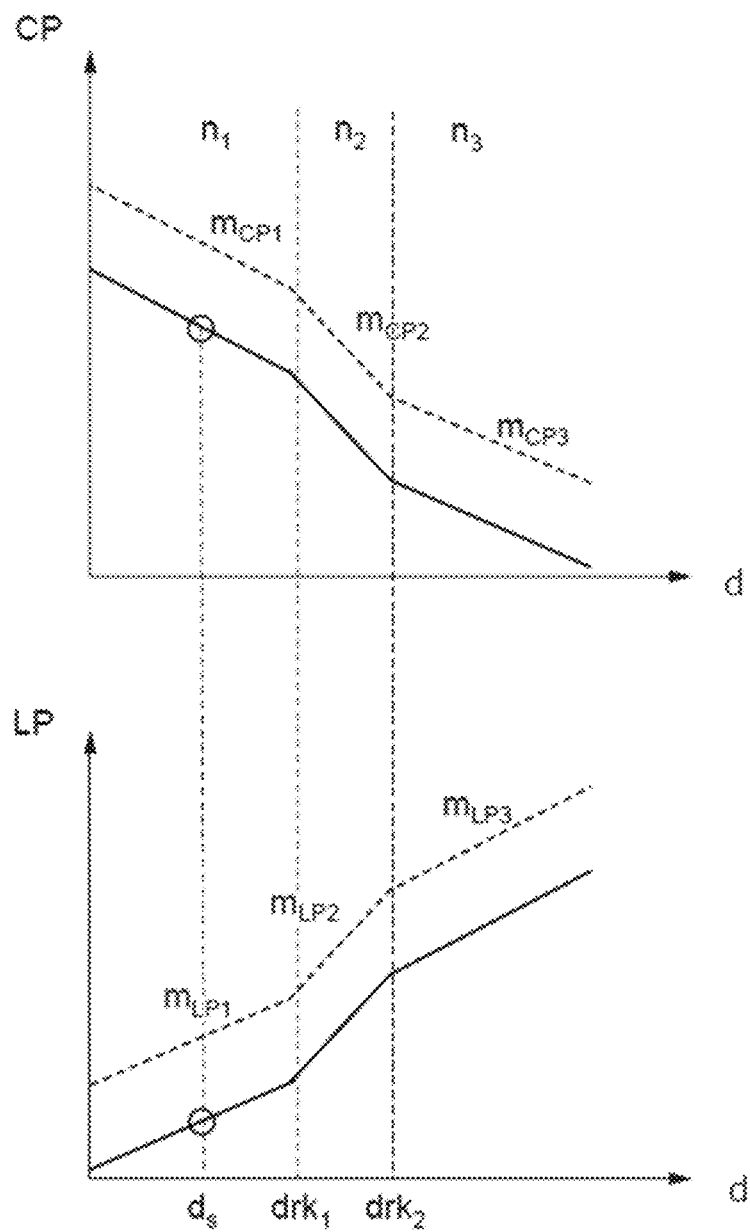
FIG. 39 is a graph illustrating a relationship among the observation depth, a correction collar position, and the objective lens z-position according to the sixth embodiment.

Next, an optimal correction collar position $CP_j$ of the correction collar 32 and an optimal objective lens z-position $LP_j$ of the objective lens 30A are obtained which correspond to each of the relative observation depths $dr_j$ (based on the relationships in FIG. 39). The optimal correction collar position $CP_j$ of the correction collar 32 can be obtained by using the following expressions (13) to (15). A reason why the following expressions (13) to (15) are used is because the relationship between the relative observation depth $dr_j$ and the optimal correction collar position $CP_j$ of the correction collar 32 at that depth is decided by a CP-d change ratio $m_{CPj}$ corresponding to a sample refractive index $n_j$ at the relative observation depth $dr_j$.

[Math. 11]

$$CP_j = m_{CPo} \times dr_j + CP_s \quad (dr_j < drk_o) \tag{13}$$

$$CP_j = m_{CPi} \times (dr_j - drk_{i-1}) + \sum_{l=1}^{i-1}[m_{CPl} \times (drk_l - drk_{l-1})] + m_{CPo} \times dr_o + CP_s \quad (drk_{i-1} \le dr_j < drk_i) \tag{14}$$

$$CP_j = m_{CPi} \times (dr_j - drk_{i-1}) + \sum_{l=1}^{M-2}[m_{CPl} \times (drk_l - drk_{l-1})] \times m_{CPo} \times dr_o + CP_s \quad (drk_{M-2} \le dr_l) \tag{15}$$

The optimal objective lens z-position $LP_j$ of the objective lens 30A can be obtained by using the following expressions (16) to (18).

[Math. 12]

$$LP_j = m_{LPo} \times dr_j + LP_s \quad (dr_j < drk_o) \tag{16}$$

$$LP_j = m_{LPi} \times (dr_j - drk_{i-1}) + \sum_{l=1}^{i-1}[m_{LPl} \times (drk_l - drk_{l-1})] + m_{LPo} \times dr_o + LP_s \quad (drk_{i-1} \le dr_j < drk_i) \tag{17}$$

$$LP_j = m_{LPi} \times (dr_j - drk_{i-1}) + \sum_{l=1}^{M-2}[m_{LPl} \times (drk_l - drk_{l-1})] \times m_{LPo} \times dr_o + LP_s \quad (drk_{M-2} \le dr_l) \tag{18}$$

Then, a list (corresponding to sixth information according to the present invention) is created which indicates the relationship among the relative observation depth $dr_j$, the optimal correction collar position $CP_j$ of the correction collar 32, and the optimal objective lens z-position $LP_j$ of the objective lens 30A which are obtained by the above expressions (12) to (18). Accordingly, the parameter list LS1 as illustrated in FIG. 38 can be created.

In step ST607, the microscope control unit 80A changes the optimal correction collar position CP of the correction collar 32 and the optimal objective lens z-position LP of the objective lens 30A in accordance with the parameter list LS1 created in step ST606 and thereby acquires the z-stack images of the sample TP.

In the sixth embodiment, when the z-stack images of the sample TP are acquired, at each time when an image of a cross section of the sample TP at a different position in the z direction (the optical axis direction of the objective lens 30A) is acquired, the optimal correction collar position CP of the correction collar 32 and an optimal objective lens z-position LP of the objective lens 30A can be changed in accordance with the parameter list LS1. Thus, at each time when an image of a cross section of the sample TP at a different position in the z direction (the optical axis direction of the objective lens 30A) is acquired, optimal aberration correction can be performed.

Note that for example, the thickness of the cover glass CG in a case where the z-stack images of the sample TP are actually acquired may be different from the thickness of the cover glass CG which is set by an optical simulation in a case where the setting data table DB3 is created. In the sixth embodiment, by using the setting data table DB3 created by performing an optical simulation and the optimal correction collar position $CP_S$ of the correction collar 32 and an optimal objective lens z-position LP of the objective lens 30A which are experimentally obtained at a certain observation depth $d_S$, optimal correction collar positions $CP_i$ of the correction collar 32 and optimal objective lens z-positions $LP_i$ of the objective lens 30A at other observation depth positions are calculated. Thus, the optimal correction collar positions $CP_i$ of the correction collar 32 and the optimal objective lens z-positions $LP_i$ of the objective lens 30A can more precisely be calculated than a case of calculating those by using only the optical simulation.

Seventh Embodiment

Figure 40:
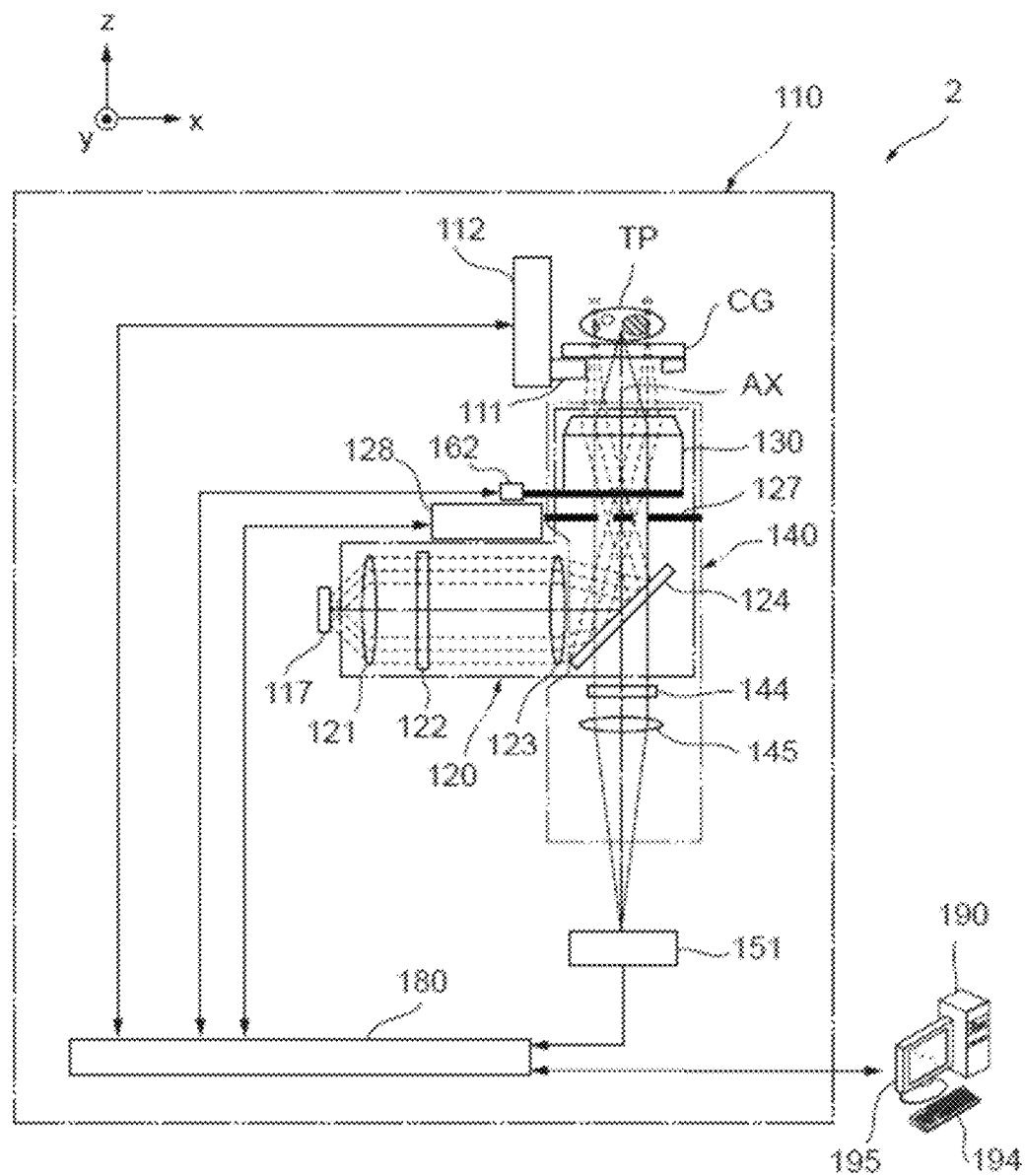
FIG. 40 is a diagram illustrating a configuration of a microscope apparatus according to a seventh embodiment.

A seventh embodiment will be described. FIG. 40 is a diagram illustrating a configuration of a microscope apparatus 2 according to the seventh embodiment. The microscope apparatus 2 is configured with an epifluorescence microscope 110 and an information processing apparatus 190 as main units. The epifluorescence microscope 110 and the information processing apparatus 190 are configured to be capable of mutual transmission and reception of data. In the following description, a coordinate axis which extends in an optical axis direction of an objective lens 130 of the epifluorescence microscope 110 is set as a z axis. Further, coordinate axes which extend in mutually orthogonal directions in a plane perpendicular to the z axis are set as an x axis and a y axis.

The epifluorescence microscope 110 includes a stage 111, a light source 117, an illumination optical system 120, a detection optical system 140, an imaging element 151, and a microscope control unit 180. The stage 111 is formed into a plate shape which has an opening in a central unit and supports cover glass CG on which the sample TP as an observation target is placed. The stage 111 is provided with a stage driving unit 112. The stage driving unit 112 moves the stage 111 in a plane perpendicular to the z axis (an optical axis AX of the objective lens 130). Note that the stage driving unit 112 may move the stage 111 along the z axis (the optical axis AX of the objective lens 130).

The light source 117 emits excitation light for exciting a fluorescent substance contained in the sample TP. As the light source 117, for example, a mercury lamp, an LED, or the like is used.

The illumination optical system 120 illuminates the sample TP by the excitation light emitted from the light source 117. The illumination optical system 120 has, in order from the light source 117 side, an illumination lens 121, an excitation filter 122, a lens 123, a dichroic mirror 124, a mask 127, and the objective lens 130. The illumination lens 121 is a condensing lens for causing the excitation light emitted from the light source 117 to become generally parallel light. The excitation filter 122 has characteristics to transmit the excitation light in a predetermined wavelength range among kinds of light emitted from the light source 117 and to block at least a part of light at other wavelengths (for example, natural light and stray light). While converging the generally parallel light from the excitation filter 122, the lens 123 guides the generally parallel light to the dichroic mirror 124. The dichroic mirror 124 has characteristics to reflect the excitation light emitted from the light source 117 and to transmit light in a predetermined wavelength band (for example, fluorescence) among kinds of light produced in the sample TP on the stage 111. A mask switching unit 128 is provided for the mask 127 (details will be described later).

The objective lens 130 has a similar configuration to the objective lens 30 of the first embodiment and is opposed to the sample TP on the stage 111 via the opening of the stage 111 and the cover glass CG. A gap portion between the objective lens 130 and the cover glass CG is filled with an immersion liquid, but a material with which the gap portion is filled is not limited to the immersion liquid, and the gap portion may be filled with a gas such as air. The objective lens 30 is provided with an objective z-position driving unit 162. The objective z-position driving unit 162 has a similar configuration to the objective z-position driving unit 62 of the first embodiment and moves the objective lens 130 together with a revolver (not illustrated) up and down in the z direction.

The detection optical system 140 forms an image of the fluorescence produced in the sample TP. The detection optical system 140 has, in order from the sample TP side, the objective lens 130, the mask 127, the dichroic mirror 124, a fluorescence filter 144, and an image forming lens 145. The fluorescence filter 144 has characteristics to transmit light in a predetermined wavelength band (for example, the fluorescence) among kinds of light from the sample TP. The fluorescence filter 144 blocks at least a part of the excitation light, natural light, stray light, and so forth which are reflected by the sample TP, for example. The image forming lens 145 forms an image of the fluorescence from the sample TP.

The imaging element 151 functions as a detection unit which detects the fluorescence produced in the sample TP via the detection optical system 140. As the imaging element 151, for example, a CCD camera, a CMOS camera, or the like is used. The imaging element 151 performs photoelectric conversion for light (fluorescence) incident on the imaging element 151 and generates, as a detection signal of light, data corresponding to a light amount (brightness) of the light. The imaging element 151 outputs the generated data to an imaging element control unit 181 (see FIG. 41) of the microscope control unit 180. An arithmetic apparatus 191 (see FIG. 41) of an information processing apparatus 190 generates one set of image data based on data of plural pixels input from the imaging element 151 and causes a storage unit 192 (see FIG. 41) such as a RAM to store the image data. Consequently, the arithmetic apparatus 191 acquires an image of the sample TP.

The mask 127 has a similar configuration to the mask 27 of the first embodiment and causes a part of the fluorescence given off from the sample TP to transmit therethrough and blocks a part of the fluorescence. The mask 127 is arranged in a range, in which the fluorescence given off from one point of the sample TP becomes generally parallel light, in the detection optical system 140. Note that the mask 127 may be arranged in a shared optical path of the illumination optical system and the detection optical system. The mask switching unit 128 has a similar configuration to the mask switching unit 28 of the first embodiment and changes mask patterns related to sizes, shapes, arrangement, and so forth of a region through which light is transmitted and a region in which light is blocked in the mask 127.

Figure 41:
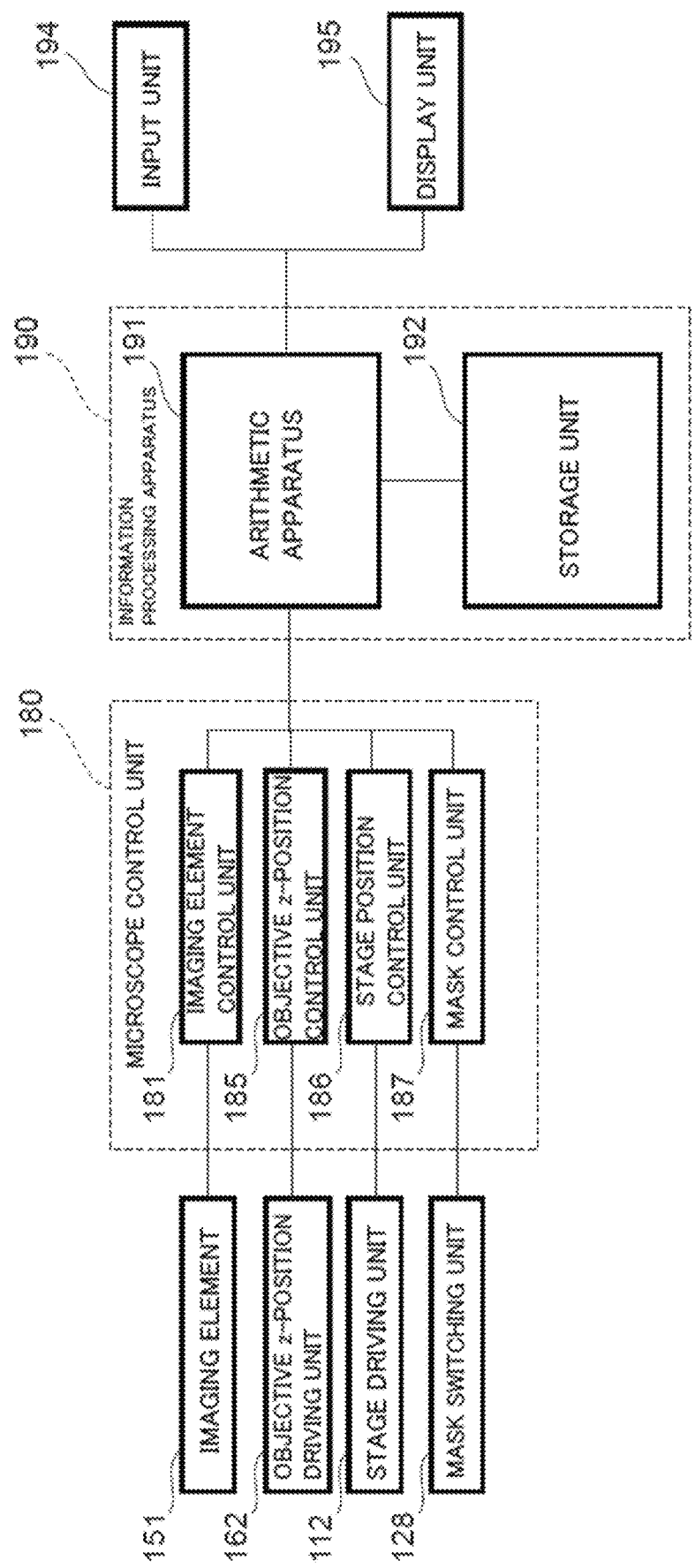
FIG. 41 is a block diagram illustrating electrical connection between a microscope control unit and an information processing apparatus according to the seventh embodiment.

FIG. 41 is a block diagram illustrating electrical connection between the microscope control unit 180 of the epifluorescence microscope 110 and the information processing apparatus 190 according to the seventh embodiment. The microscope control unit 180 and the information processing apparatus 190 configure the arithmetic control unit according to the present invention. The microscope control unit 180 has the imaging element control unit 181, an objective z-position control unit 185, a stage position control unit 186, and a mask control unit 187.

The imaging element control unit 181 is electrically connected with the imaging element 151 and controls the imaging element 151. The objective z-position control unit 185 is electrically connected with the objective z-position driving unit 162 and controls the objective z-position driving unit 162. The stage position control unit 186 is electrically connected with the stage driving unit 112 and controls the stage driving unit 112. The mask control unit 187 is electrically connected with the mask switching unit 128 and controls the mask switching unit 128. Note that switching among masks is not limited to automatic switching. For example, mask patterns may be changed by manual insertion or removal of masks by the user.

The information processing apparatus 190 has the arithmetic apparatus 191 and the storage unit 192. The arithmetic apparatus 191 is electrically connected with the control units 181 and 185 to 187 of the microscope control unit 180. The arithmetic apparatus 91 performs processes in accordance with process contents (programs) retained in the storage unit 192 and controls the control units 181 and 185 to 187 connected therewith. The storage unit 192 has a similar configuration to the storage unit of the first embodiment and stores the process contents to be executed by the arithmetic apparatus 191 and various data to be input from the arithmetic apparatus 191. The input unit 194 and the display unit 195 respectively have similar configurations and functions to the input unit 94 and the display unit 95 of the first embodiment. The arithmetic apparatus 191 of the information processing apparatus 190 causes the display unit 195 to display a GUI necessary for an operation of the epifluorescence microscope 110, an image of the sample TP output from the microscope control unit 180 of the epifluorescence microscope 110, and a calculated sample refractive index.

Next, a sample refractive index measurement method according to the seventh embodiment will be described. When an aberration is present in the detection optical system, by changing mask patterns, only an image forming position of detection light is changed. In the following, the image forming position of the detection light will be referred to as a "focusing position". Similarly to the sample refractive index measurement method according to the first embodiment, in the sample refractive index measurement method according to the seventh embodiment, at plural observation depth positions (objective lens z-positions L), movement amounts of the focusing position, in the z direction, of an optical system including the objective lens 130 are obtained, the movement amounts being produced when mask patterns of the mask 127 are changed, and the refractive index of the sample TP is calculated based on the obtained movement amounts of the focusing position. The mask patterns which are changed in the mask 127 are the two mask patterns MP1 and MP2 which are similar to those used in the first embodiment. Specific procedures of the sample refractive index measurement method according to the seventh embodiment are similar to those of the sample refractive index measurement method according to the first embodiment (see FIG. 6), and detailed descriptions thereof will not be made. In the seventh embodiment, similar effects to the first embodiment can be obtained.

Eighth Embodiment

Figure 42:
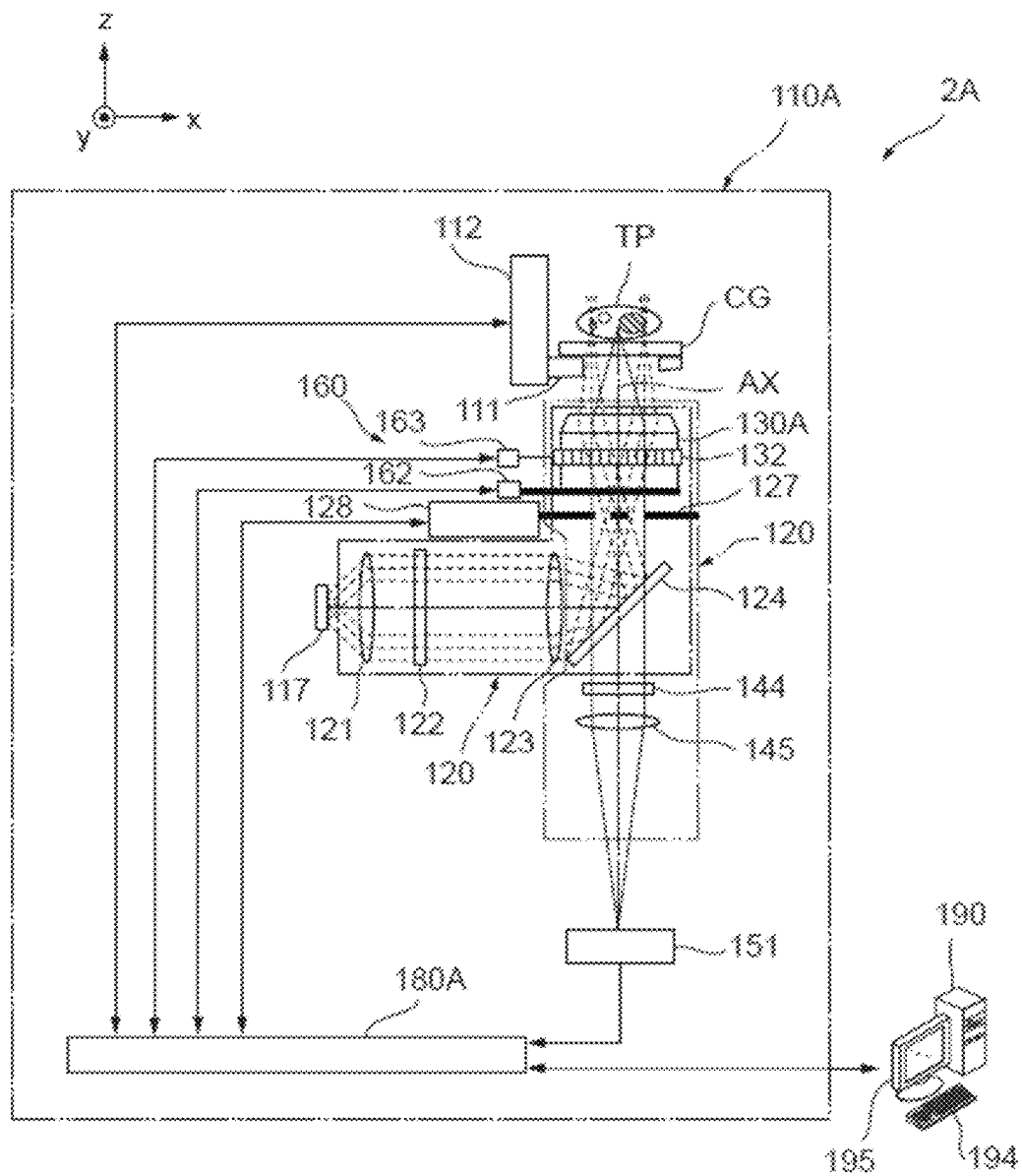
FIG. 42 is a diagram illustrating a configuration of a microscope apparatus according to an eighth embodiment.

An eighth embodiment will be described. FIG. 42 is a diagram illustrating a configuration of a microscope apparatus 2A according to the eighth embodiment. The microscope apparatus 2A has similar configurations to those of the microscope apparatus 2 according to the seventh embodiment, the same or similar reference characters will appropriately be given to the configurations similar to those of the above-described seventh embodiment, and descriptions thereof will not be made or will be simplified. The microscope apparatus 2A includes an epifluorescence microscope 110A which has an aberration correction unit 160 and a microscope control unit 180A and is, in this point, different from the microscope apparatus 2 according to the seventh embodiment.

The aberration correction unit 160 has a similar configuration to the aberration correction unit 60 of the second embodiment and corrects a spherical aberration due to a distance between a distal end of an objective lens 130A and the cover glass CG, the thickness of the cover glass CG, an observation depth in a sample, and so forth. The objective lens 130A has a similar configuration to the objective lens 30A of the second embodiment and has an aberration correction lens (not illustrated) and a correction collar 132. The aberration correction lens moves along the optical axis AX of the objective lens 130A and is thereby capable of changing the spherical aberration of the objective lens 130A. The correction collar 132 is provided on a barrel portion of the objective lens 130A to be rotatable around the optical axis AX of the objective lens 130A as a center. In response to rotation of the correction collar 132, the aberration correction lens moves along the optical axis AX of the objective lens 130A.

The aberration correction unit 160 includes the aberration correction lens and the correction collar 132 of the objective lens 130A and the imaging element 151. In addition, the aberration correction unit 160 includes a correction collar driving unit 163 and the objective z-position driving unit 162. The correction collar driving unit 163 is configured by using an electric motor (not illustrated), for example. The correction collar driving unit 163 rotates and drives the correction collar 132, changes the rotation position C of the correction collar 132, and moves the aberration correction lens along the optical axis AX of the objective lens 130A. The correction collar driving unit 163 changes the rotation position C of the correction collar 132, changes a position of the aberration correction lens on the optical axis, and thereby changes the spherical aberration of the objective lens 130A. The objective z-position driving unit 162 has a similar configuration and functions to those of the microscope apparatus 1 according to the first embodiment.

Figure 43:
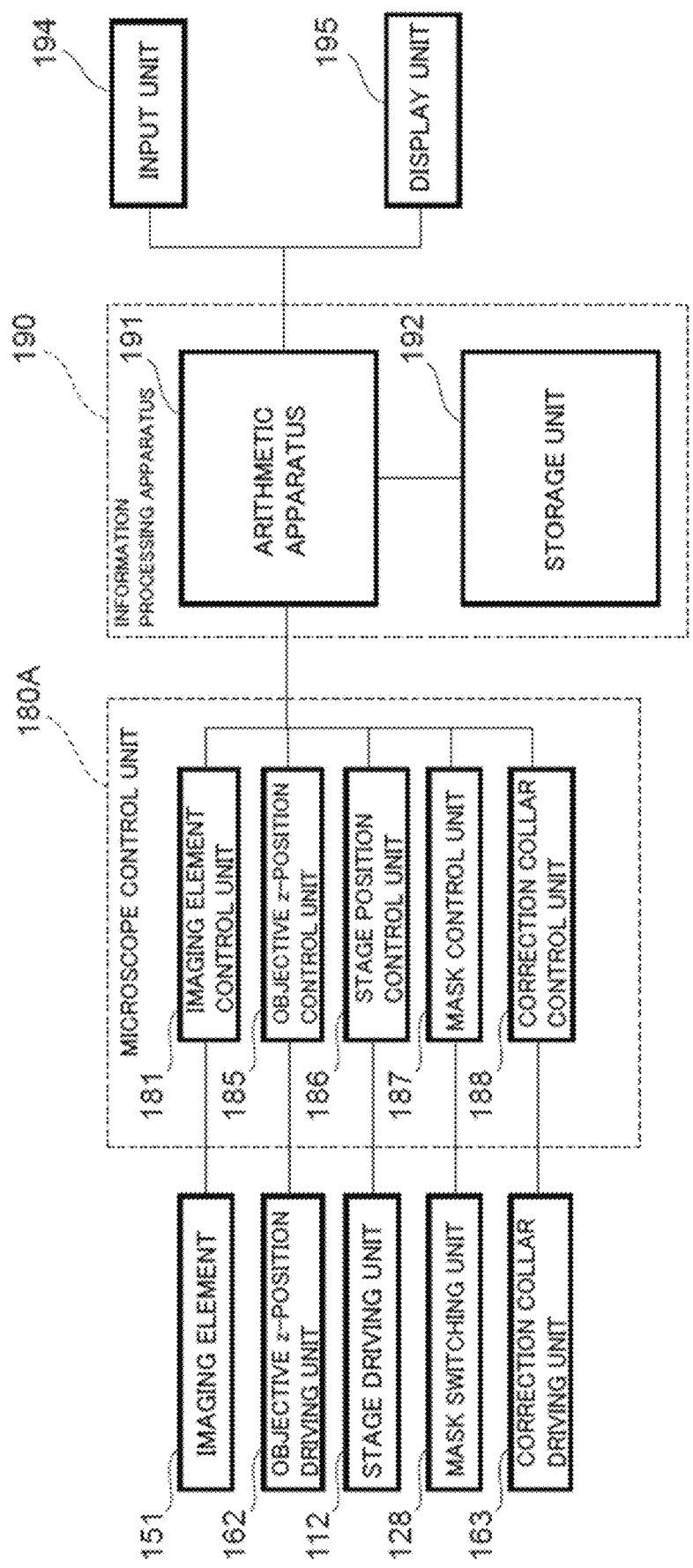
FIG. 43 is a block diagram illustrating electrical connection between a microscope control unit and an information processing apparatus according to the eighth embodiment.

FIG. 43 is a block diagram illustrating electrical connection between the microscope control unit 180A of the epifluorescence microscope 110A and the information processing apparatus 190. The microscope control unit 180A and the information processing apparatus 190 configure the arithmetic control unit according to the present invention. The microscope control unit 180A according to the eighth embodiment includes a correction collar control unit 188 in addition to the configurations of the microscope control unit 180 according to the seventh embodiment and is, in this point, different from the microscope control unit 180 according to the seventh embodiment. The correction collar control unit 188 is electrically connected with the correction collar driving unit 163 and controls the correction collar driving unit 163.

Next, a sample refractive index measurement method according to the eighth embodiment will be described. Similarly to the sample refractive index measurement method according to the second embodiment, in the sample refractive index measurement method according to the eighth embodiment, while two objective lens z-positions are set and the correction collar 132 is adjusted to an optimal position at one of the objective lens z-positions, the movement amounts of the focusing position are obtained when changes between the mask patterns MP1 and MP2 are performed at the other objective lens z-position, and the sample refractive index is thereby calculated based on the obtained movement amounts of the focusing position. Specific procedures of the sample refractive index measurement method according to the eighth embodiment are similar to those of the sample refractive index measurement method according to the second embodiment (see FIG. 16), and detailed descriptions thereof will not be made. In the eighth embodiment, similar effects to the second embodiment can be obtained.

Ninth Embodiment

A ninth embodiment will be described. A microscope apparatus according to the ninth embodiment is similar to the microscope apparatus 2 according to the seventh embodiment, and a microscope control unit and an information processing apparatus are similar to the microscope control unit 180 and the information processing apparatus 190 in the seventh embodiment. The same reference characters are appropriately given to similar configurations to those of the above-described seventh embodiment, and descriptions thereof will not be made or will be simplified.

Next, a sample refractive index measurement method according to the ninth embodiment will be described. Similarly to the sample refractive index measurement method according to the third embodiment, in the sample refractive index measurement method according to the ninth embodiment, in a case where the sample refractive indices are different among plural depth regions of the sample TP, the respective sample refractive indices at the depth regions are calculated. Specific procedures of the sample refractive index measurement method according to the ninth embodiment are similar to those of the sample refractive index measurement method according to the third embodiment (see FIG. 20), and detailed descriptions thereof will not be made. In the ninth embodiment, similar effects to the third embodiment can be obtained.

Tenth Embodiment

A tenth embodiment will be described. A microscope apparatus according to the tenth embodiment is similar to the microscope apparatus 2 according to the seventh embodiment, and a microscope control unit and an information processing apparatus are similar to the microscope control unit 180 and the information processing apparatus 190 in the seventh embodiment. The same reference characters are appropriately given to similar configurations to those of the above-described seventh embodiment, and descriptions thereof will not be made or will be simplified.

Next, a sample refractive index measurement method according to the tenth embodiment will be described. In the sample refractive index measurement method according to the tenth embodiment, the mask patterns which are changed in the mask 127 are set to the two mask patterns MP3 and MP4 (see FIG. 23) which are similar to those in the sample refractive index measurement method according to the fourth embodiment. Then, when the mask patterns are changed, a position movement of the focusing position of an optical system including the objective lens 130 is caused not to occur in the z direction but to occur in the xy direction, and the sample refractive index is calculated based on the movement amount of the focusing position in the xy direction. Specific procedures of the sample refractive index measurement method according to the tenth embodiment are similar to those of the sample refractive index measurement method according to the fourth embodiment (see FIG. 25), and detailed descriptions thereof will not be made. In the tenth embodiment, similar effects to the fourth embodiment can be obtained.

Eleventh Embodiment

An eleventh embodiment will be described. A microscope apparatus according to the eleventh embodiment is similar to the microscope apparatus 2A according to the eighth embodiment, and a microscope control unit and an information processing apparatus are similar to the microscope control unit 180A and the information processing apparatus 190A in the eighth embodiment. The same reference characters are appropriately given to similar configurations to those of the above-described eighth embodiment, and descriptions thereof will not be made or will be simplified.

Next, a sample refractive index measurement method according to the eleventh embodiment will be described. In the sample refractive index measurement method according to the eleventh embodiment, by using plural sample refractive indices for respective depth regions which can be obtained by the sample refractive index measurement method according to the ninth embodiment, the correction collar positions are set to optimal states with respect to the respective depth regions, and the z-stack images of the sample TP are thereby acquired. Specific procedures of the sample refractive index measurement method according to the eleventh embodiment are similar to those of the sample refractive index measurement method according to the sixth embodiment (see FIG. 32), and detailed descriptions thereof will not be made. In the eleventh embodiment, similar effects to the sixth embodiment can be obtained.

Twelfth Embodiment

A twelfth embodiment will be described. A microscope apparatus according to the twelfth embodiment is similar to the microscope apparatus 2 according to the seventh embodiment, and a microscope control unit and an information processing apparatus are similar to the microscope control unit 180 and the information processing apparatus 190 in the seventh embodiment. The same reference characters are appropriately given to similar configurations to those of the above-described seventh embodiment, and descriptions thereof will not be made or will be simplified.

Figure 37:
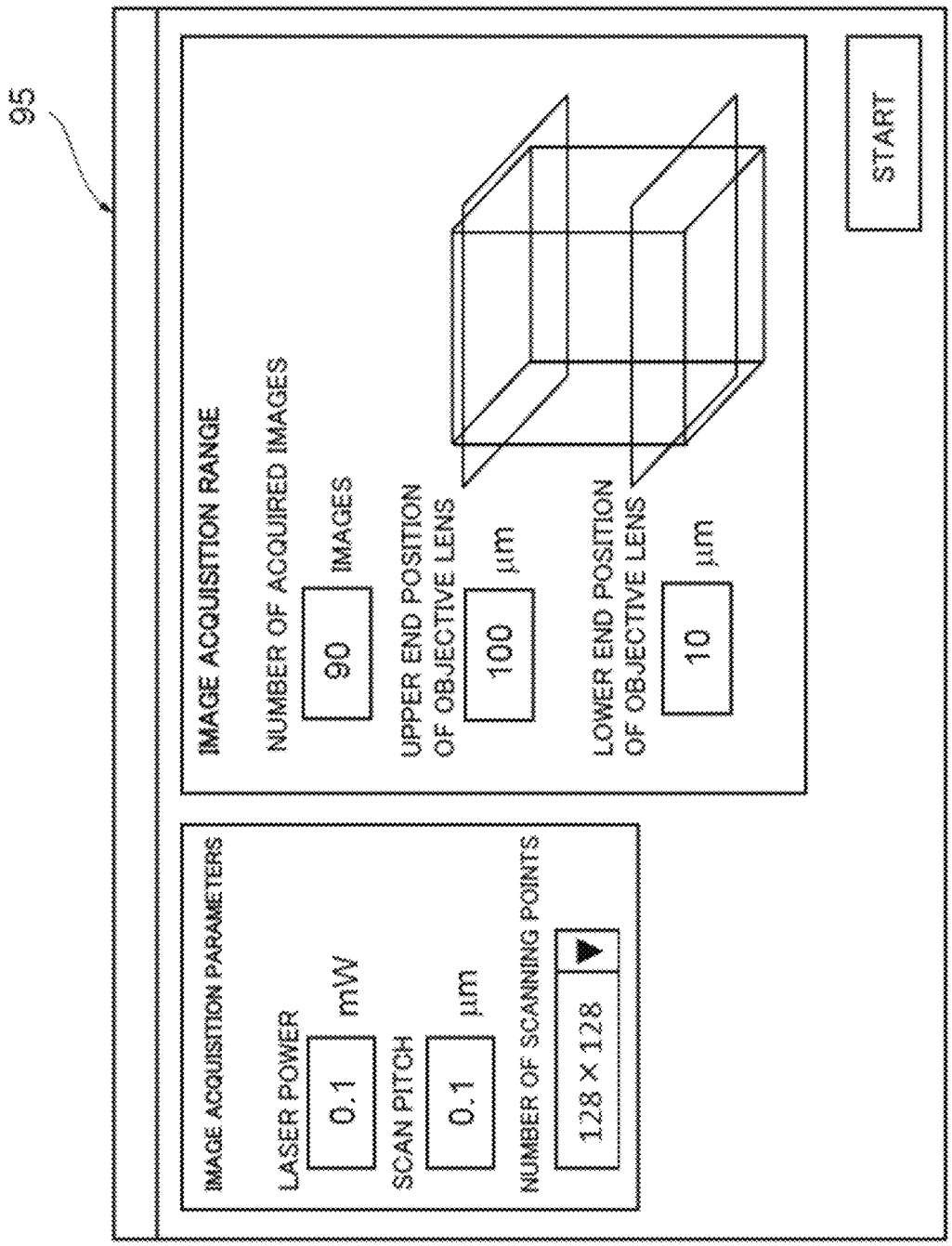
FIG. 37 is a diagram illustrating one example of a GUI which is used when image acquisition parameters and so forth are input, according to the sixth embodiment.

Next, a sample refractive index measurement method according to the twelfth embodiment will be described. Similarly to the sample refractive index measurement method according to the fifth embodiment, in the sample refractive index measurement method according to the twelfth embodiment, each of the two mask patterns MP1 and MP2 is set on an optical path, the z-stack images of the sample TP are acquired, and the sample refractive index (set as a uniform refractive index regardless of the observation depth) is thereby measured based on a magnification in the z direction between two sets of acquired z-stack images. Specific procedures of the sample refractive index measurement method according to the twelfth embodiment are similar to those of the sample refractive index measurement method according to the fifth embodiment (see FIG. 37), and detailed descriptions thereof will not be made. In the twelfth embodiment, similar effects to the fifth embodiment can be obtained.

In the above-described embodiments, the image acquisition parameters and the image acquisition ranges are set by inputting operations by the user, but this is not restrictive. For example, at least any of those sets of data may automatically be set by referring to data which are stored in the storage unit or the like and are used when the z-stack images of the sample TP are previously acquired.

In the above-described embodiments, as an aberration correction element which corrects an aberration due to a distance between an objective lens distal end and the cover glass CG, the thickness of the cover glass CG, the observation depth d, and so forth or an aberration due to a distance between the objective lens distal end and the sample TP, the observation depth d, and so forth, the aberration correction lens is used, but this is not restrictive. For example, as the aberration correction element, other phase modulation elements such as a liquid lens, a deformable mirror, and a liquid crystal element may be used. The liquid lens is arranged in an illumination optical system, a detection optical system, a shared portion of two optical systems, or an objective lens internal portion, changes the shape of the lens, and thereby corrects the aberration. The phase modulation element such as the deformable mirror or the liquid crystal element is arranged in the illumination optical system, the detection optical system, or a shared portion of the two optical systems, modulates a phase of at least one of illumination light (excitation light) for the sample TP and detection light (fluorescence) from the sample TP, and thereby corrects the aberration.

The phase modulation element is provided with an adjustment unit which is capable of changing or adjusting a correction amount of the aberration. For example, the adjustment unit provided for the liquid lens controls a value of a voltage applied to the liquid lens and thereby changes the shape of the lens. Accordingly, the correction amount of the aberration by the liquid lens can be changed or adjusted. The adjustment unit provided for the deformable mirror controls a value of a voltage applied to the deformable mirror and thereby changes the shape of the mirror. Accordingly, the correction amount of the aberration by the deformable mirror can be changed or adjusted. The adjustment unit provided for the liquid crystal element controls a value of a voltage applied to the liquid crystal element and thereby changes the distribution of liquid crystals. Accordingly, the correction amount of the aberration by the liquid crystal element can be changed or adjusted. Note that one liquid crystal element may provide functions of both of aberration correction and the mask.

In the above-described embodiments, the input unit and the display unit are apparatuses which are provided separately from the information processing apparatus, but this is not restrictive. For example, the input unit may be an apparatus which is integrally provided with the information processing apparatus (such as a built-in touch pad, for example). The input unit may be an apparatus which is integrally provided with the display unit (for example, a touch panel). The display unit may be an apparatus which is integrally provided with the information processing apparatus.

In the above-described embodiments, the microscope apparatus is provided with the confocal microscope or the epifluorescence microscope, but this is not restrictive. For example, a two-photon excitation microscope may be used instead of the confocal microscope. In such a case, the dichroic mirror is arranged between the scanner and the objective lens of an optical path, and the pinhole and the pinhole driving unit may be removed. A microscope provided for the microscope apparatus may be a differential interference contrast microscope, a phase contrast microscope, a super-resolution microscope, a dark-field microscope, a thermal lens microscope, or the like. Further, a microscope provided for the microscope apparatus is not limited to an inverted microscope but may be an upright microscope.

EXPLANATION OF NUMERALS AND CHARACTERS 1, 1A, 2, 2A microscope apparatus
10, 10A confocal microscope
11, 111 stage
20, 120 illumination optical system
30, 30A, 130, 130A objective lens
32, 132 correction collar
40, 140 detection optical system
51 detection unit
80, 80A, 180, 180A microscope control unit
90, 190 information processing apparatus
110, 110A epifluorescence microscope
151 imaging element
TP sample
MP1 to MP4 mask pattern

What is claimed is:

1. A microscope apparatus, comprising:
an illumination optical system configured to guide illumination light from a light source to a sample;
a detection unit configured to detect detection light from the sample;
a detection optical system configured to guide the detection light from the sample to the detection unit;
an element provided in at least one of the illumination optical system and the detection optical system;
a switching unit configured to change at least one of: (i) a cross-sectional shape of the illumination light in a plane which intersects with an optical axis of the illumination optical system and (ii) a cross-sectional shape of the detection light in a plane which intersects with an optical axis of the detection optical system, by inserting, removing, or controlling the element; and
an arithmetic control unit configured to calculate information about a movement amount of at least one of a light condensing position of the illumination light and an image forming position of the detection light, the movement amount accompanying insertion, removal, or control of the element by the switching unit, and calculates a refractive index of the sample based on the information about the movement amount.

2. The microscope apparatus according to claim 1, wherein the arithmetic control unit:
specifies first information indicating a relationship between the refractive index of the sample and a ratio of a change amount in the movement amount of at least one of the light condensing position and the image forming position relative to a change amount in a depth position of the sample along at least one of the optical axes of the illumination optical system and the detection optical system;
obtains, based on the detection light, second information which indicates the movement amount which is produced when the element is changed from a first state to a second state at each of a plurality of depth positions of the sample in a depth direction;
calculates third information which indicates a ratio between the change amount in a depth and the change amount in the movement amount based on the second information; and
calculates the refractive index of the sample based on the first information and the third information.

3. The microscope apparatus according to claim 2, wherein the arithmetic control unit:
divides the sample into a plurality of regions in the depth direction of the sample; and
calculates the refractive index for each of the divided regions.

4. The microscope apparatus according to claim 3, wherein:
the detection optical system includes an objective lens;
the microscope apparatus comprises an aberration correction unit configured to correct an aberration of an optical system including the objective lens; and
the arithmetic control unit configured to:
specify fourth information indicating a relationship between the refractive index of the sample and a ratio of a change amount in a correction amount of the aberration correction unit relative to the change amount in the depth position;
obtain, based on the detection light, fifth information indicating the correction amount of the aberration correction unit at a first position of the sample in the depth direction; and
calculate sixth information indicating an optimal correction amount of the aberration correction unit in a second position of the sample in the depth direction based on the fourth information, the fifth information, the refractive index for each of the divided regions, and information about each of boundary surface positions between the divided regions.

5. The microscope apparatus according to claim 4, further comprising:
a driving unit that is capable of relatively moving the sample and the objective lens along an optical axis of the objective lens;
wherein the arithmetic control unit controls the aberration correction unit based on the sixth information, controls the driving unit, and generates images of the sample at one or more depth positions of the sample in the depth direction based on the detection light.

6. The microscope apparatus according to claim 1, wherein:
the detection optical system includes an objective lens;
the microscope apparatus comprises an aberration correction unit which corrects an aberration of an optical system including the objective lens; and
the arithmetic control unit is configured to:
control the aberration correction unit and correct the aberration at a first depth position of the sample in a depth direction along an optical axis of the objective lens;
specify seventh information indicating a relationship between the refractive index of the sample and a ratio of a change amount in the movement amount of at least one of the light condensing position and the image forming position relative to a change amount in the depth position;
obtain, based on the detection light, eighth information indicating the movement amount of at least one of the light condensing position and the image forming position which are produced when the element is inserted, removed, or controlled at a second depth position, the second depth position different from the first depth position of the sample in the depth direction;

calculate ninth information indicating a ratio between the change amount in the depth position and the change amount in the movement amount of at least one of the light condensing position and the image forming position based on the eighth information, information about the first depth position, and information about the second depth position; and calculate the refractive index of the sample based on the seventh information and the ninth information.

7. The microscope apparatus according to claim 1, wherein:

the movement amount of at least one of the light condensing position and the image forming position is a movement amount in an optical axis direction of at least one of the illumination optical system and the detection optical system.

8. The microscope apparatus according to claim 1, wherein:

the movement amount of at least one of the light condensing position and the image forming position is a movement amount in a direction perpendicular to an optical axis of at least one of the illumination optical system and the detection optical system.

9. The microscope apparatus according to claim 1, wherein:

the detection optical system includes an objective lens;

the microscope apparatus comprises a driving unit that is capable of relatively moving the sample and the objective lens along an optical axis of the objective lens; and the arithmetic control unit is configured to:

generate a first image group as images of the sample at a plurality of predetermined positions of the sample in a depth direction of the sample in a case where the element is in a first state based on the detection light, generate a second image group as images of the sample at the plurality of predetermined positions in a case where the element is in a second state based on the detection light; and calculate the refractive index of the sample based on a magnification in the depth direction between the first image group and the second image group.

10. A sample refractive index measurement method for a microscope apparatus, the microscope apparatus including: an illumination optical system configured to guide illumination light from a light source to a sample; a detection unit configured to detect detection light from the sample; a detection optical system configured to guide the detection light from the sample to the detection unit; an element provided in at least one of the illumination optical system and the detection optical system; a switching unit that changes at least one of a cross-sectional shape of the illumination light in a plane which intersects with an optical axis of the illumination optical system and a cross-sectional shape of the detection light in a plane which intersects with an optical axis of the detection optical system, by inserting, removing, or controlling the element; and an arithmetic control unit, wherein the sample refractive index measurement method comprises:

calculating information about a movement amount of at least one of a light condensing position of the illumination light and an image forming position of the detection light, the movement amount accompanying insertion, removal, or control of the element by the switching unit; and calculating a refractive index of the sample based on the information about the movement amount.

11. A sample refractive index measurement program for a microscope apparatus, the microscope apparatus including: an illumination optical system configured guide illumination light from a light source to a sample; a detection unit configured to detect detection light from the sample; a detection optical system configured to guide the detection light from the sample to the detection unit; an element provided in at least one of the illumination optical system and the detection optical system; a switching unit that changes at least one of a cross-sectional shape of the illumination light in a plane which intersects with an optical axis of the illumination optical system and a cross-sectional shape of the detection light in a plane which intersects with an optical axis of the detection optical system, by inserting, removing, or controlling the element; and an arithmetic control unit, wherein the sample refractive index measurement program causes a computer to execute:

a process of calculating information about a movement amount of at least one of a light condensing position of the illumination light and an image forming position of the detection light, the movement amount accompanying insertion, removal, or control of the element by the switching unit; and a process of calculating a refractive index of the sample based on the information about the movement amount.

* * * * *